(12) United States Patent
Kang et al.

(10) Patent No.: US 9,182,890 B2
(45) Date of Patent: Nov. 10, 2015

(54) IMAGE DISPLAY APPARATUS AND METHOD FOR OPERATING THE SAME

(71) Applicant: LG ELECTRONICS INC., Seoul (KR)

(72) Inventors: Hyungsuk Kang, Seoul (KR); Youngkon Yu, Seoul (KR); Yongbum Cho, Seoul (KR); Sungjae Rho, Seoul (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 13/922,652

(22) Filed: Jun. 20, 2013

(65) Prior Publication Data

US 2014/0215380 A1 Jul. 31, 2014

(30) Foreign Application Priority Data

Jan. 31, 2013 (KR) .......................... 10-2013-0011281
Jan. 31, 2013 (KR) .......................... 10-2013-0011282

(51) Int. Cl.
*G06F 3/048* (2013.01)
*G06F 3/0483* (2013.01)

(52) U.S. Cl.
CPC .................................. *G06F 3/0483* (2013.01)

(58) Field of Classification Search
None
See application file for complete search history.

(56) References Cited

U.S. PATENT DOCUMENTS

| | | | |
|---|---|---|---|
| 2001/0034746 A1* | 10/2001 | Tsakiris et al. | 707/517 |
| 2002/0103863 A1* | 8/2002 | Pearson | 709/204 |
| 2003/0007012 A1* | 1/2003 | Bate | 345/825 |
| 2009/0164589 A1* | 6/2009 | Shroff et al. | 709/206 |
| 2010/0042684 A1* | 2/2010 | Broms et al. | 709/204 |
| 2010/0095240 A1* | 4/2010 | Shiplacoff et al. | 715/784 |
| 2011/0281619 A1* | 11/2011 | Cho et al. | 455/566 |
| 2012/0079432 A1* | 3/2012 | Lee et al. | 715/838 |
| 2012/0139945 A1* | 6/2012 | Choi | 345/660 |
| 2012/0278738 A1* | 11/2012 | Kruse et al. | 715/754 |
| 2014/0059496 A1* | 2/2014 | White et al. | 715/841 |
| 2014/0101608 A1* | 4/2014 | Ryskamp et al. | 715/810 |

* cited by examiner

*Primary Examiner* — Stephen Alvesteffer
(74) *Attorney, Agent, or Firm* — KED & Associates LLP

(57) ABSTRACT

An image display apparatus and a method for operating the same are disclosed. The method for operating the image display apparatus includes displaying a home screen including at least one card object including a content list, displaying a card object generation screen if card object generation input is received, and, if at least one content item displayed on the card object generation screen is selected, adding the selected content item to a card object to be generated. Therefore, it is possible to increase user convenience.

19 Claims, 70 Drawing Sheets

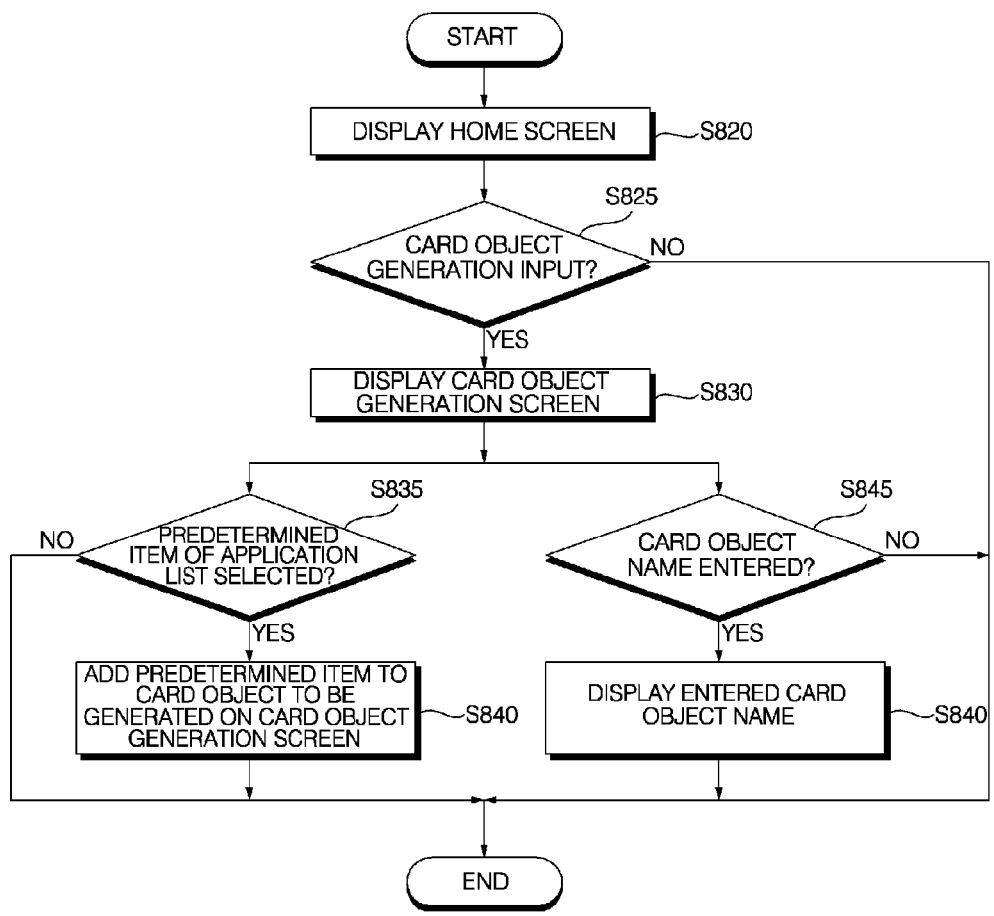

FIG. 9A
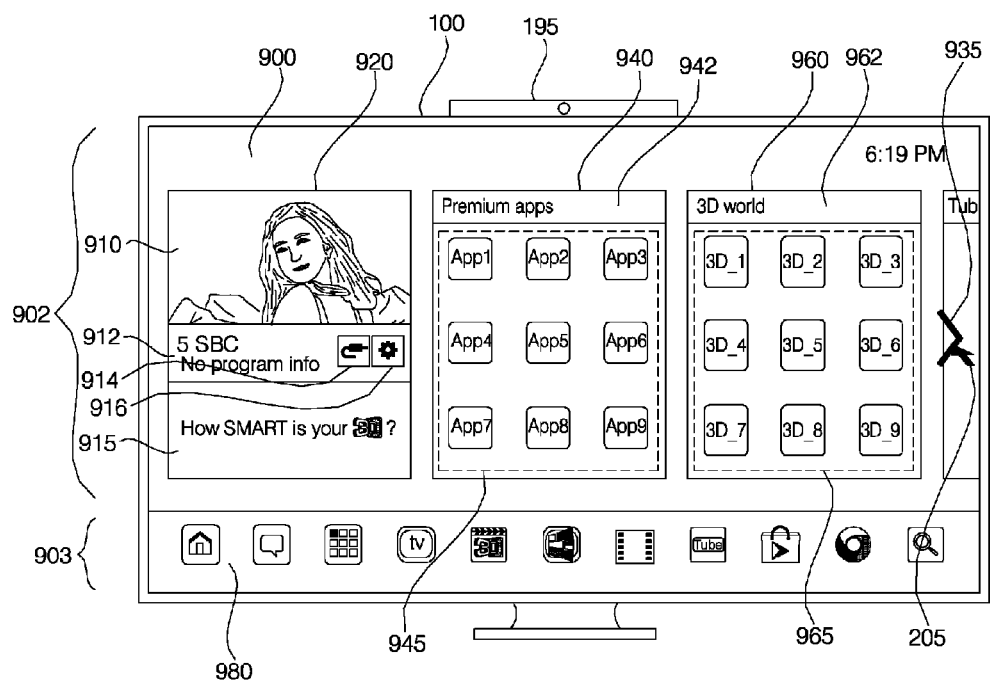
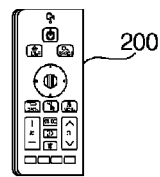

FIG. 9B
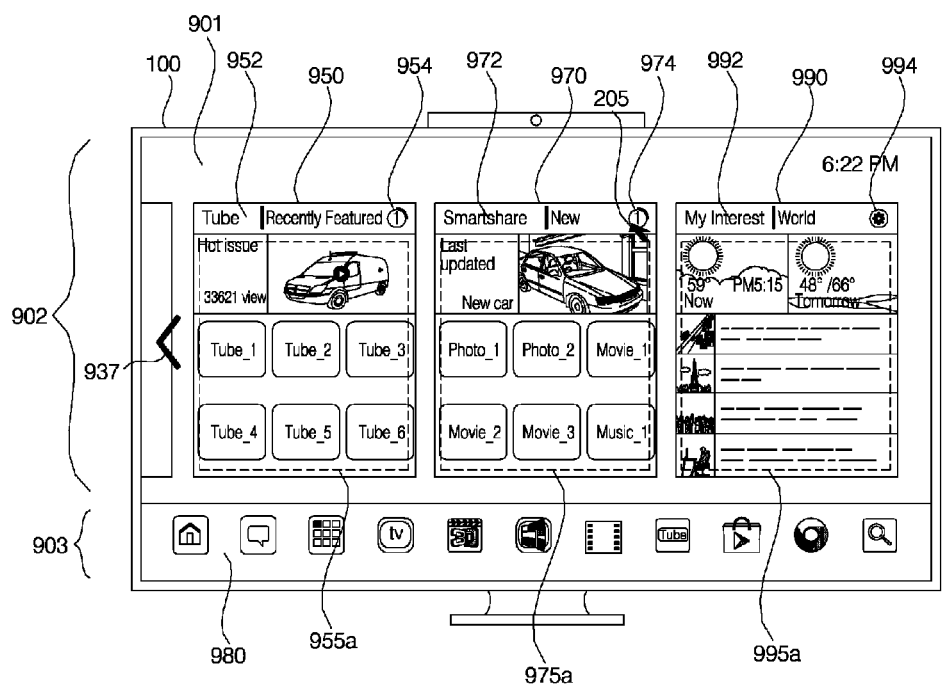
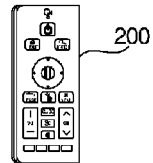

FIG. 9D
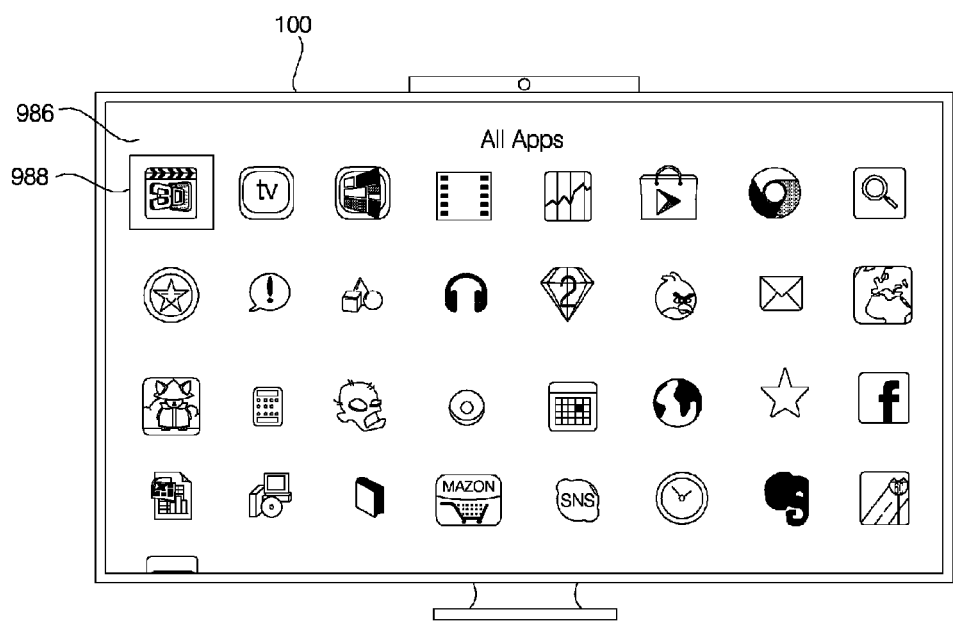
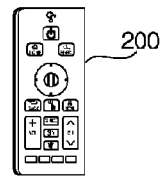

FIG. 9E
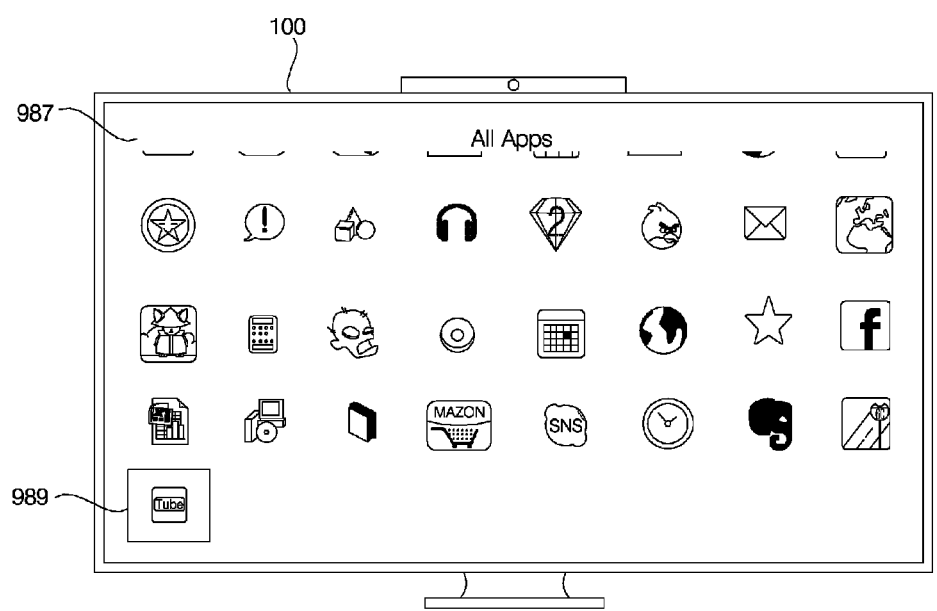
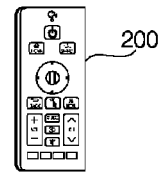

FIG. 9F
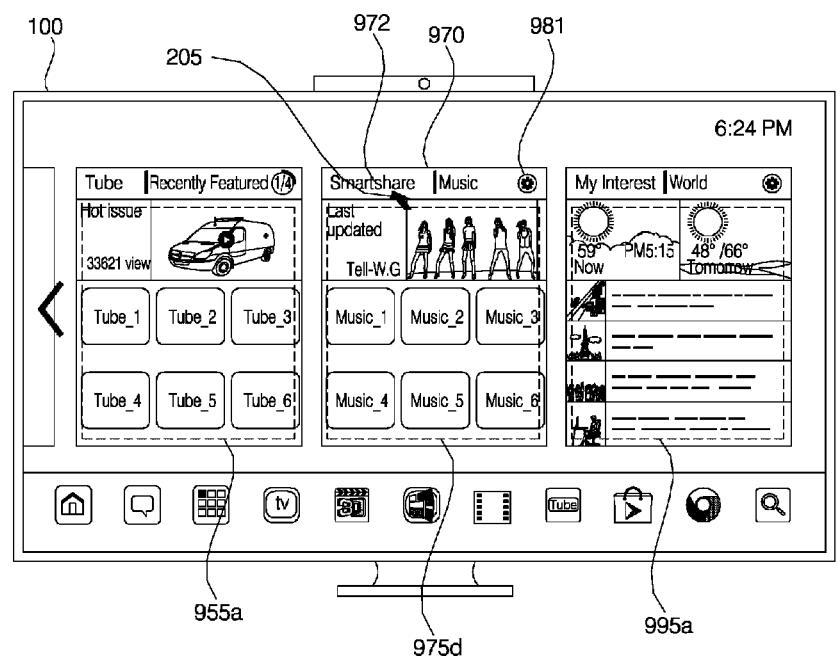
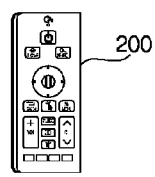

FIG. 9G
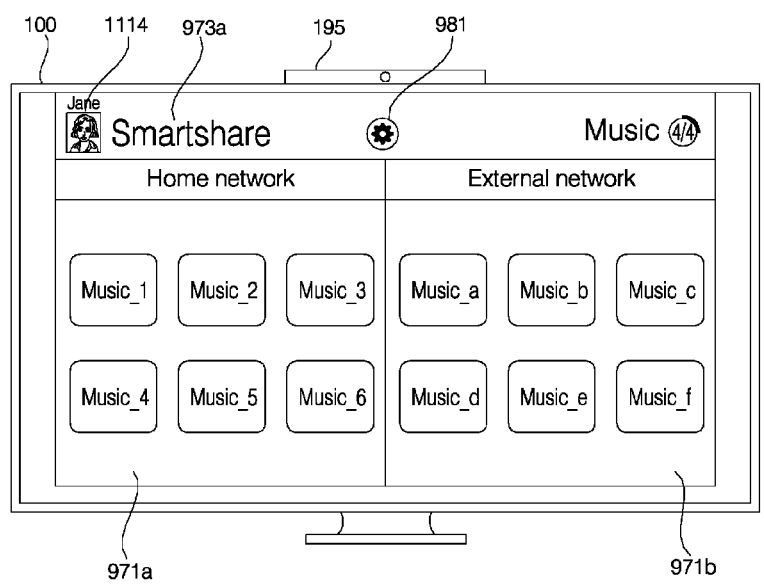
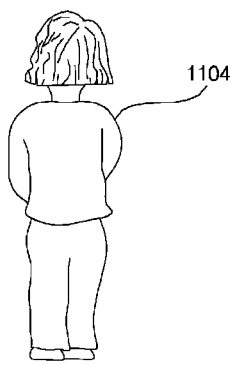

FIG. 9H
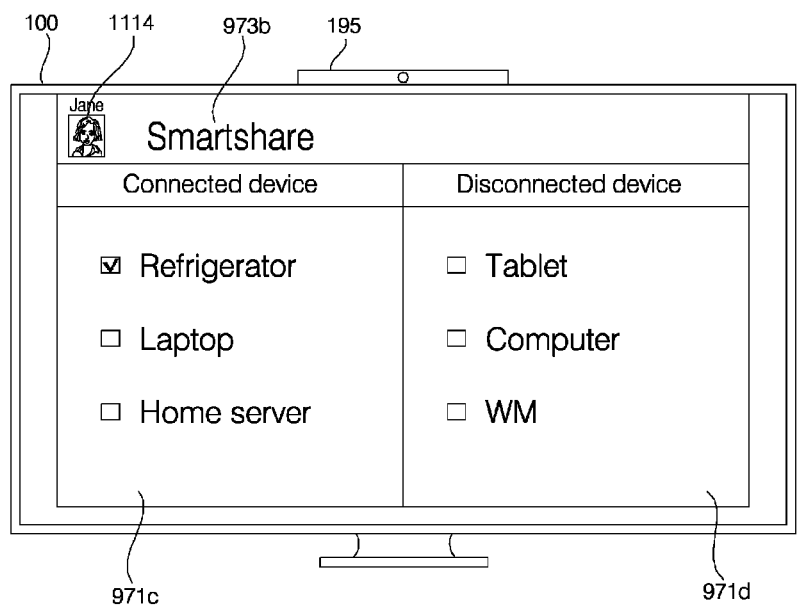
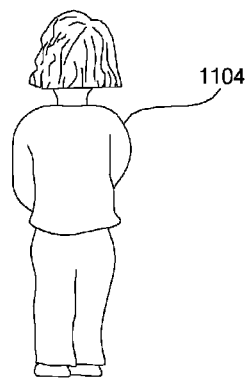

FIG. 10A
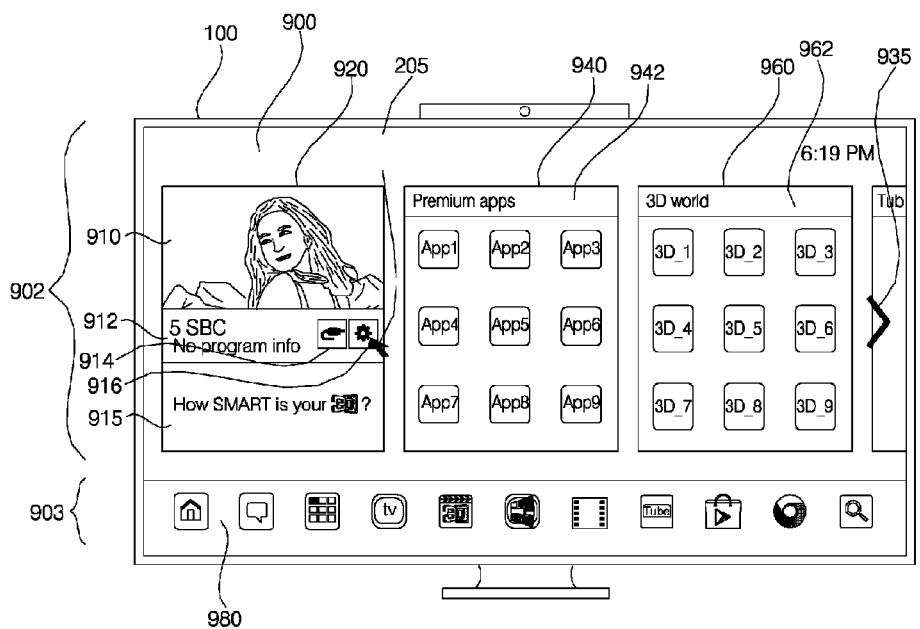
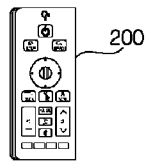

FIG. 10B
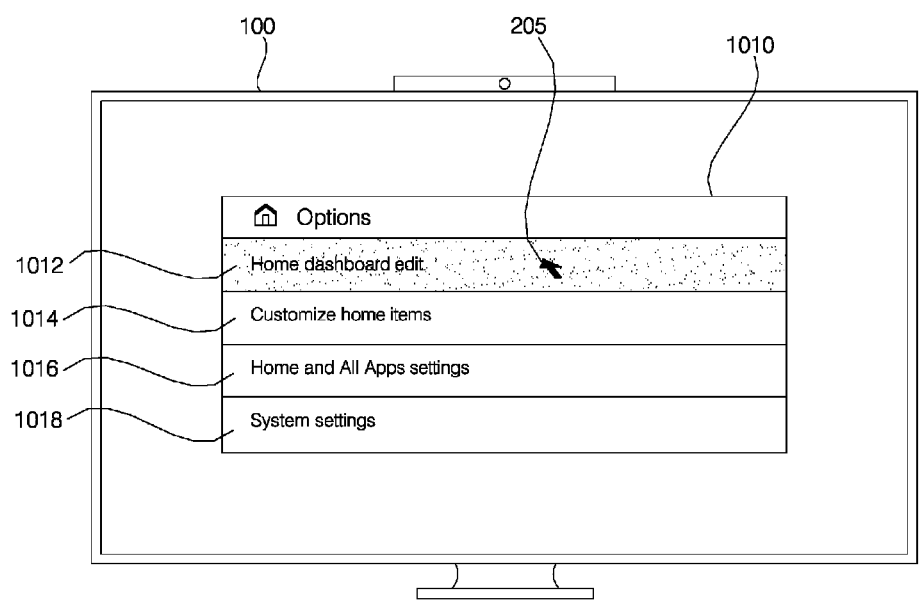
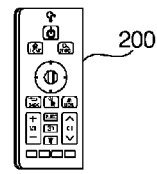

FIG. 10G
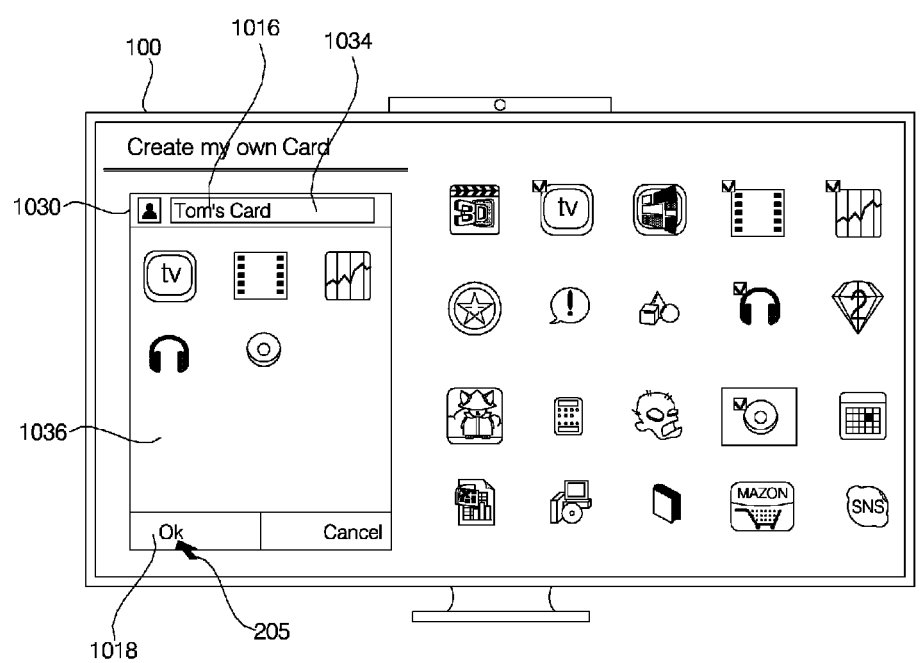
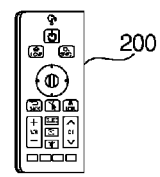

FIG. 10H
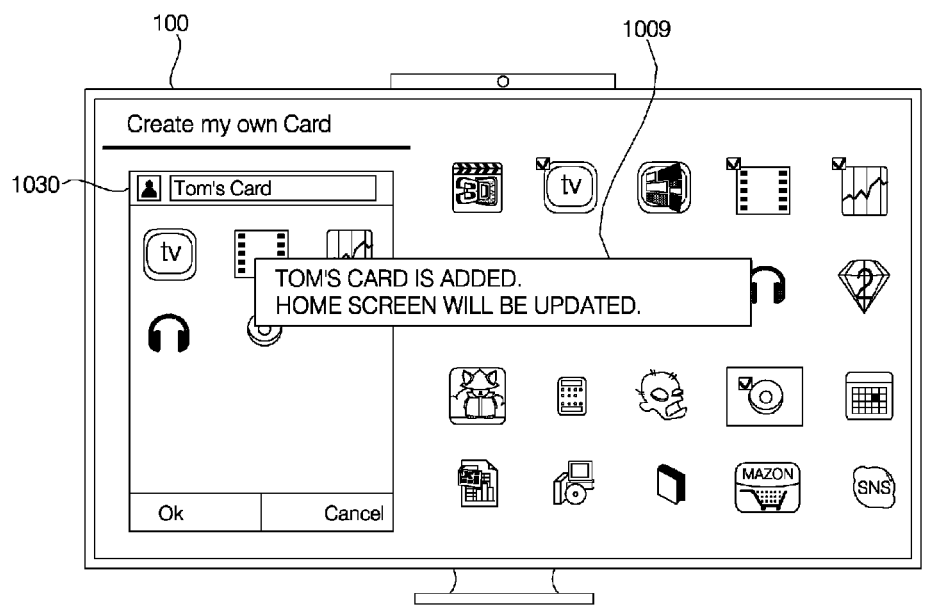
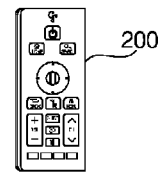

FIG. 10I
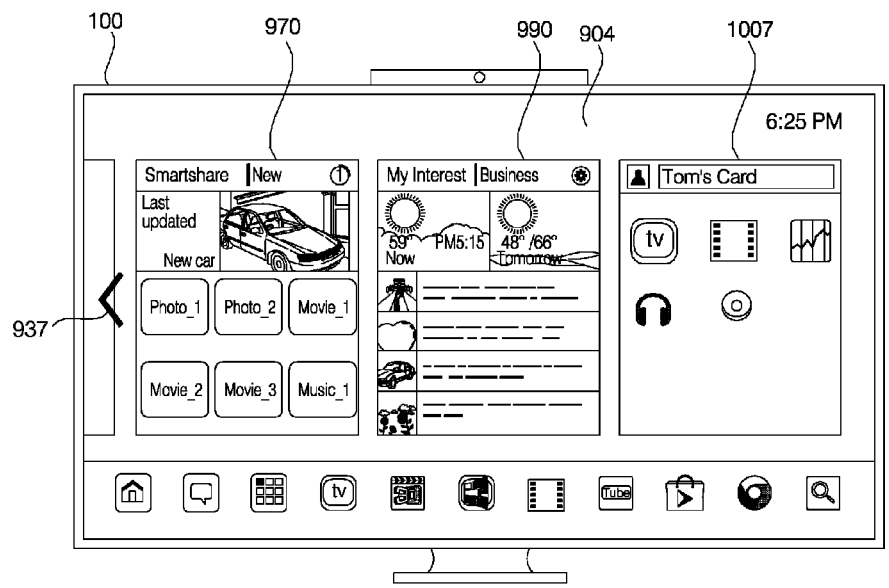
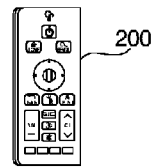

FIG. 10J
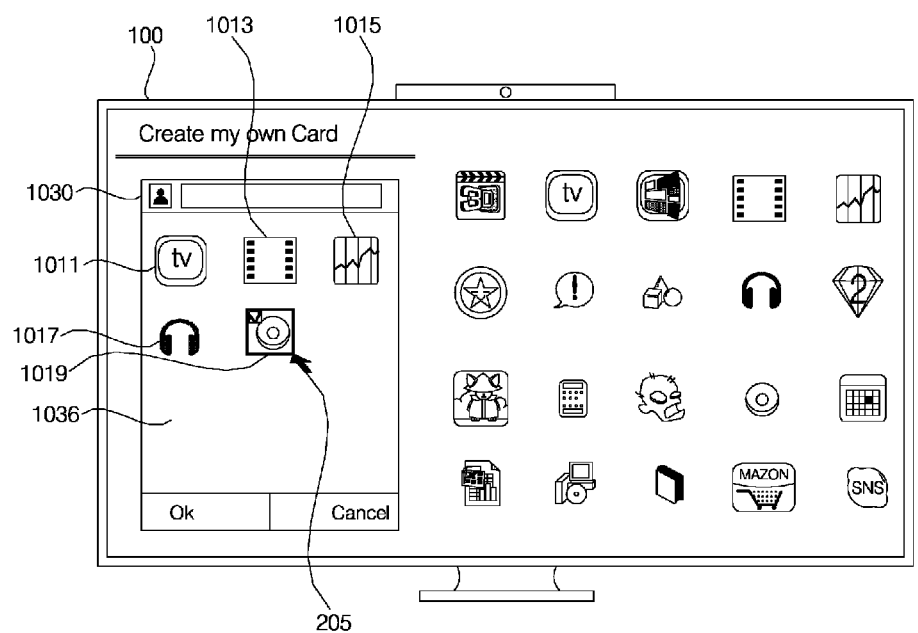
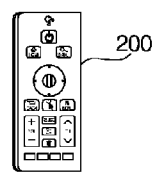

FIG. 10K
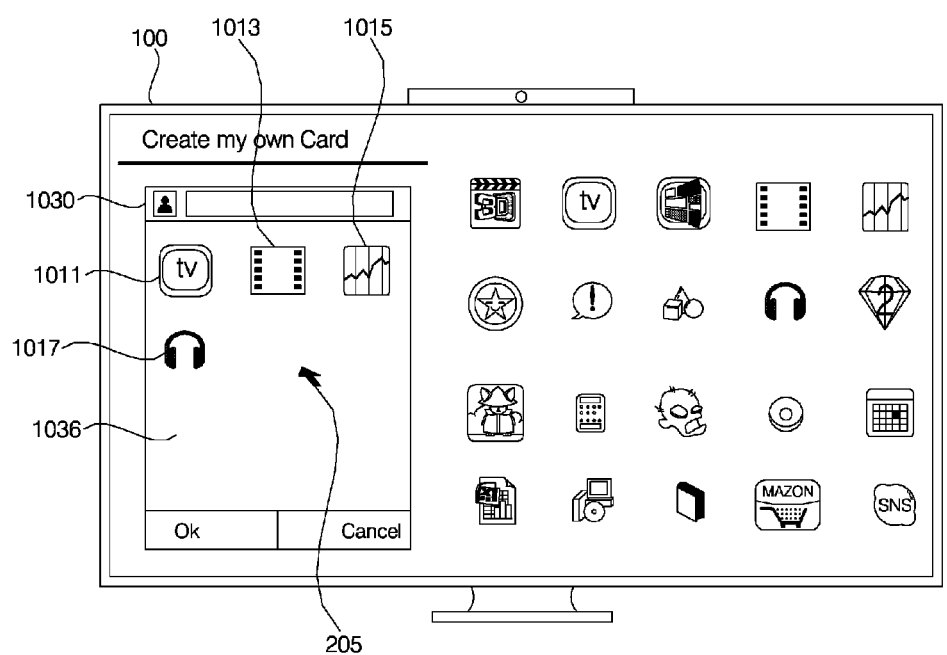
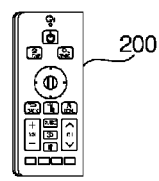

FIG. 10L
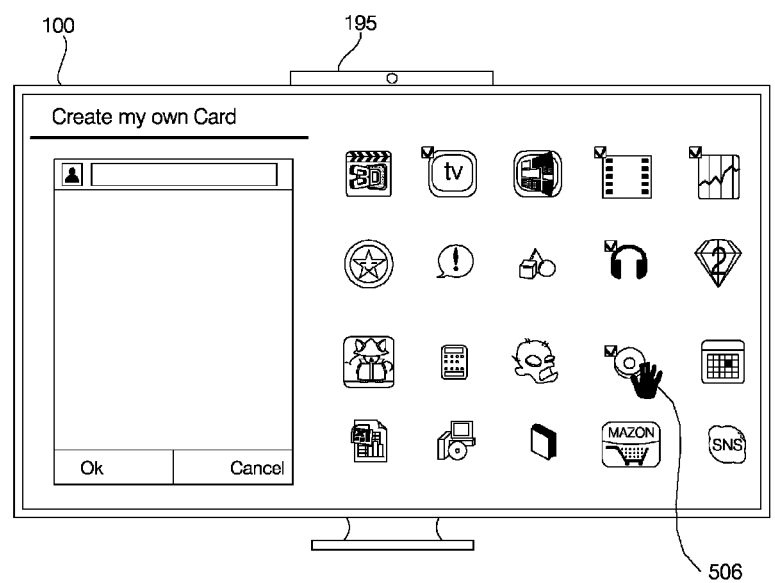
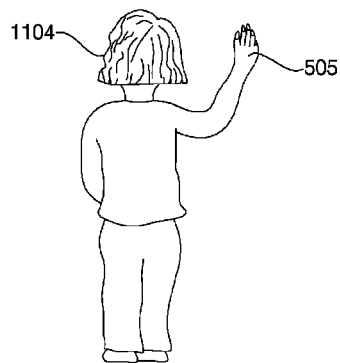

FIG. 10M
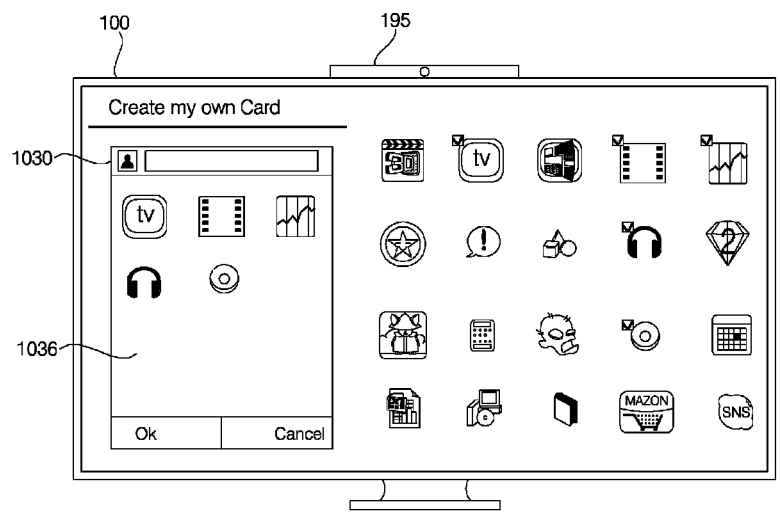
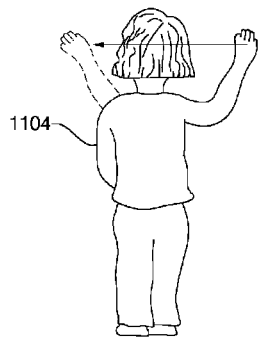

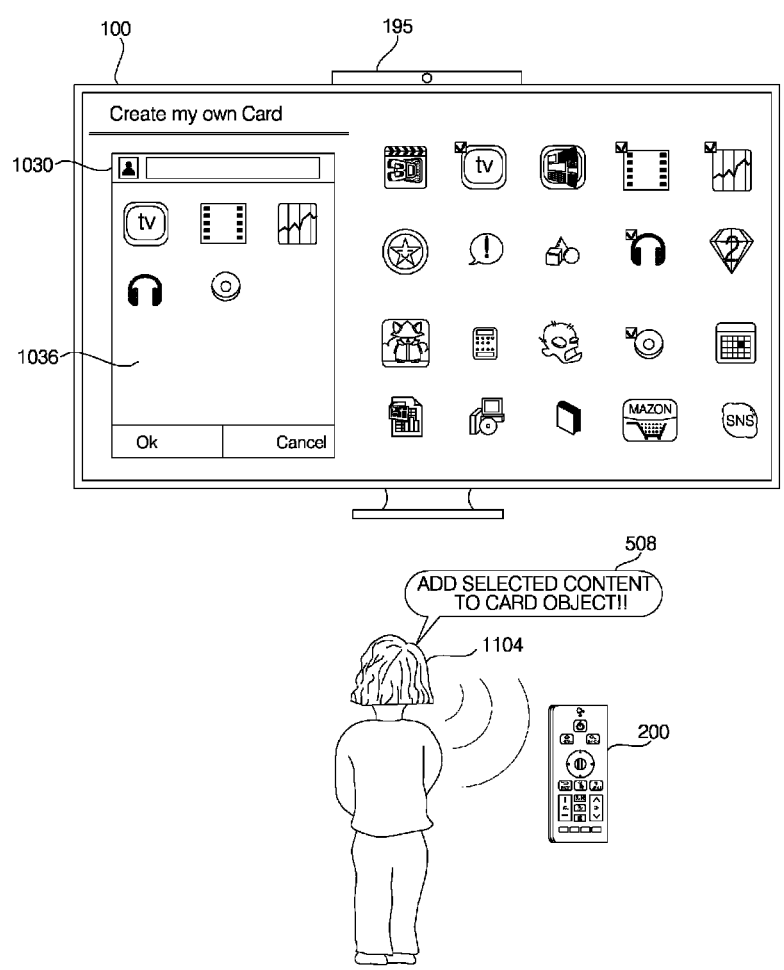

FIG. 11A
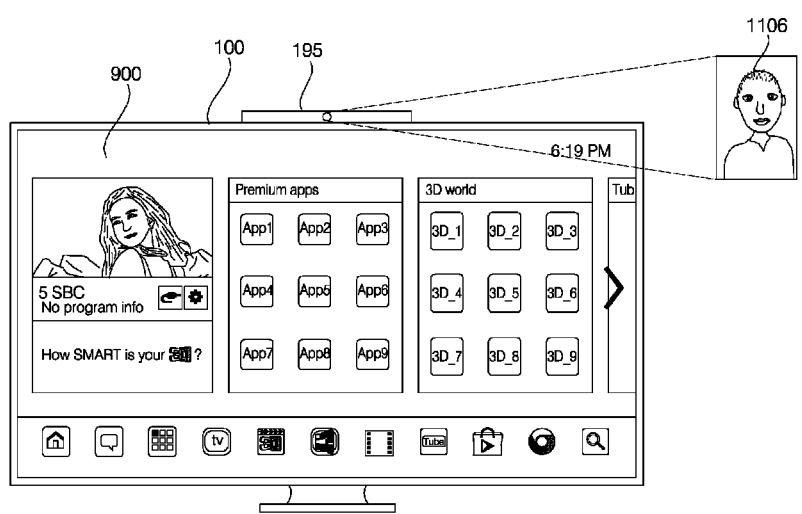
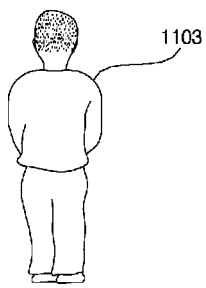

FIG. 11C
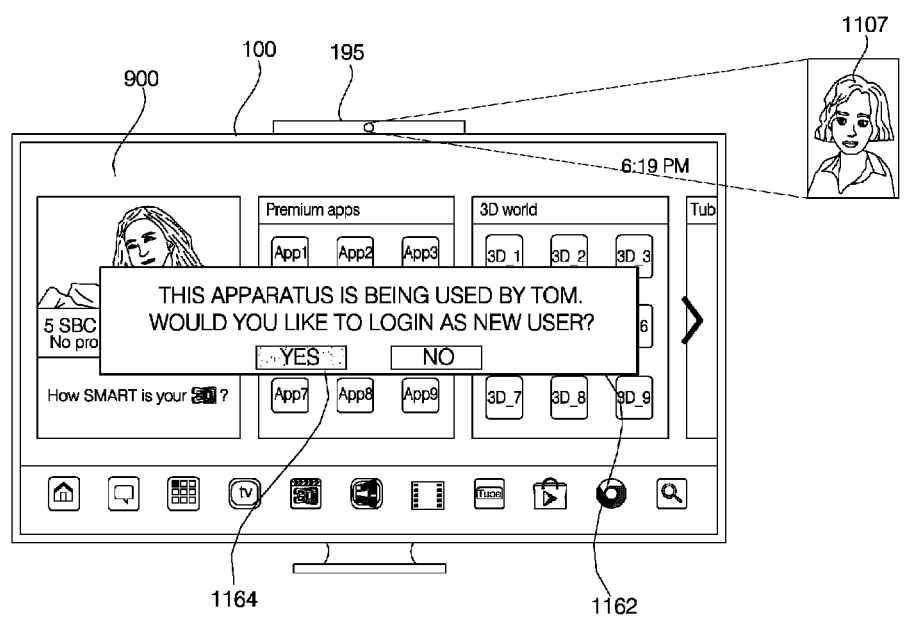
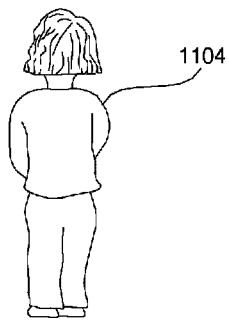

FIG. 11E
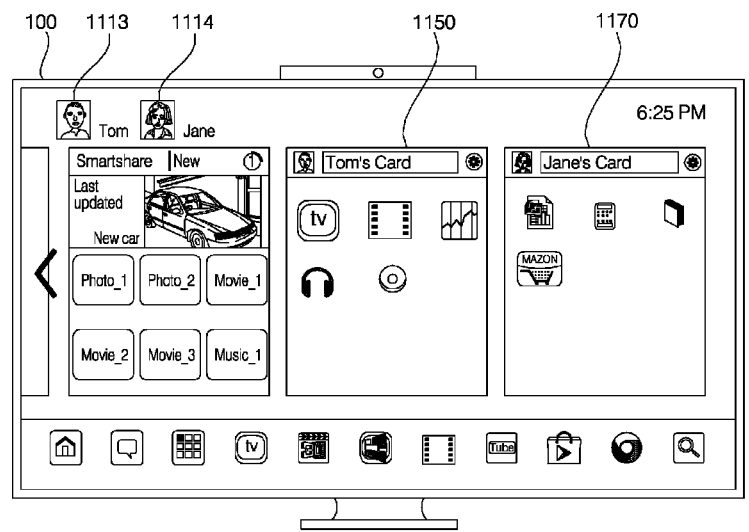
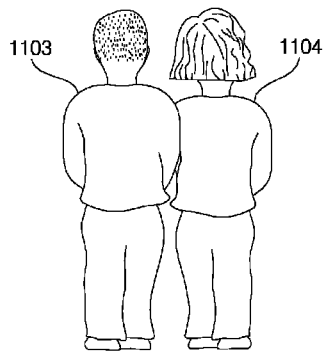

FIG. 12B
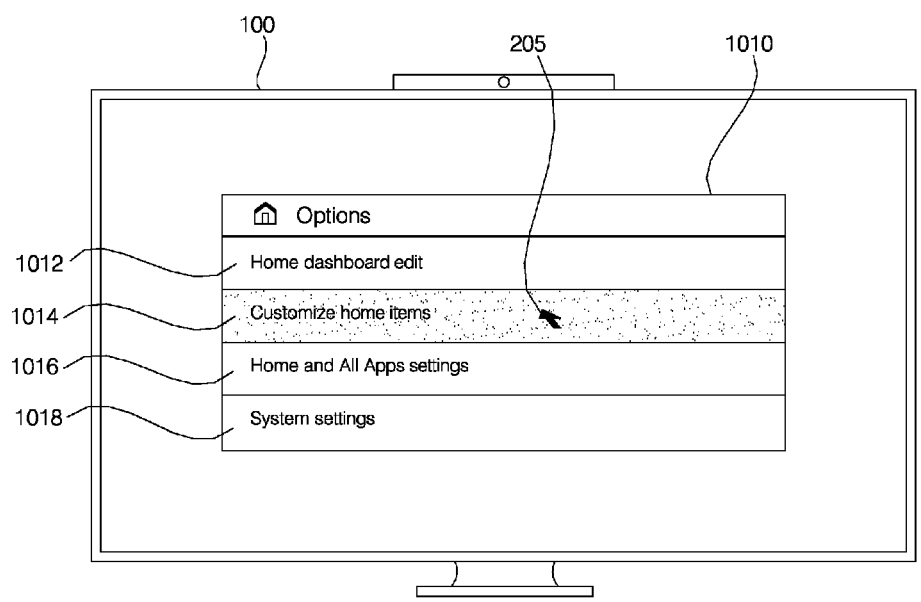
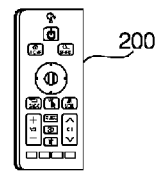

FIG. 12C
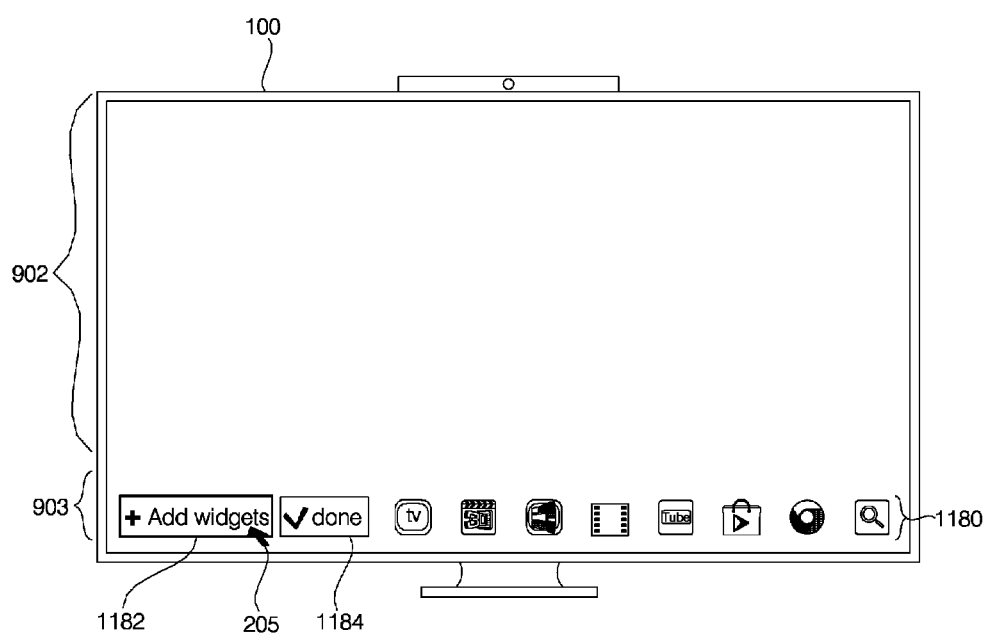
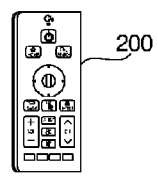

FIG. 13A
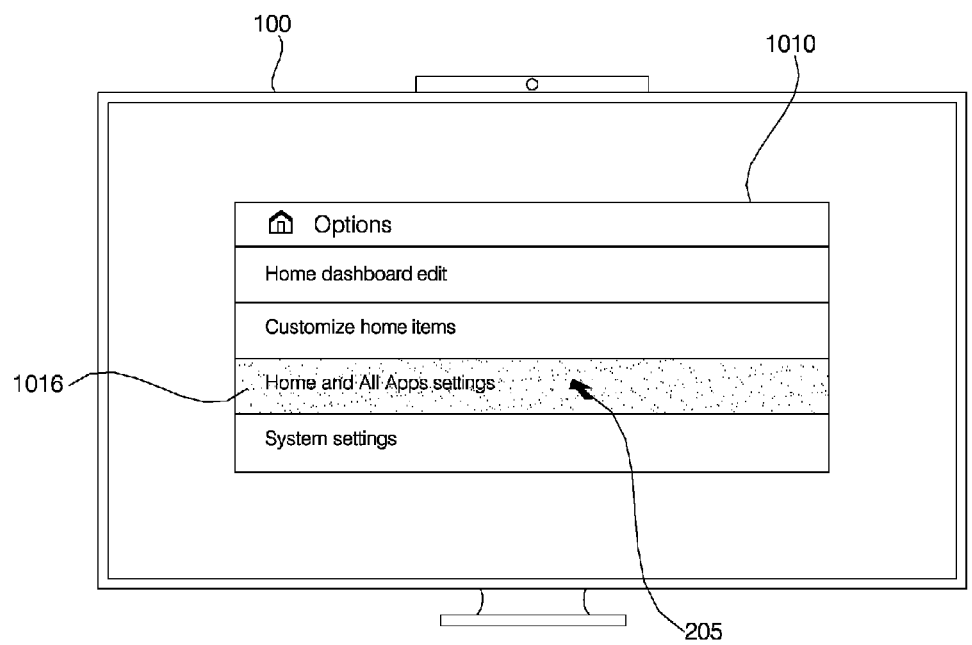
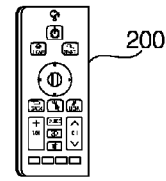

FIG. 13B
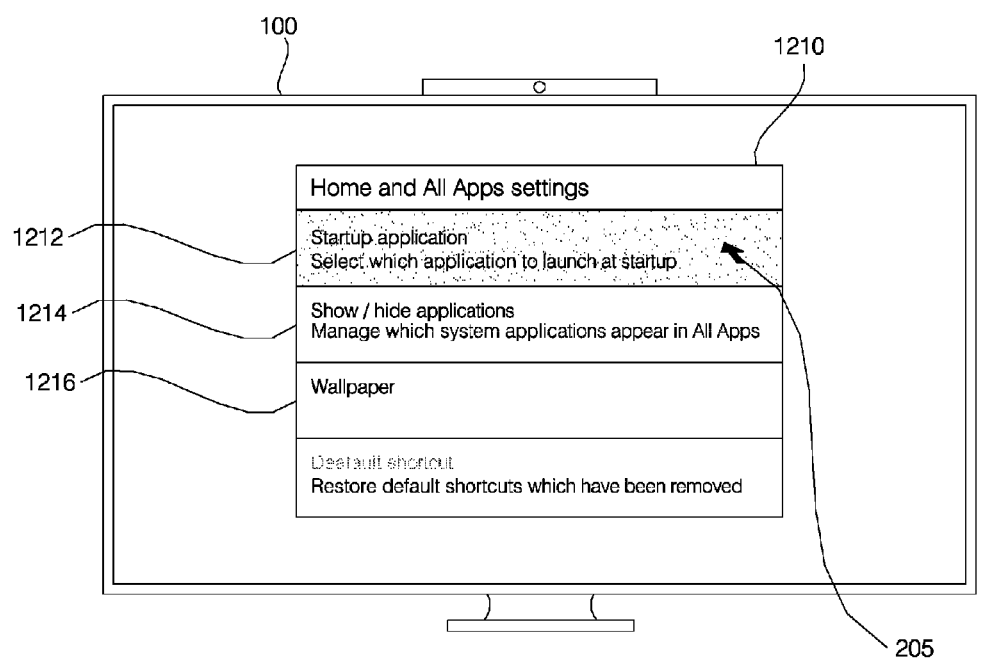
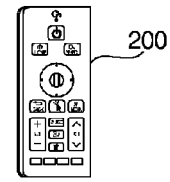

FIG. 13C
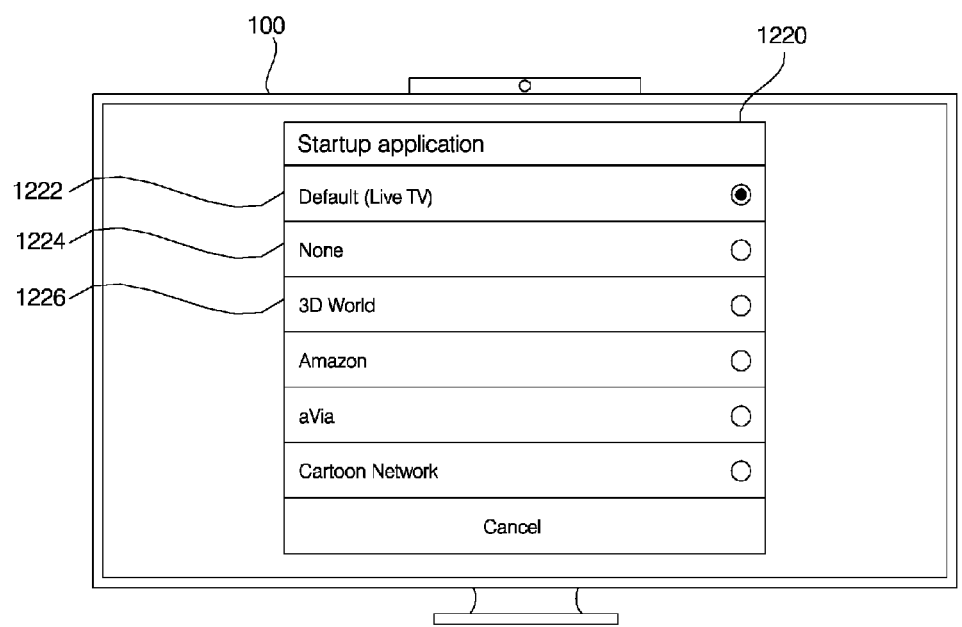
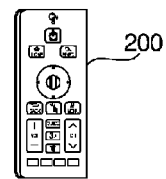

FIG. 13E
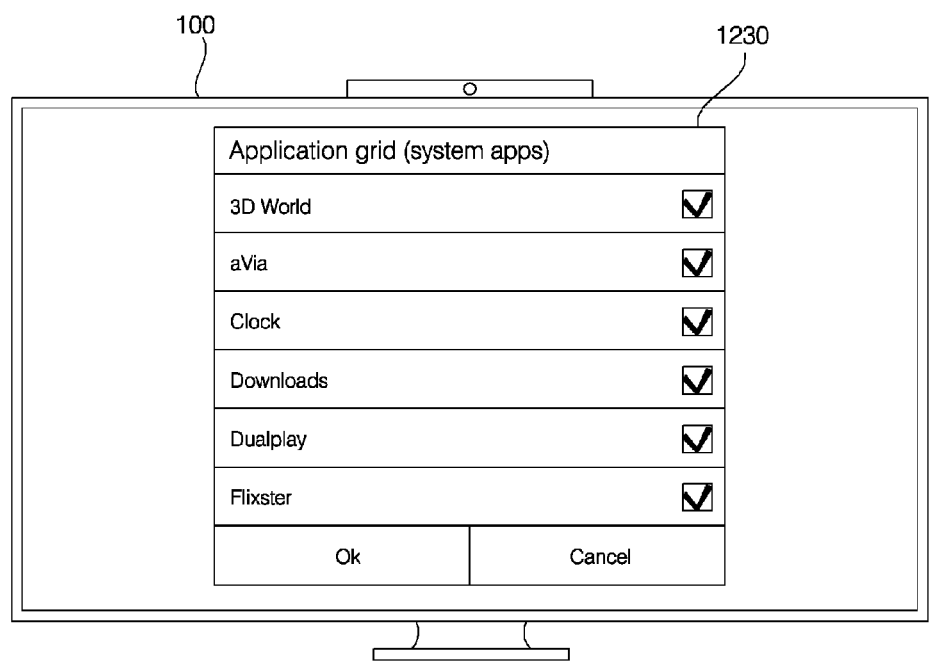
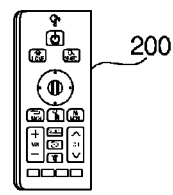

FIG. 13F
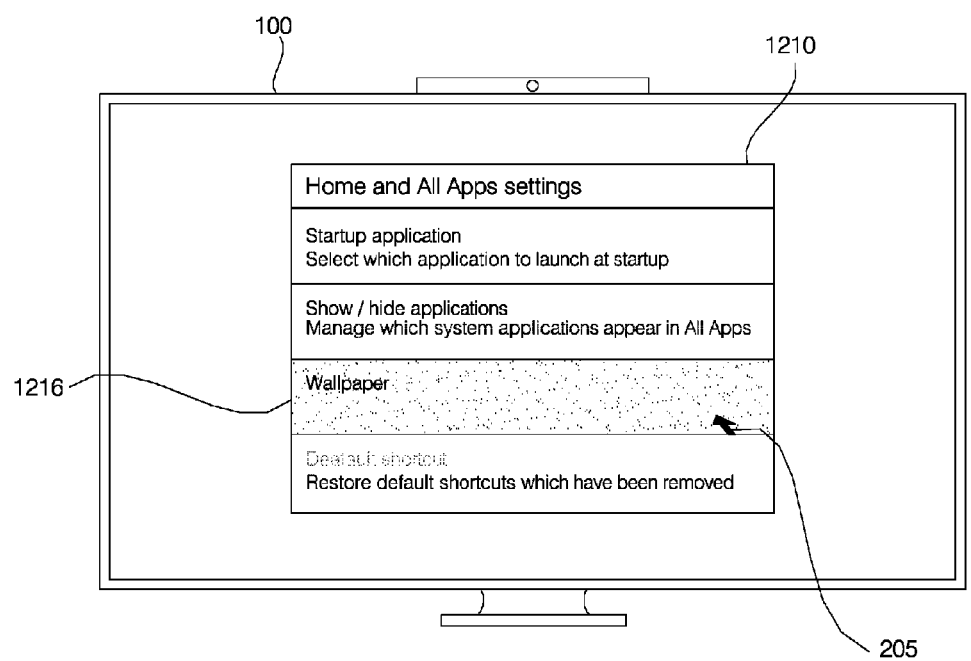
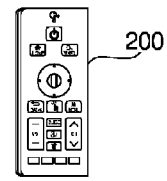

FIG. 13G
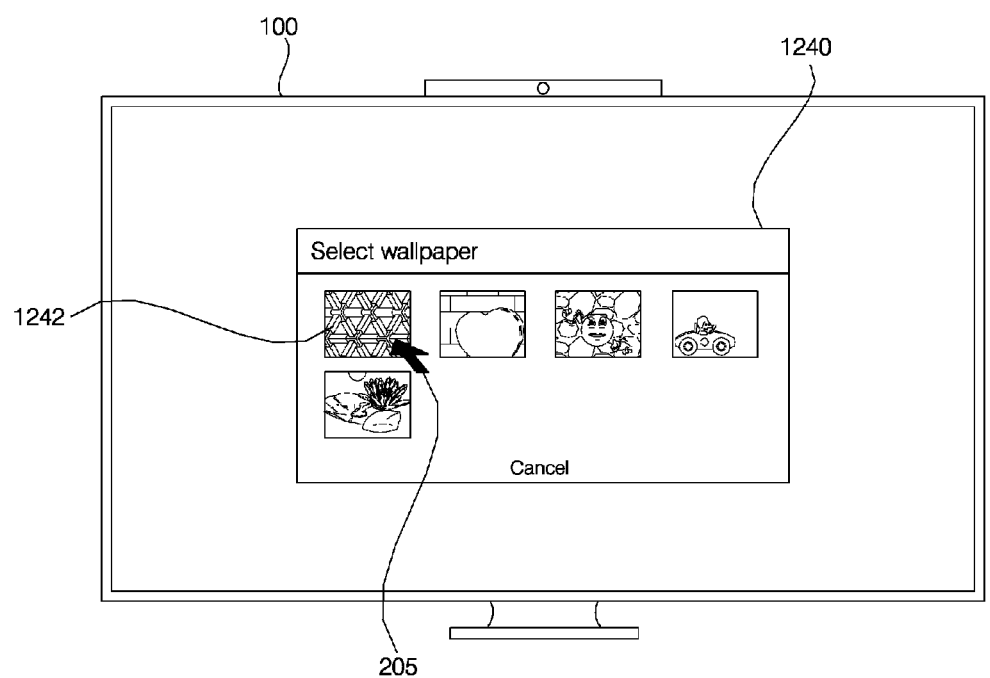
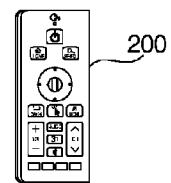

FIG. 13H
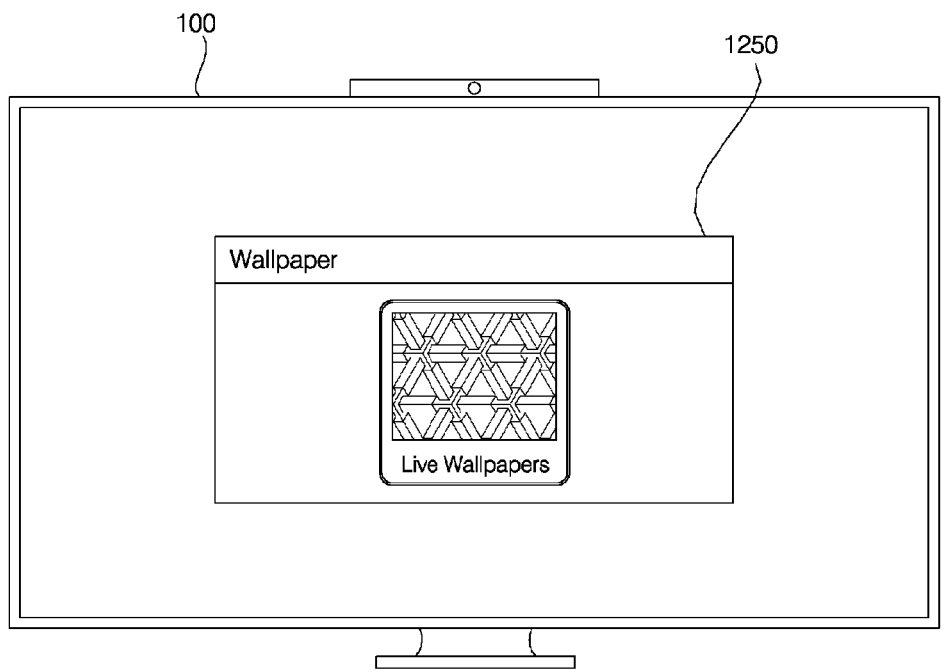
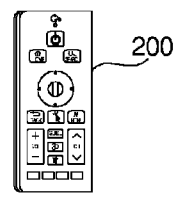

FIG. 14A
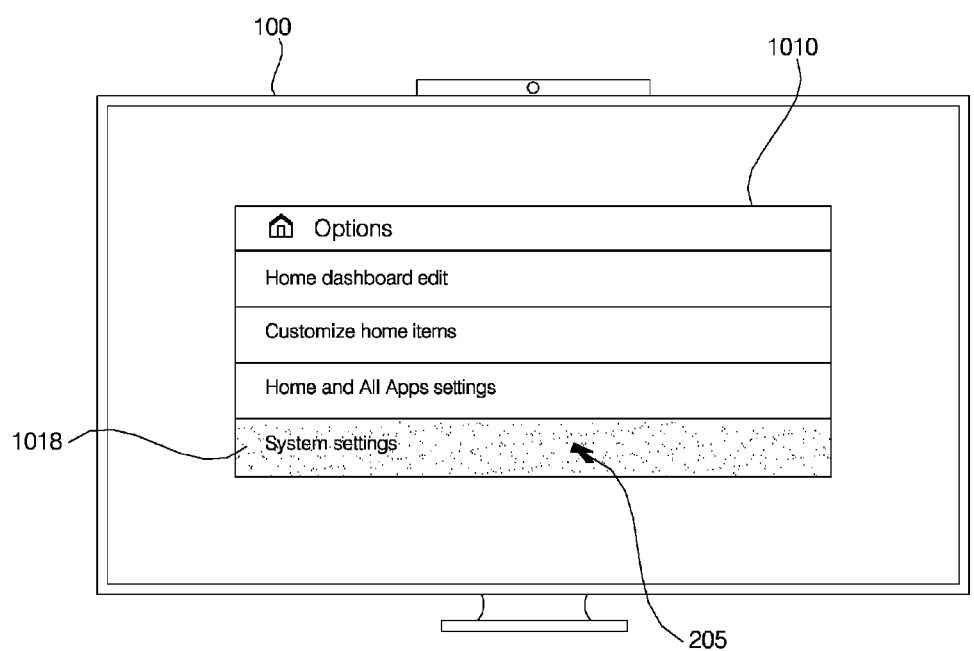
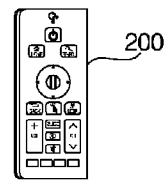

FIG. 14B
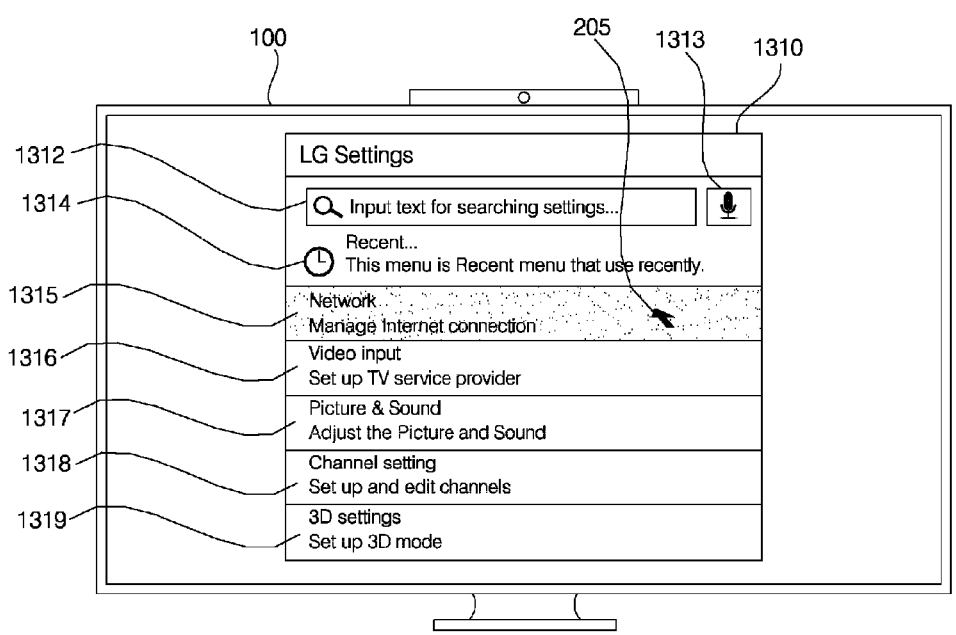
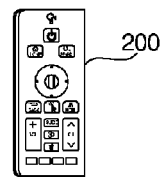

FIG. 16A
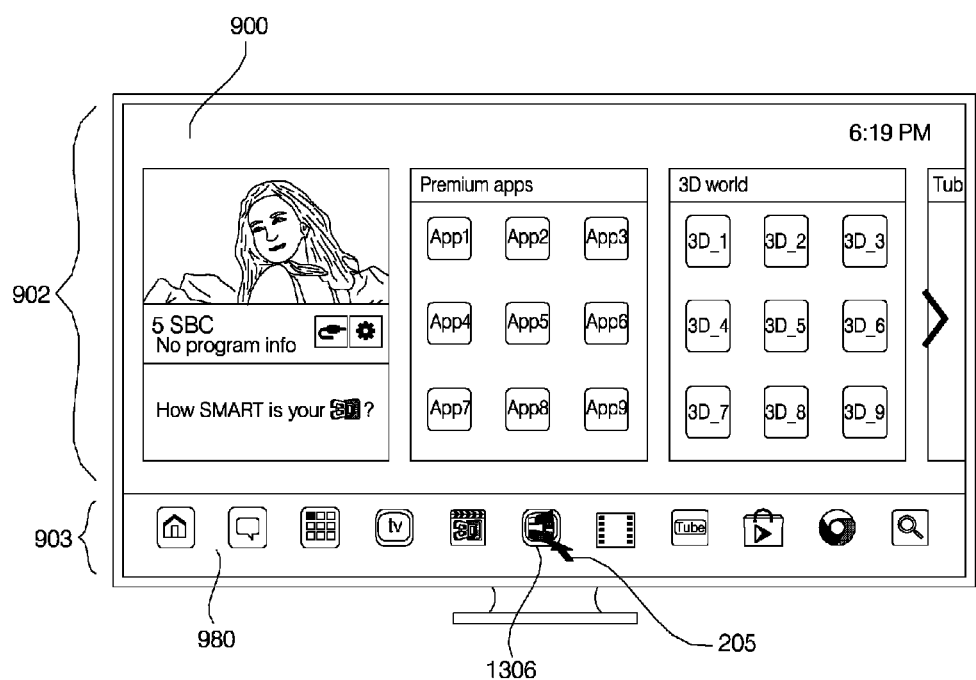
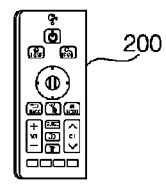

FIG. 16B
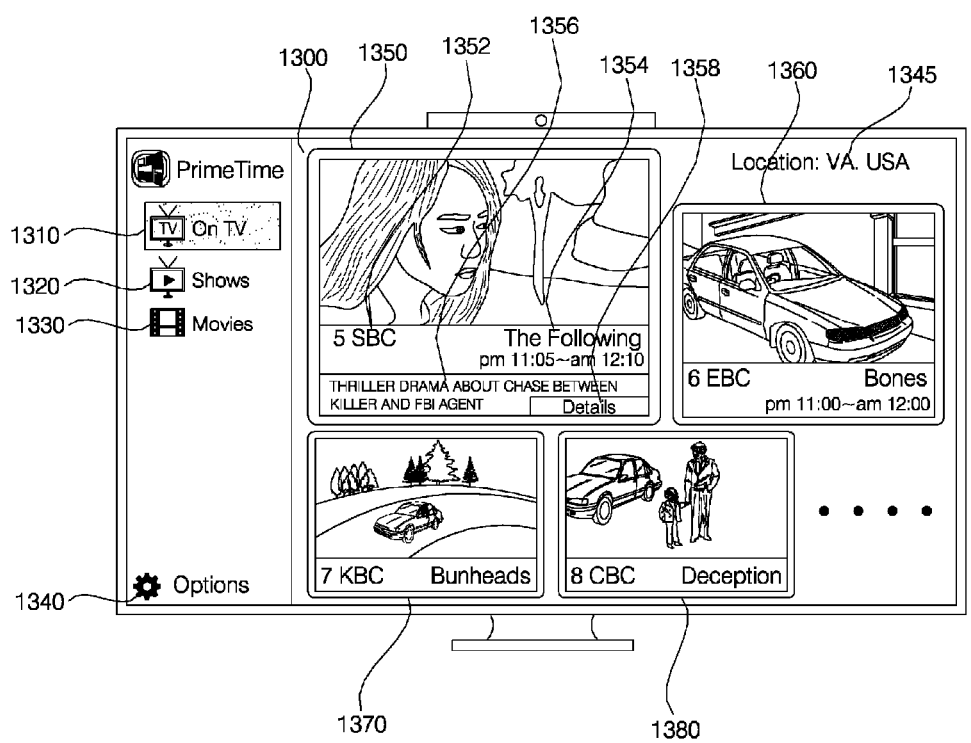
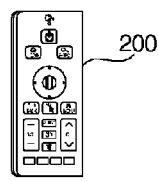

FIG. 16C
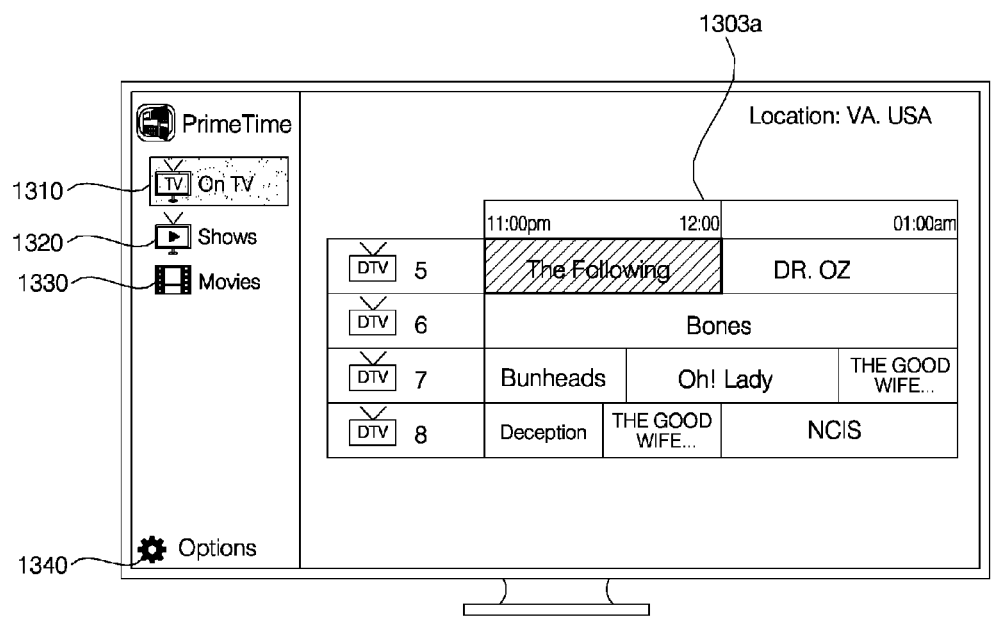
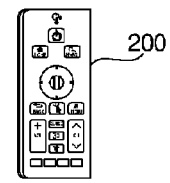

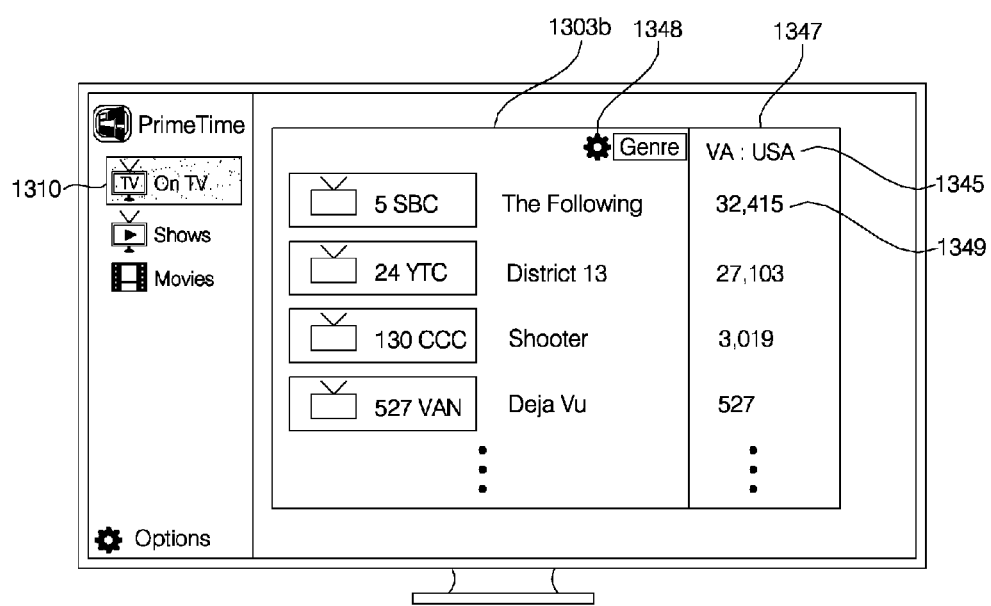
FIG. 16D
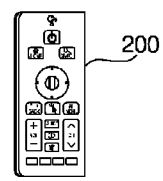

FIG. 16F
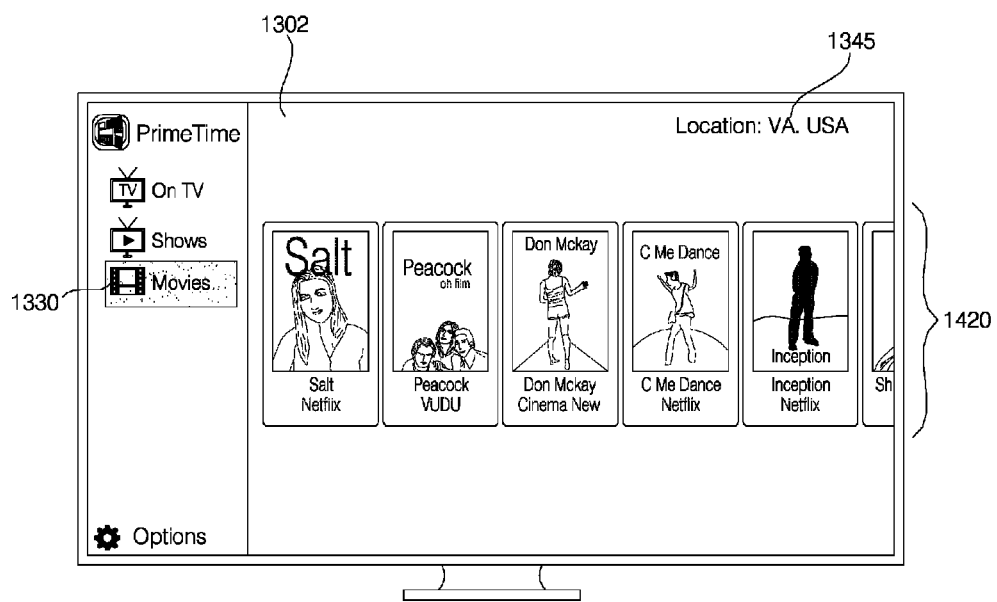
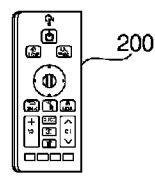

FIG. 16G
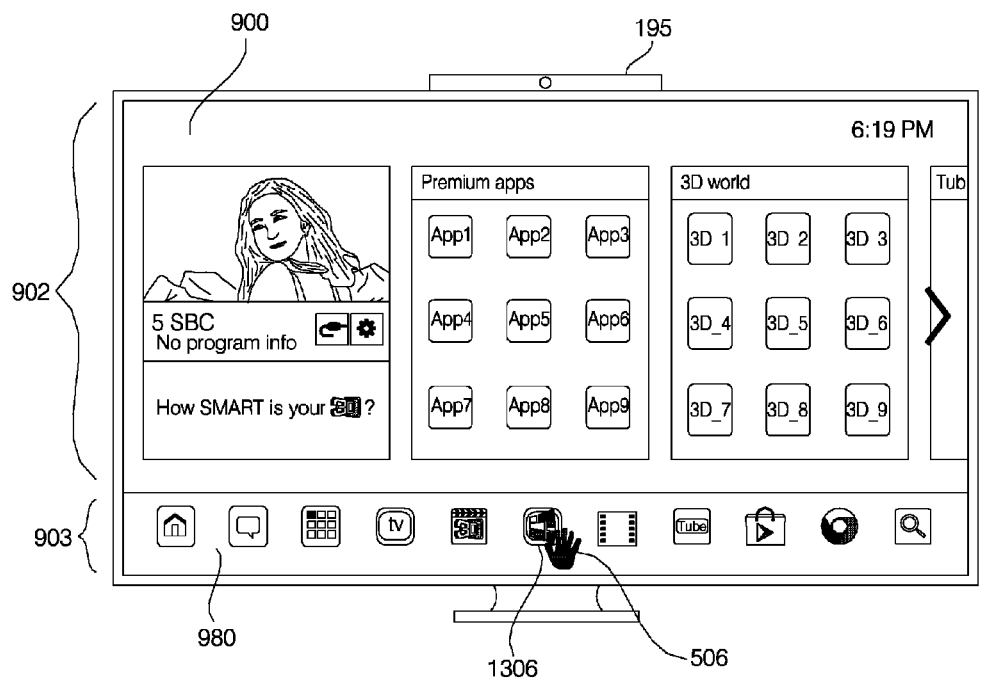
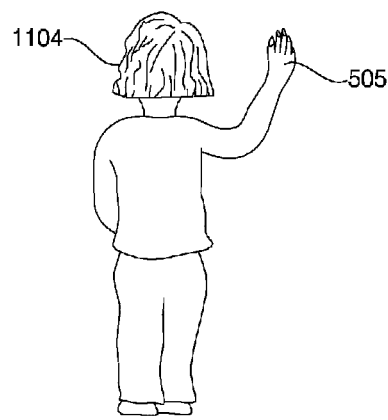

FIG. 16I
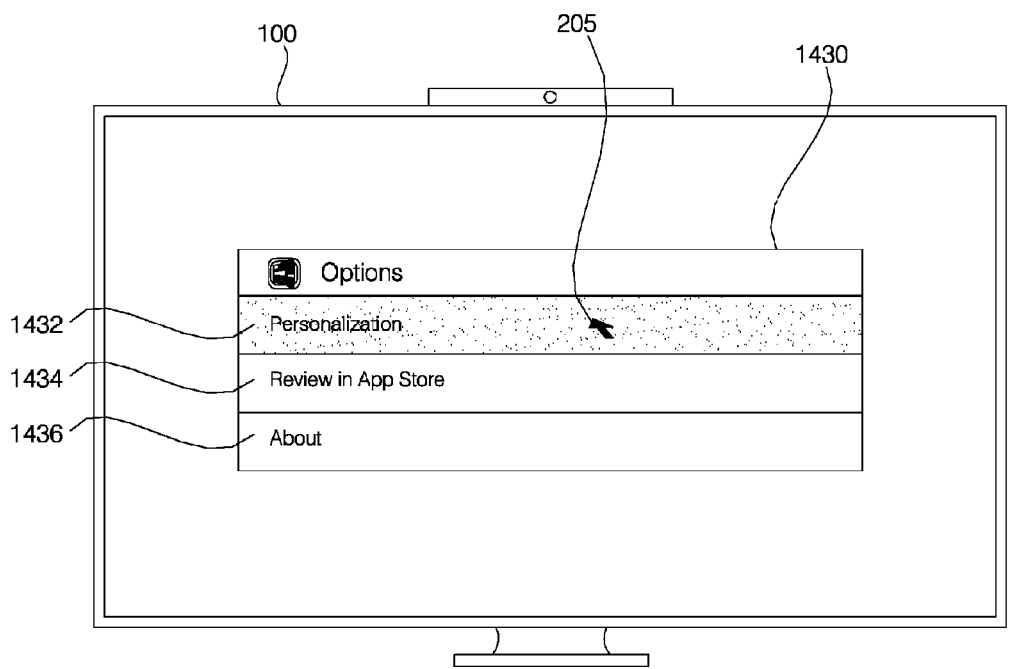
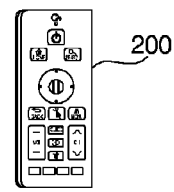

FIG. 16J
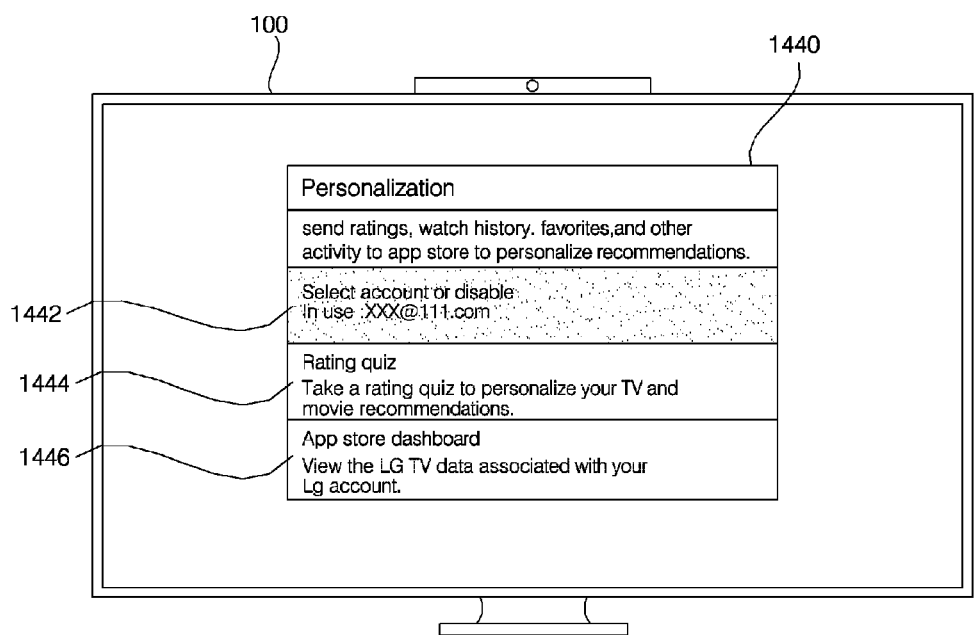
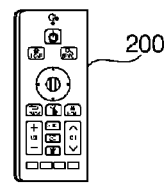

FIG. 17A
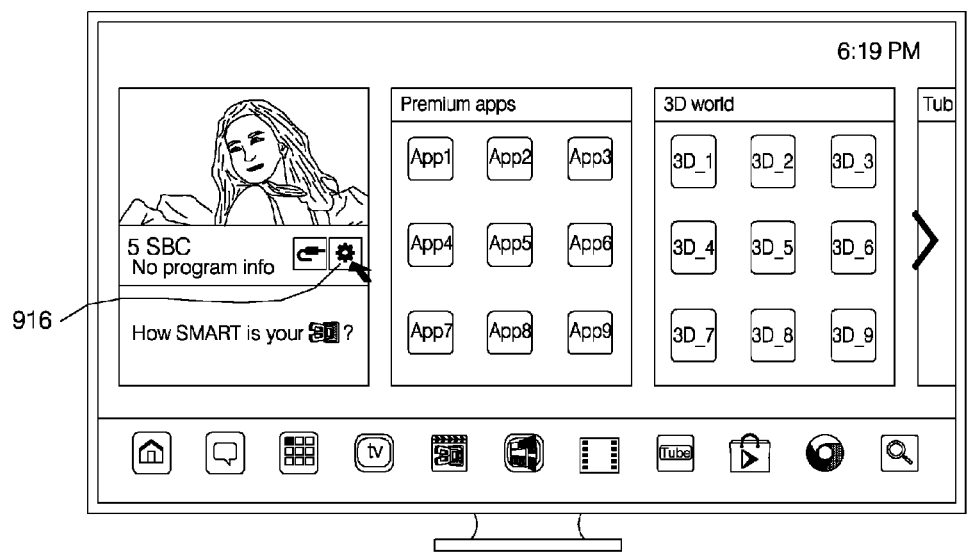
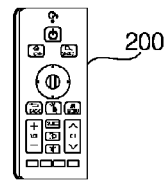

FIG. 17C
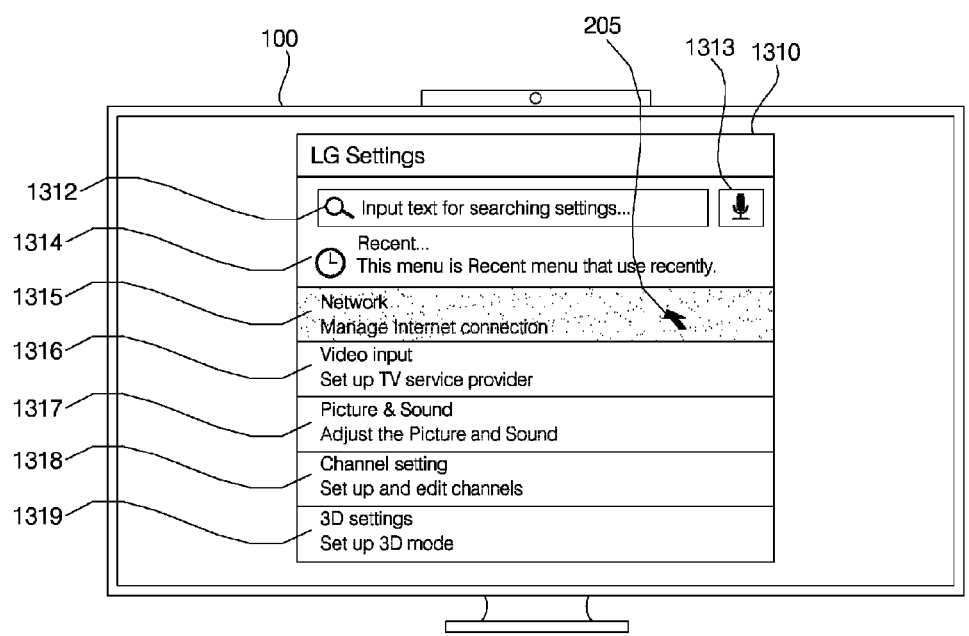
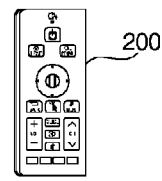

FIG. 18B
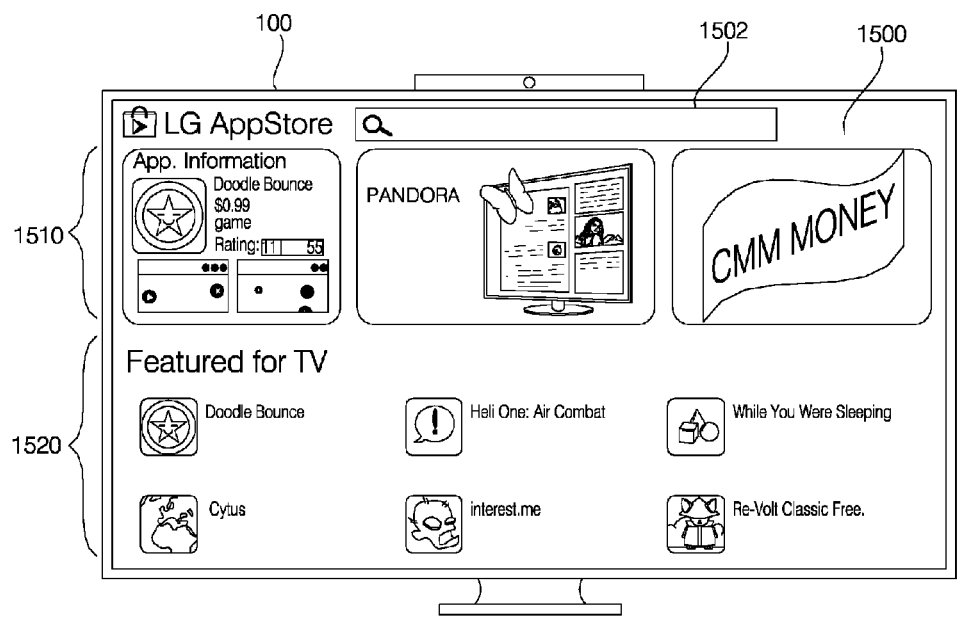
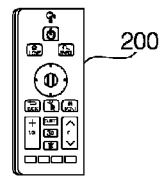

FIG. 18C
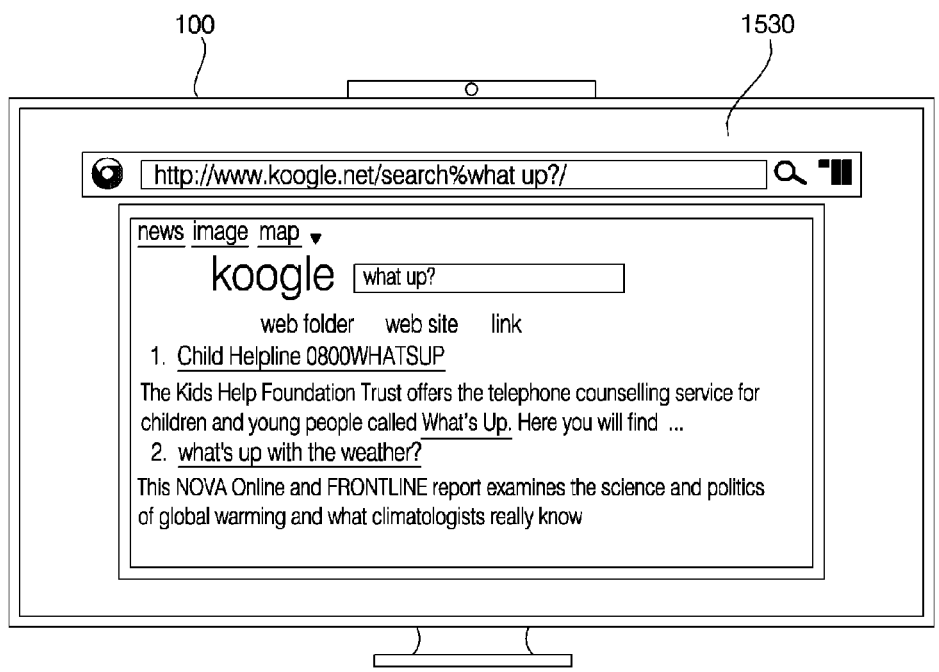
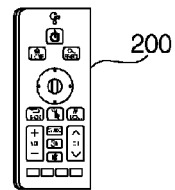

FIG. 19A
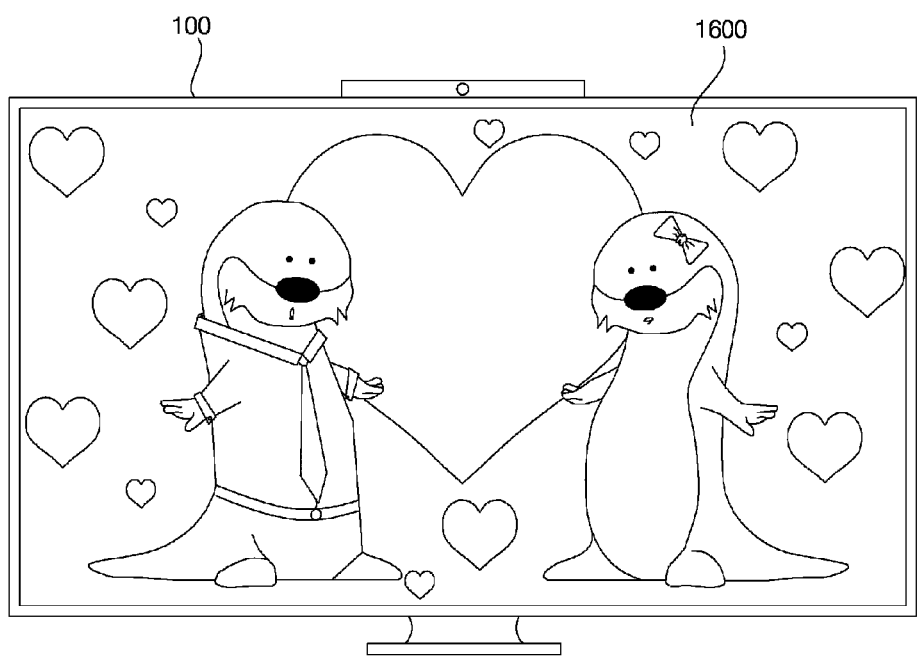
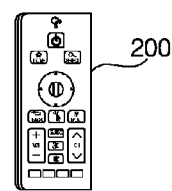

IMAGE DISPLAY APPARATUS AND METHOD FOR OPERATING THE SAME

CROSS-REFERENCE TO RELATED APPLICATION

This application claims the priority benefit of Korean Patent Application Nos. 10-2013-0011281 and 10-2013-0011282, filed on Jan. 31, 2013 in the Korean Intellectual Property Office, the disclosure of which is incorporated herein by reference.

BACKGROUND OF THE INVENTION

1. Field of the Invention

The present invention relates to an image display apparatus and a method for operating the same, and more particularly, to an image display apparatus and a method for operating the same, which are capable of increasing user convenience.

2. Description of the Related Art

An image display apparatus functions to display images to a user. A user can view a broadcast program using an image display apparatus. The image display apparatus can display a broadcast program selected by the user on a display from among broadcast programs transmitted from broadcasting stations. The recent trend in broadcasting is a worldwide transition from analog broadcasting to digital broadcasting.

Digital broadcasting transmits digital audio and video signals. Digital broadcasting offers many advantages over analog broadcasting, such as robustness against noise, less data loss, ease of error correction, and the ability to provide clear, high-definition images. Digital broadcasting also allows interactive viewer services, compared to analog broadcasting.

SUMMARY OF THE INVENTION

Therefore, the present invention has been made in view of the above problems, and it is an object of the present invention to provide an image display apparatus and a method for operating the same, which are capable of increasing user convenience.

In accordance with an aspect of the present invention, the above and other objects can be accomplished by the provision of a method for operating an image display apparatus including displaying a home screen including at least one card object including a content list, displaying a card object generation screen if card object generation input is received, and, if at least one content item displayed on the card object generation screen is selected, adding the selected content item to a card object to be generated.

In accordance with another aspect of the present invention, there is provided an image display apparatus including a network interface configured to exchange data with a server, a display configured to display a home screen including at least one card object including a content list and to display a card object generation screen if card object generation input is received, and a controller configured to, if at least one content item displayed on the card object generation screen is selected, add the selected content item to a card object to be generated.

BRIEF DESCRIPTION OF THE DRAWINGS

The above and other objects, features and other advantages of the present invention will be more clearly understood from the following detailed description taken in conjunction with the accompanying drawings, in which:

FIG. 1B is a diagram showing a first surface of a remote controller of FIG. 1a;

FIG. 1C is a diagram showing a second surface of the remote controller of FIG. 1a;

FIG. 8 is a flowchart illustrating a method for operating an image display apparatus according to an embodiment of the present invention;

FIGS. 9A to 14B are views referred to for describing various examples of the method for operating the image display apparatus of FIG. 8;

FIGS. 16A to 19B are views referred to for describing various examples of the method for operating the image display apparatus of FIG. 15.

DETAILED DESCRIPTION OF THE PREFERRED EMBODIMENTS

Exemplary embodiments of the present invention will be described with reference to the attached drawings.

The terms "module" and "unit" attached to describe the names of components are used herein to help the understanding of the components and thus they should not be considered as having specific meanings or roles. Accordingly, the terms "module" and "unit" may be used interchangeably.

An image display apparatus described in the present specification is, for example, an intelligent image display apparatus including not only a broadcast reception function but also a computer support function and includes a more conveniently used interface, such as a handwriting type input device, a touchscreen or a 3D pointing device, by adding an Internet function while accurately performing the broadcast reception function. In addition, the image display apparatus is connected to the Internet or a computer by a wired or wireless Internet module so as to perform functions such as email, web browsing, banking or games. For such various functions, a standardized general-purpose operating system (OS) may be used.

Accordingly, the image display apparatus of the present invention may perform various user-friendly functions because various applications may be freely added to or deleted from a general-purpose OS kernel. For example, the image display apparatus of the present invention may be a smart TV.

Figure 1A:
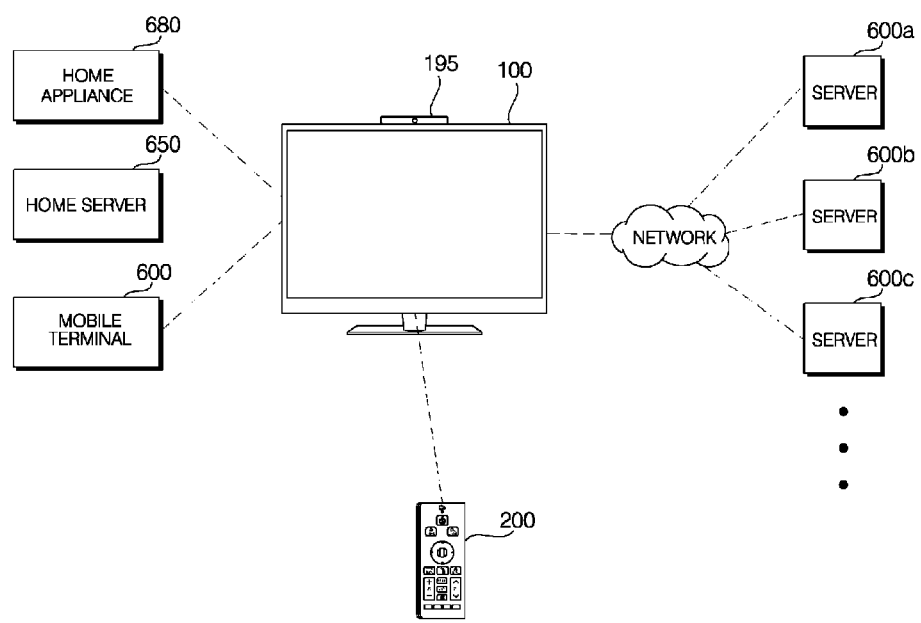
FIG. 1a is a diagram showing an image display apparatus according to an embodiment of the present invention.
Figure 1B:
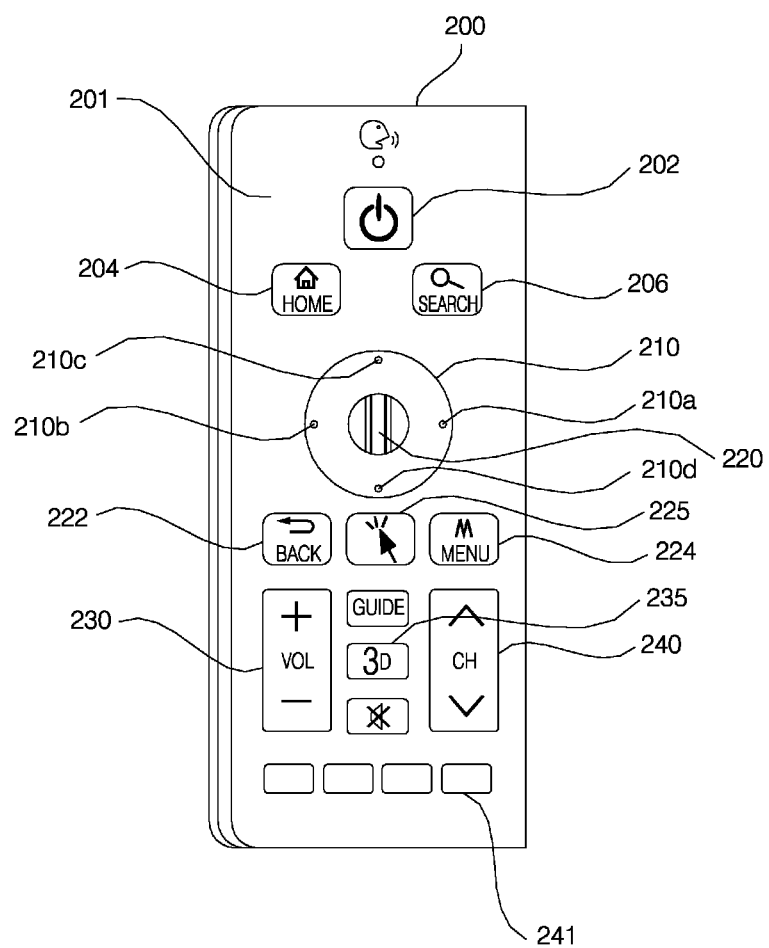

FIG. 1a is a diagram showing an image display apparatus according to an embodiment of the present invention;

Referring to FIG. 1a, the image display apparatus 100 according to the embodiment of the present invention displays an image and includes a display (180 of FIG. 1B). The image display apparatus 100 may include a camera 195 for capturing an image of a user.

Although a camera 195 is placed on an upper side of the image display apparatus 100 in FIG. 1a, the camera may be placed at various locations. Unlike FIG. 1a, the image display apparatus 100 and the camera may be mounted as separate devices.

The image display apparatus 100 may exchange data with an external device over a network.

The image display apparatus 100 may exchange data with adjacent external devices, such as a home appliance 670, a home server 650, a mobile terminal 600, etc. or may share predetermined content data with the adjacent external devices. The home appliance 670 may include a set-top box, audio equipment, a refrigerator, a cleaner, an air conditioner, a washing machine, a cooker, etc.

The image display apparatus 100 may exchange data with external servers 600a, 600b, 600c, . . . over a network 690. The external serves 600a, 600b, 600c, . . . may be content providers for providing a variety of content.

Unlike the figure, the image display apparatus 100 may exchange data with the mobile terminal 600 over the network 690.

The image display apparatus 100 may operate in correspondence with a remote control signal from a remote controller 200. The image display apparatus 100 and the remote controller 200 may exchange data through a pairing operation.

In particular, the image display apparatus 100 according to the embodiment of the present invention may display a pointer corresponding to movement of the remote controller 200 or display letters by pressing a letter key of the remote controller 200, by data exchange.

The image display apparatus 100 described in the present specification may include a TV receiver, a monitor, a projector, a laptop computer, a digital broadcast terminal, etc.

The image display apparatus 100 according to the embodiment of the present invention displays an image and may include a fixed image display apparatus or a mobile image display apparatus.

Figure 1C:
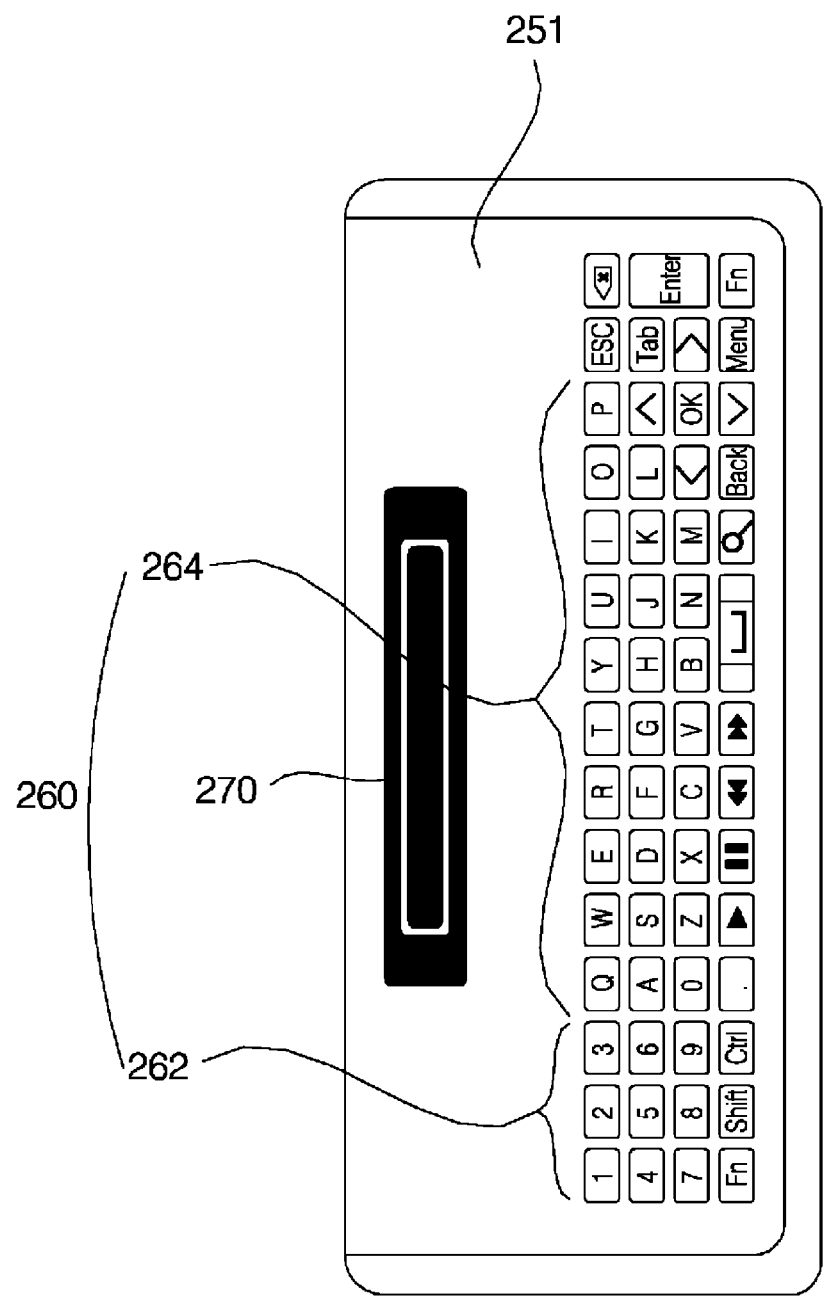

FIG. 1B is a diagram showing a first surface of a remote controller of FIG. 1a, and FIG. 1C is a diagram showing a second surface of the remote controller of FIG. 1a.

First, referring to FIG. 1B, operation keys such as a power key 202 may be placed on the first surface (front surface) 201 of the remote controller.

The various operation keys will now be described. The power key 202 is used to turn the image display apparatus 100 on/off. A home key 204 is used to display a home screen if the home screen of the image display apparatus 100 is set. A search key 206 may be used to display a search window on the image display apparatus 100 or to search by keyword.

Four-direction keys 210 are used to move a pointer or a cursor up, down, right and left and an up key 210c, a down key 210d, a left key 210b and a right key 210a may be integrally formed. A wheel key 220 may be placed in the center of the four-direction keys 210.

The wheel key 220 is used to move a screen or an item displayed on the image display apparatus 100. The wheel key 220 may move up and down and thus the screen or the item of the image display apparatus 100 may move up and down.

A back key 222 is used to move a screen or an item displayed on the image display apparatus 100 to a previous screen or a previous item. A menu key 224 is used to display a set menu of the image display apparatus 100. A pointer key 225 is used to display a pointer on the image display apparatus 100.

A volume key 230 is used to change a volume and a channel key 240 is used to switch a channel.

A 3D key 235 may be used to switch a two-dimensional (2D) image displayed on the image display apparatus 100 to a three-dimensional (3D) image or may be used to display a 3D image list which is able to be displayed on the image display apparatus 100.

A PIP key 241 is used to display a plurality of images on the image display apparatus 100. By manipulating the PIP key 241, a plurality of images may be displayed on the display 180 in a picture in picture (PIP) manner. Alternatively, a plurality of images may be arranged in parallel.

Any one of a plurality of images may float such that the location of the image is changed. In this case, a PIP image may be referred to as a dynamic screen image.

In the figure, a pointer key for displaying a pointer, a guide key for displaying a guide, a mute key, a color key, etc. are further displayed.

Next, referring to FIG. 1C, a second surface (back surface) 251 of the remote controller 200 may be opposite to the first surface (front surface) 201 of the remote controller 200. A letter key 260 and a display 270 may be placed on the second surface (back surface) 251 of the remote controller 200.

The letter key 260 may include a numeric key 262 and an alphabetic key 264. The letter key 260 may further include an enter key, a function key, a spacebar key, etc.

The display 270 may display letters input through the letter key 260.

If the letter key 260 is manipulated, the remote controller 200 transmits letter key information to the image display apparatus 100.

The remote controller 200 may transmit coordinate information corresponding to movement of the remote controller 200 to the image display apparatus 100. Thus, the pointer corresponding to the movement of the remote controller 200 may be displayed on the display of the image display apparatus. Since the pointer is moved according to the movement of the remote controller in a 3D space, the remote controller may be referred to as a 3D pointing device.

Figure 2:
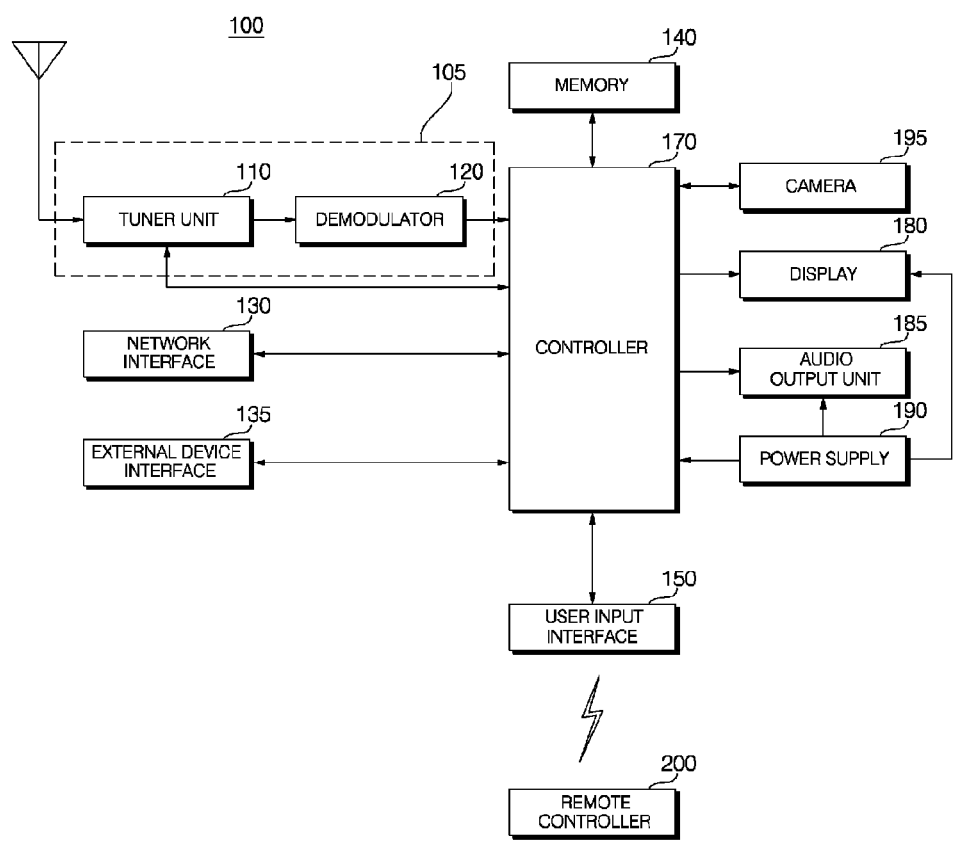
FIG. 2 is a block diagram showing the internal configuration of the image display apparatus of FIG. 1.

FIG. 2 is a block diagram showing the internal configuration of the image display apparatus of FIG. 1.

Referring to FIG. 2, the image display apparatus 100 according to the embodiment of the present invention includes a broadcast reception unit 105, a network interface 130, an external device interface 135, a memory 140, a user input interface 150, a controller 170, a display 180, an audio output unit 185, a power supply 190 and a camera 195. The broadcast reception unit 105 may include a tuner unit 110 and a demodulator 120. Alternatively, the broadcast reception unit 105 may further include a network interface 130.

The tuner unit 110 tunes to a Radio Frequency (RF) broadcast signal corresponding to a channel selected by a user from among RF broadcast signals received through an antenna or RF broadcast signals corresponding to all channels previously stored in the image display apparatus. The tuned RF broadcast is converted into an Intermediate Frequency (IF) signal or a baseband Audio/Video (AV) signal.

For example, the tuned RF broadcast signal is converted into a digital IF signal DIF if it is a digital broadcast signal and is converted into an analog baseband AV signal (Composite Video Banking Sync/Sound Intermediate Frequency (CVBS/SIF)) if it is an analog broadcast signal.

The tuner unit 110 may sequentially select a number of RF broadcast signals corresponding to all broadcast channels previously stored in the image display apparatus by a channel storage function from a plurality of RF signals received through the antenna and may convert the selected RF broadcast signals into IF signals or baseband A/V signals.

The demodulator 120 receives the digital IF signal DIF from the tuner unit 110 and demodulates the digital IF signal DIF.

The demodulator 120 may perform demodulation and channel decoding, thereby obtaining a stream signal TS. The stream signal may be a signal in which a video signal, an audio signal and a data signal are multiplexed.

The stream signal output from the demodulator 120 may be input to the controller 170 and thus subjected to demultiplexing and A/V signal processing. The processed video and audio signals are output to the display 180 and the audio output unit 185, respectively.

The external device interface 135 may connect an external device and the image display apparatus 100. For connection, the external device interface 135 may include an A/V Input/Output (I/O) unit (not shown).

The external device interface 135 may be connected to an external device such as a Digital Versatile Disc (DVD) player, a Blu-ray player, a game console, a camera, a camcorder, or a computer (e.g., a laptop computer), wirelessly or by wire so as to perform an input/output operation with respect to the external device.

The A/V I/O unit may include a universal serial bus (USB) port, a composite video banking sync (CUBS) port, a component port, a S-video port (analog), a Digital Visual Interface (DVI) port, a High Definition Multimedia Interface (HDMI) port, a Red, Green, Blue (RGB) port, a D-SUB port, etc. in order to provide audio and video signals received from the external device to the image display apparatus 100.

The external device interface 135 may be connected to various set-top boxes via at least one of the above-described various ports to perform transmit and receive data to and from the set-to boxes.

The network interface 130 serves as an interface between the image display apparatus 100 and a wired/wireless network such as the Internet. The network interface 130 may receive content or data provided by an Internet or content provider or a network operator over a network.

The network interface 130 may access a predetermined web page over a connected network or another network linked to the connected network. That is, the network interface 130 access a predetermined web page to transmit or receive data to or from a corresponding server. In addition, the network interface may receive content or data provided by a content provider or a network operator.

The network interface 130 may select and receive a desired application among applications opened to the public over a network.

The network interface 130 may include a wired communication unit (not shown) or a wireless communication unit (not shown).

The wireless communication unit may perform short-range wireless communication with another electronic apparatus. The image display apparatus 100 may be connected to another electronic apparatus over a network according to a communication standard such as Bluetooth, Radio Frequency Identification (RFID), InfraRed Data Association (IrDA), Ultra Wideband (UWB), ZigBee, Digital Living Network Alliance (DLNA), etc.

The memory 140 may store various programs necessary for the controller 170 to process and control signals, and may also store processed video, audio and data signals.

The memory 140 may temporarily store a video, audio and/or data signal received from the network interface 130 or the external device interface 135. The memory 140 may store information about a predetermined broadcast channel by the channel storage function of a channel map.

In addition, the memory 140 may store an application or an application list received from the network interface 130 or the external device interface 135.

The image display apparatus 100 may play a content file (a moving image file, a still image file, a music file, a text file, an application file, etc.) stored in the memory 140 back to be provided to a user.

While the memory 140 is shown in FIG. 1 as being configured separately from the controller 170, to which the present invention is not limited, the memory 140 may be incorporated into the controller 170.

The user input interface 150 transmits a signal input by the user to the controller 170 or transmits a signal received from the controller 170 to the user.

For example, the user input interface 150 may transmit/receive various user input signals such as a power-on/off signal, a channel selection signal, and a screen setting signal from a remote controller 200, may provide the controller 170 with user input signals received from local keys (not shown), such as inputs of a power key, a channel key, and a volume key, and setting values, or provide the controller 170 with a user input signal received from a sensor unit (not shown) for sensing a user gesture, or transmit a signal received from the controller 170 to a sensor unit (not shown).

The controller 170 may demultiplex the stream signal received from the tuner unit 110, the demodulator 120, or the external device interface 135 into a number of signals, process the demultiplexed signals into audio and video data, and output the audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 2, the controller 170 may include a DEMUX, a video processor, etc., which will be described in detail later with reference to FIG. 3.

The controller 170 may control the overall operation of the image display apparatus 100. For example, the controller 170 controls the tuner unit 110 to tune to an RF signal corresponding to a channel selected by the user or a previously stored channel.

The controller 170 may control the image display apparatus 100 by a user command input through the user input interface 150 or an internal program. In particular, the controller may be connected to the network to download an application or application list desired by a user into the image display apparatus.

For example, the controller 170 controls the tuner unit 110 such that a signal of a channel selected according to a predetermined channel selection command received through the user input interface 150 is received, and processes the video, audio or data signal of the selected channel. The controller 170 may output the processed video or audio signal such as the channel information selected by the user through the display 180 or the audio output unit 185.

As another example, the controller 170 may output, through the display 180 or the audio output unit 185, a video signal or an audio signal from an external device, such as a camera or a camcorder, received through the external device interface 135, according to an external device image playback command received through the user input interface 150.

The controller 170 may control the display 180 to display images. The image displayed on the display 180 may be a Two-Dimensional (2D) or Three-Dimensional (3D) still or moving image.

The controller 170 may generate and display a predetermined object of an image displayed on the display 180 as a 3D object. For example, the object may be at least one of a screen of an accessed web site (newspaper, magazine, etc.), an electronic program guide (EPG), various menus, a widget, an icon, a still image, a moving image, text, etc.

The controller 170 recognizes the position of the user based on an image captured by a camera unit (not shown). For example, a distance (z-axis coordinate) between the user and the image display apparatus 100 may be detected. An x-axis coordinate and a y-axis coordinate in the display 180 corresponding to the position of the user may be detected.

If an application view menu item is selected, the controller 170 may control display of applications or a list of applications that are available in the image display apparatus or downloadable from an external network.

The controller 170 may control installation and execution of an application downloaded from the external network along with various user interfaces. Also, the controller 170 may control display of an image related to the executed application on the display 180, upon user selection.

The controller 170 may receive a user image captured by the camera 195. The controller may recognize the user based on the captured user image and control the recognized user to log in to the image display apparatus 100. The controller 170 may provide a service to each user who logs in to the image display apparatus.

Alternatively, the controller 170 may recognize a user gesture from a user image captured by the camera 195. In particular, the controller 170 may recognize the face and hand of the user from the captured image and recognize a specific gesture.

The display 180 converts a video signal, a data signal or an OSD signal processed by the controller 170 or a video signal and a data signal received by the external device interface 135 into RGB signals and generates a drive signal.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touchscreen that can be used not only as an output device but also as an input device.

The audio output unit 185 may receive a processed audio signal from the controller 170 and output the received audio signal as sound.

The power supply 190 supplies power to the image display apparatus 100. Particularly, the power supply 190 may supply power to the controller 170 which may be implemented as a System On Chip (SOC), the display 180 for displaying an image, and the audio output unit 185 for outputting the audio signal.

For supplying power, the power supply 190 may include a converter (not shown) for converting Alternating Current (AC) into Direct Current (DC). If the display 180 is implemented as, for example, a liquid crystal panel having a plurality of backlight lamps, the power supply 190 may further include an inverter (not shown) capable of performing Pulse Width Modulation (PWM) for luminance change or dimming driving.

The camera 195 may capture an image of a user and transmit the captured image to the controller 170 of the image display apparatus 100. Although the number of cameras 195 is 1 in FIG. 1*a*, a plurality of cameras may be included. The camera 195 may be a 2D camera or a 3D camera.

The remote controller 200 transmits user input to the user input interface 150. For transmission of user input, the remote controller 200 may use various communication techniques such as RF communication, IR communication, Bluetooth, Ultra Wideband (UWB), and ZigBee.

In addition, the remote controller 200 may receive a video signal, an audio signal or a data signal from the user input interface 150. The remote controller 200 output the received signals visually, audibly or through vibrations based on the received video, audio or data signal.

The block diagram of the image display apparatus 100 illustrated in FIG. 2 is only exemplary. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Unlike FIG. 2, the image display apparatus 100 may not include the tuner unit 110 and the demodulator 120 shown in FIG. 2 and may receive broadcast content via the network interface 130 or the external device interface 135 and play the broadcast content back.

Figure 3:
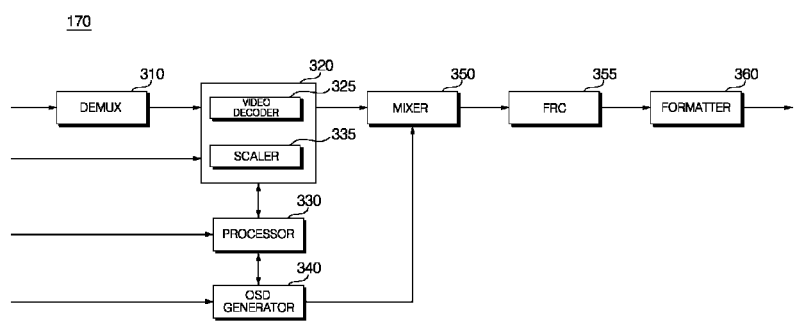
FIG. 3 is a block diagram showing the internal configuration of a controller of FIG. 2.

FIG. 3 is a block diagram showing the internal configuration of a controller of FIG. 2.

Referring to FIG. 3, the controller 170 according to the embodiment of the present invention may include a DEMUX 310, a video processor 320, a processor 330, an OSD generator 340, a mixer 350, a Frame Rate Converter (FRC) 355, and a formatter 360. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The stream signal input to the DEMUX 310 may be received from the tuner unit 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

The video signal decoded by the video processor 320 is input to the mixer 350.

The processor 330 may control the overall operation of the image display apparatus 100 or the controller 170. For example, the processor 330 controls the tuner unit 110 to tune to an RF signal corresponding to a channel selected by the user or a previously stored channel.

The processor 330 may control the image display apparatus 100 by a user command received through the user input interface 150 or an internal program.

The processor 330 may control data transmission of the network interface 130 or the external device interface 135.

The processor 330 may control the operation of the DEMUX 310, the video processor 320 and the OSD generator 340 of the controller 170.

The OSD generator 340 generates an OSD signal autonomously or according to user input. For example, the OSD generator 340 may generate signals by which a variety of information is displayed as graphics or text on the display 180, according to user input signals or control signals. The OSD signal may include various data such as a User Interface (UI), a variety of menus, widgets, icons, etc.

The OSD generator 340 may generate a signal for displaying broadcast information based on a caption or EPG of a broadcast image.

The OSD generator 340 generates an OSD signal or a graphic signal and thus may be referred to as a graphics processing unit.

The mixer 350 may mix the decoded video signal processed by the video processor 320 with the OSD signal generated by the OSD generator 340. The mixed signal is provided to the formatter 360. By mixing the decoded broadcast image signal or the external input signal and the OSD signal, the OSD may be overlaid and displayed on the broadcast image or the OSD or the external input image.

The FRC 355 may change the frame rate of an input image. The FRC 355 may maintain the frame rate of the input image without frame rate conversion.

The formatter 360 changes the signal output from the FRC 355 to be suitable for the display 180. For example, the formatter 360 may convert a received signal into an RGB data signal and output the RGB data signal. The RGB data signal may be output in the form of a Low Voltage Differential Signal (LVDS) or mini-LVDS.

The formatter 360 may change the format of a 3D video signal or convert a 2D video signal into a 3D video signal.

The audio processor (not shown) of the controller 170 may process the demultiplexed audio signal. For audio signal processing, the audio processor may have various decoders.

The audio processor (not shown) of the controller 170 may also adjust the bass, treble or volume of the audio signal.

The data processor (not shown) of the controller 170 may process the demultiplexed data signal. For example, if the demultiplexed data signal was encoded, the data processor may decode the data signal. The encoded data signal may be Electronic Program Guide (EPG) information including broadcasting information such as the start time and end time of broadcast programs of each channel.

The block diagram of the controller 170 shown in FIG. 3 is exemplary. The components of the block diagrams may be integrated or omitted, or a new component may be added according to the specifications of the controller 170.

In particular, the FRC 355 and the formatter 360 may be included separately from the controller 170.

Figure 4:
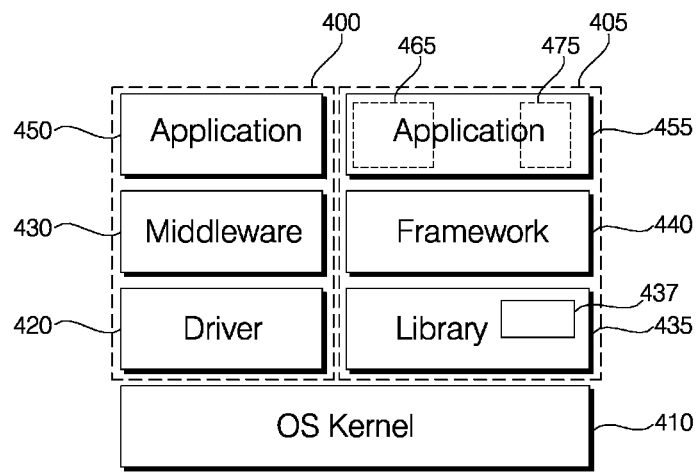
FIGS. 4 to 5 are diagrams showing various examples of a smart system platform structure in the image display apparatus of FIG. 2.
Figure 5:
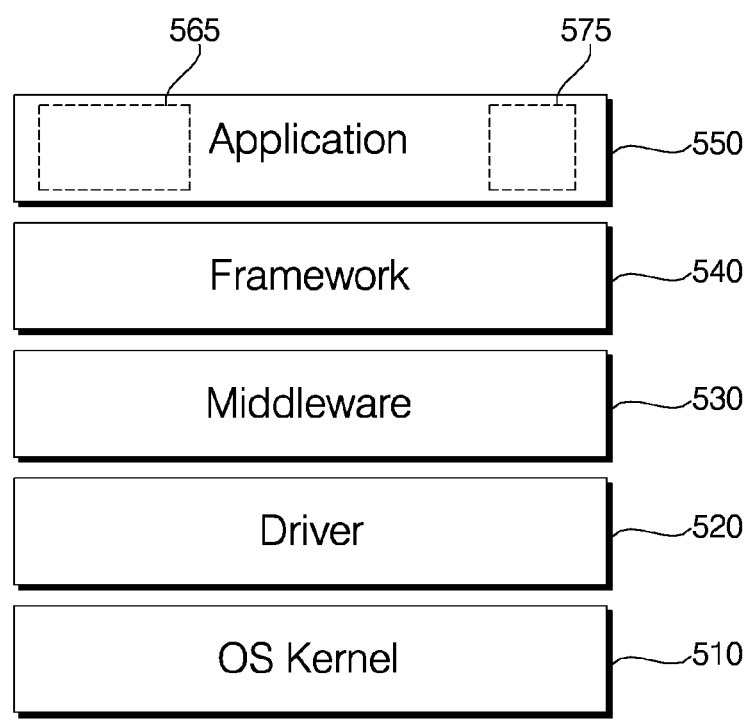

FIGS. 4 to 5 are diagrams showing various examples of a platform structure in the image display apparatus of FIG. 2.

The platform of the image display apparatus 100 according to the embodiment of the present invention may include OS based software in order to perform the above-described various operations.

First, referring to FIG. 4, the platform of the image display apparatus 100 according to an embodiment of the present invention is a separate type according to an exemplary embodiment of the present invention. The platform may be designed separately as a legacy system platform 400 and a smart system platform 405. An OS kernel 410 may be shared between the legacy system platform 400 and the smart system platform 405.

The legacy system platform 400 may include a driver 420, middleware 430, and an application layer 450 on the OS kernel 410. The smart system platform 405 may include a library 435, a framework 440, and an application layer 455 on the OS kernel 410.

The OS kernel 410 is a core of an operating system. When the image display apparatus 100 is driven, the OS kernel 410 may be responsible for at least one of hardware driver driving, security protection for hardware and processors in the image display apparatus 100, efficient management of system resources, memory management, hardware interfacing by hardware abstraction, multi-processing, and scheduling associated with the multi-processing. Meanwhile, the OS kernel 410 may further perform power management.

The hardware drivers of the OS kernel 410 may include, for example, at least one of a display driver, a Wi-Fi driver, a Bluetooth driver, a USB driver, an audio driver, a power manager, a binder driver, and a memory driver.

The hardware drivers of the OS kernel 410 may be drivers for hardware devices within the OS kernel 410 and include a character device driver, a block device driver, and a network device driver. The block device driver may require a buffer for buffering data on a block basis, because data is transmitted on a block basis. The character device driver may not require a buffer since data is transmitted on a basic data unit basis, that is, on a character basis.

The OS kernel 410 may be implemented based on any of various OSs such as Unix (Linux), Windows, etc. The OS kernel 410 may be a general-purpose open OS kernel that can be implemented in other electronic devices.

The driver 420 is installed between the OS kernel 410 and the middleware 430. Along with the middleware 430, the driver 420 drives devices for operations of the application layer 450. For example, the driver 420 may include a driver(s) for a microcomputer, a display module, a graphics processing unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in interaction with the hardware drivers of the OS kernel 410.

In addition, the driver 420 may further include a driver for the remote controller 200, especially a below-described 3D pointing device. The driver for the 3D pointing device may reside in the OS kernel 410 or the middleware 430, instead of the driver 420.

The middleware 430 is located between the OS kernel 410 and the application layer 450. The middleware 430 may mediate between different hardware devices or different software programs, for data transmission and reception between the hardware devices or software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcast information-related middleware, and Digital Living Network Alliance (DLNA) middleware as peripheral device communication-related middleware.

The application layer 450 that resides on the middleware 430 in the legacy system platform 400 may include, for example, UI applications associated with various menus in the image display apparatus 100. The application layer 450 that resides on the middleware 430 may allow editing and updating over a network by user selection. With use of the application layer 450, the user may enter a desired menu among various UIs by manipulating the remote controller 200 during viewing of a broadcast program.

The application layer 450 in the legacy system platform 400 may further include at least one of a TV guide application, a Bluetooth application, a reservation application, a Digital Video Recorder (DVR) application, and a hotkey application.

In the smart system platform 405, the library 435 is located between the OS kernel 410 and the framework 440, forming the basis of the framework 440. For example, the library 435 may include a Secure Socket Layer (SSL) being a security-related library, WebKit being a Web engine-related library, c library (libc), and Media Framework being a media-related library such as specifying a video format and an audio format. The library 435 may be written in C or C++. Additionally, the library 435 may be accessible to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver (not shown) of the OS kernel 410 may operate.

The binder driver and the runtime 437 may connect Java applications to C-based libraries.

The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include support programs and programs for interconnection of different software components. For example, the framework 440 may include a resource manager, an activity manager related to activities of applications, a notification manager, and a content provider (CP) for abstracting common information between applications. This framework 440 may be written in Java.

The application layer 455 on top of the framework 440 includes a variety of programs that are executed and displayed in the image display apparatus 100. The application layer 455 may include, for example, a core application that has at least one of an e-mail, Short Message Service (SMS), calendar, map, and browser. Function may be provided. The application layer 455 may be written in Java.

In the application layer 455, applications may be categorized into user-undeletable applications 465 stored in the image display apparatus 100 and user-installable or user-deletable applications 475 that are downloaded from an external device or a network and stored in the image display apparatus 100.

With the applications of the application layer 455, a variety of functions may be performed by network access, including Internet telephony, VoD, Web album, Social Networking Service (SNS), Location-Based Service (LBS), map service, Web browsing, and application search. In addition, the user may enjoy games and manage schedules using applications.

Referring to FIG. 5, a platform for the image display apparatus 100 according to another embodiment of the present invention is an integrated type platform. The integrated type platform may include an OS kernel 510, a driver 520, middleware 530, a framework 540, and an application layer 550.

Compared to the separate-type platform illustrated in FIG. 4, the integrated type platform of FIG. 5 is characterized by the absence of the library 435 and the application layer 550 being an integrated layer. The driver 520 and the framework 540 correspond to the driver 420 and the framework 440 of FIG. 4, respectively.

The library 435 of FIG. 4 may be incorporated into the middleware 530. That is, the middleware 530 may include both the legacy system middleware and the image display system middleware. As described above, the legacy system middleware includes MHEG or ACAP as data broadcasting-related middleware, PSIP or SI middleware as broadcast information-related middleware, and DLNA middleware as peripheral device communication-related middleware, whereas the image display system middleware includes SSL as a security-related library, WebKit as a Web engine-related library WebKit, libc, and Media Framework as a media-related library. The middleware 530 may further include the above-described runtime.

The application layer 550 may include menu-related applications, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus 100 and user-installable or user-deletable applications 575 that are downloaded from an external device or a network and stored in the image display apparatus 100.

The platforms illustrated in FIGS. 4 and 5 may be general-purpose ones that can be implemented in many other electronic devices as well as in image display apparatuses.

The platforms illustrated in FIGS. 4 and 5 may be loaded on the memory 140, the controller 170, or any other processor (not shown).

Figure 6A:
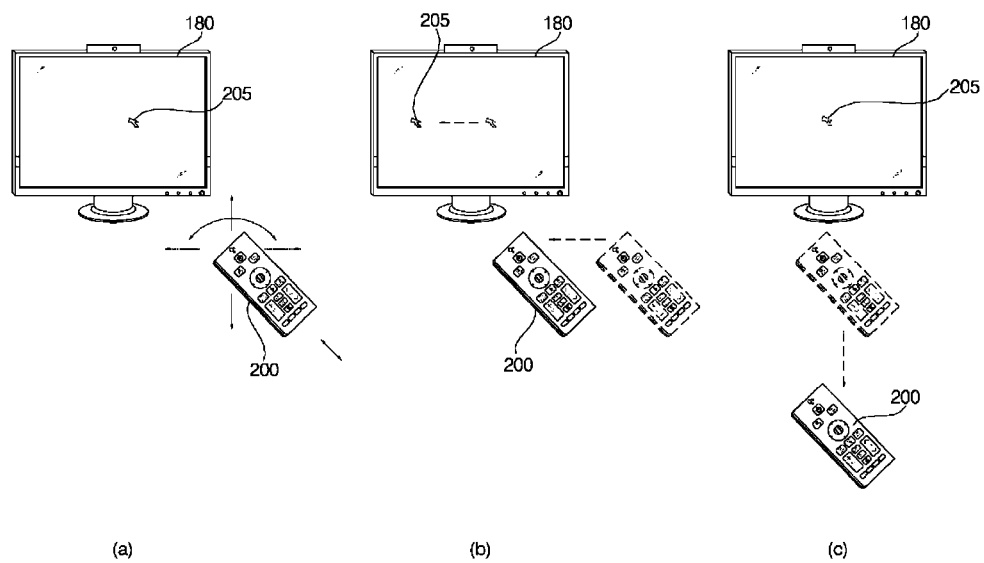
FIG. 6A is a diagram showing an operating method using the first surface of the remote controller of FIG. 1B.

FIG. 6A is a diagram showing an operating method using the first surface of the remote controller of FIG. 1B.

FIG. 6A shows the case in which the pointer 205 is displayed in correspondence with movement of the remote controller 200 in a state in which the first surface 201 of the remote controller 200 is upturned.

First, FIG. 6A(a) shows the case in which the pointer 205 is displayed in correspondence with the remote controller 200 at a predetermined position of the display 180.

The user may move the remote controller 200 up and down, side to side (FIG. 6A(b)), and back and forth (FIG. 6A(c)). The pointer 205 displayed on the display 180 of the image display apparatus moves in accordance with the movement of the remote controller 200. In this context, the remote controller 200 may be referred to as a pointing device or a 3D pointing device.

Referring to FIG. 6A(b), if the user moves the remote controller 200 to the left, the pointer 205 displayed on the display 180 of the image display apparatus moves to the left accordingly.

Information about the movement of the remote controller 200 sensed by the sensor of the remote controller 200 is transmitted to the image display apparatus. The image display apparatus 100 may calculate the coordinates of the pointer 205 from the information about the movement of the remote controller 200. Then, the image display apparatus 100 may display the pointer 205 at the calculated coordinates.

Referring to FIG. 6A(c), while pressing a predetermined button of the remote controller 200, the user moves the remote controller 200 away from the display 180. Then, a selection area corresponding to the pointer 205 may be zoomed in upon and enlarged on the display 180. On the contrary, if the user moves the remote controller 200 toward the display 180, the selection area corresponding to the pointer 205 is zoomed out and thus contracted on the display 180. Alternatively, when the remote controller 200 moves away from the display 180, the selection area may be zoomed out and when the remote controller 200 approaches the display 180, the selection area may be zoomed in on.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 6B:
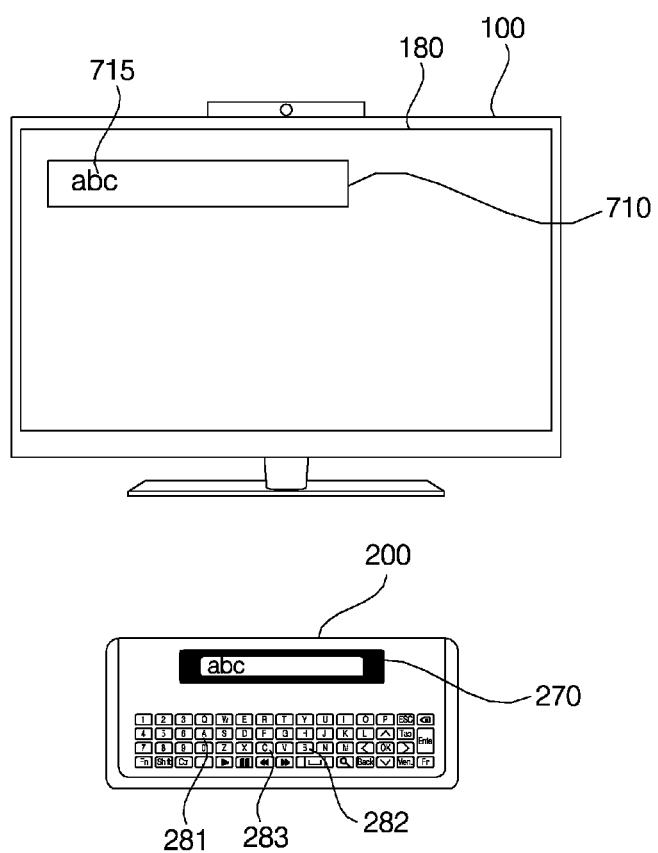
FIG. 6B is a diagram showing an operating method using the second surface of the remote controller of FIG. 1C.

FIG. 6B is a diagram showing an operating method using the second surface of the remote controller of FIG. 1C.

FIG. 6B shows the case in which the letter key of the remote controller 200 is manipulated in a state in which the second surface 251 of the remote controller 200 is upturned and the first surface 201 is downturned.

For example, if a first alphabetic key 281, a second alphabetic key 282 and a third alphabetic key 283 of the letter key are sequentially manipulated, the remote controller 200 transmits the key information corresponding thereto to the image display apparatus 100. Then, the image display apparatus may display the corresponding characters "abc" 715 in a display window 710.

The corresponding characters "abc" may also be displayed on the display 270 of the remote controller 200.

Figure 7:
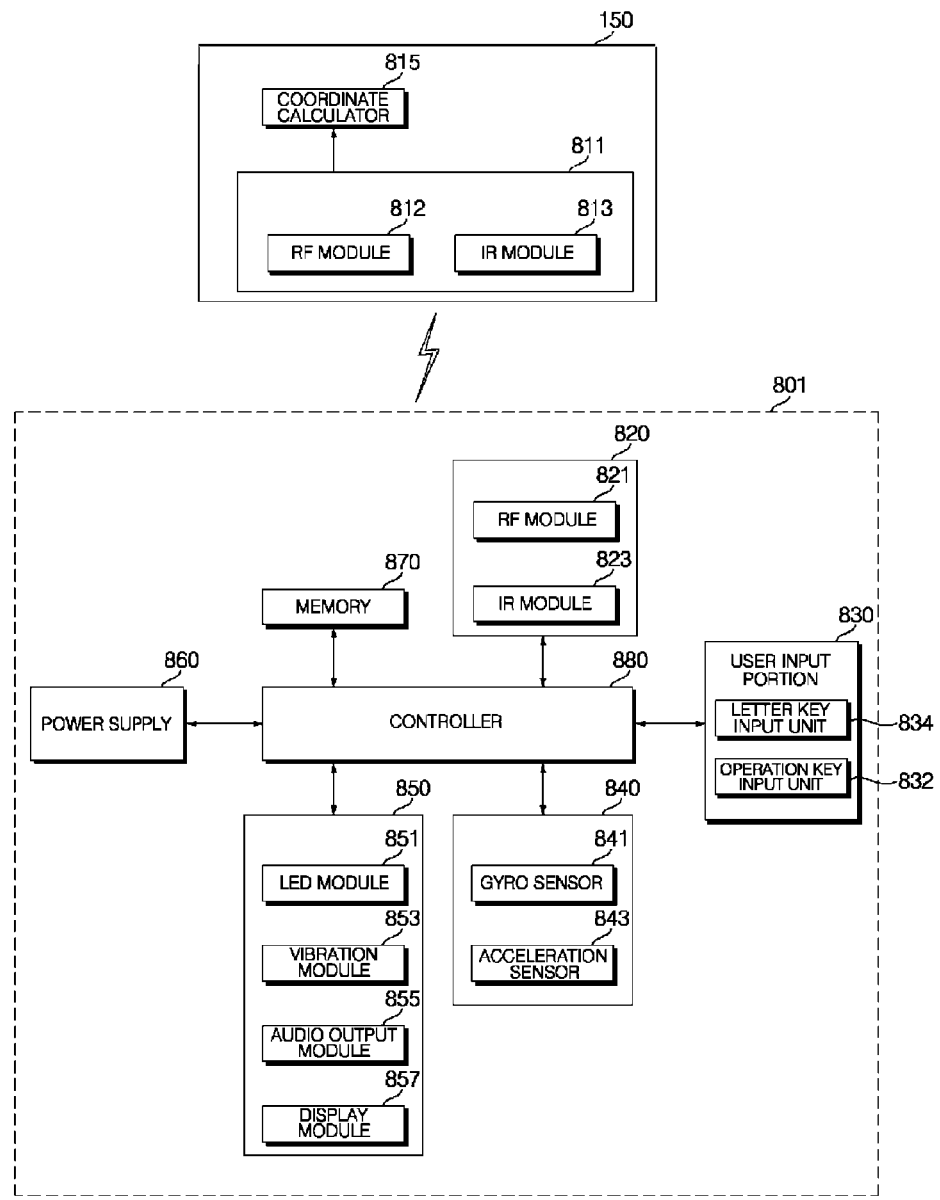
FIG. 7 is a block diagram showing the internal configuration of the remote controller of FIG. 1.

FIG. 7 is a block diagram of the remote controller illustrated in FIG. 1.

Referring to FIG. 7, the remote controller 200 may include a radio transceiver 820, a user input portion 830, a sensor portion 840, an output portion 850, a power supply 860, a memory 870, and a controller 880.

The radio transceiver 820 transmits and receives signals to and from any one of the image display apparatuses according to the embodiments of the present invention. Among the image display apparatuses according to the embodiments of the present invention, for example, one image display apparatus 100 will be described.

In accordance with the exemplary embodiment of the present invention, the radio transceiver 820 may be provided with an RF module 821 for transmitting and receiving signals to and from the image display apparatus 100 according to an RF communication standard. Additionally, the radio transceiver 820 may include an IR module 823 for transmitting and receiving signals to and from the image display apparatus 100 according to an IR communication standard.

In the present embodiment, the remote controller 200 may transmit information about movement of the remote controller 200 to the image display apparatus 100 via the RF module 821.

The remote controller 200 may receive the signal from the image display apparatus 100 via the RF module 821. The remote controller 200 may transmit commands associated with power on/off, channel switching, volume change, etc. to the image display apparatus 100 through the IR module 823.

In the present embodiment, the user input portion 830 may include an operation key input portion 832 for performing operation key input and a letter key input portion 834 for performing letter key input.

The operation key input portion 832 may include various operation keys placed on the front surface 201 of the remote controller 200 as described with reference to FIG. 1B. The operation key input portion 832 may include, for example, the power key 202, the home key 204, the search key 206, the four-direction key 210, the wheel key 222, the back key 222, the menu key 224, the volume key 230, the 3D key 235, the channel key 240, etc.

The letter key input portion 834 may include various letter keys placed on the back surface 251 of the remote controller 200 as described with reference to FIG. 1B. The letter key input portion 834 may include, for example, the numeric key 262, the alphabetic key 264, etc.

The user may enter a command for remotely controlling the image display apparatus 100 to the remote controller 200 by manipulating the user input portion 830. If the user input portion 230 includes hard keys, the user may enter commands related to the image display apparatus 100 to the remote controller 200 by pushing the hard keys. If the user input portion 230 is provided with a touchscreen, the user may enter commands related to the image display apparatus 100 to the remote controller 200 by touching soft keys on the touchscreen. Additionally, the user input portion 830 may have a variety of input means which may be manipulated by the user, such as a scroll key, a jog key, etc., to which the present invention is not limited.

The sensor portion 840 may sense and output motion information of the remote controller. The sensor portion 840 may include a gyro sensor 841 or an acceleration sensor 843.

The gyro sensor 841 may sense information about movement of the remote controller 200. For example, the gyro sensor 841 may sense information about movement of the remote controller 200 along x, y and z axes.

The acceleration sensor 843 may sense information about the velocity of the remote controller 200. For example, the acceleration sensor 843 may sense information about the speed of the remote controller 200 along x, y and z axes.

The sensor portion 840 may further include a distance measurement sensor for sensing a distance from the display 180.

The motion information output from the sensor portion 840 may include the information about movement of the remote controller 200 from the gyro sensor 841 and the information about the speed of the remote controller 200 from the acceleration sensor 843 and further include the distance information.

The output portion 850 may output a video or audio signal corresponding to manipulation of the user input portion 830 or a signal transmitted by the image display apparatus 100. The user may be aware from the output portion 850 as to whether the user input portion 830 has been manipulated or the image display apparatus 100 has been controlled.

For example, the output portion 850 may include a Light Emitting Diode (LED) module 851 for illuminating when the user input portion 830 has been manipulated or a signal is transmitted to or received from the image display apparatus 100 through the radio transceiver 820, a vibration module 853 for generating vibrations, an audio output module 855 for outputting audio, or a display module 857 for outputting video.

The power supply 860 supplies power to the remote controller 200. When the remote controller 200 is kept stationary for a predetermined time, the power supply 860 blocks power from the remote controller 200, thereby preventing waste of power. When a predetermined key of the remote controller 200 is manipulated, the power supply 860 may resume power supply.

The memory 870 may store a plurality of types of programs required for control or operation of the remote controller 200, or application data. When the remote controller 200 transmits and receives signals to and from the image display apparatus 100 wirelessly through the RF module 821, the remote controller 200 and the image display apparatus 100 perform signal transmission and reception in a predetermined frequency band. The controller 880 of the remote controller 200 may store information about the frequency band in which to wirelessly transmit and receive signals to and from the image display apparatus 100 paired with the remote controller 200 in the memory 870 and refer to the information.

The controller 880 provides overall control to the remote controller 200.

The controller 880 may transmit a signal corresponding to predetermined key manipulation on the user input portion 830 or a signal corresponding to an movement of the remote controller 200 sensed by the sensor portion 840 to the image display apparatus 100 through the radio transceiver 820.

The user input interface 150 of the image display apparatus 100 receives key manipulation information or motion information. The user input interface 150 may have a radio transceiver 820.

The radio transceiver 811 may include an RF module 812 for performing RF communication with the remote controller 200 and an IR module 813 for performing IR communication with the remote controller 200.

The user input interface 150 may further include coordinate calculator 815 for calculating the coordinates of the pointer using information corresponding to movement of the remote controller 200.

The coordinates of the pointer may be calculated by the controller 170 instead of the coordinate calculator 815. For calculation of the coordinates of the pointer, the user input interface 150 may send the information corresponding to movement of the remote controller 200 to the controller 170.

FIG. 8 is a flowchart illustrating a method for operating an image display apparatus according to an embodiment of the present invention, and FIGS. 9A to 14B are views referred to for describing various examples of the method for operating the image display apparatus of FIG. 8.

Referring to FIG. 8, the image display apparatus 100 displays a home screen (S820).

If a home screen is set to be displayed when the image display apparatus 100 is powered on, the home screen may be automatically displayed when the image display apparatus 100 is powered on. Alternatively, if home screen display input is received based on the remote controller 200, a local key (not shown), user voice, a user gesture, etc., the controller 170 may display the home screen on the display 180.

FIG. 9A shows an example of a home screen 900 of an image display apparatus.

The home screen 900 may include a dashboard area 902 including card objects each including content and a launcher bar area 903 including frequently used application items.

Movable, replaceable, switchable card objects may be placed in the dashboard area 902. An object (not shown) indicating a logged-in user and time information may be displayed in the dashboard area 902.

FIG. 9A shows a live TV card object 920, a premium apps card object 940 and a 3D world card object 960 as an example of the card objects.

FIG. 9B shows another example of card objects. In FIG. 9A, if a screen switching object 935 is selected to switch a screen, a home screen 901 for displaying a tube card object 950, a smart share card object 970, a my interest card object 990 may be displayed in the dashboard area 902.

A live broadcast image 910 may be displayed in the live TV card object 920. In addition, live broadcast information 912, an external input object 914 capable of selecting external input, a settings object 916 for setting the image display apparatus and an advertisement image 915 may be further displayed.

The live broadcast image 910 may be a broadcast image extracted from a live broadcast signal received by the above-described broadcast reception unit 105. In particular, the live broadcast signal may be received through the tuner unit 110 of the broadcast reception unit 105 or the network interface 130.

Broadcast information 912 related to a live broadcast program may be program guide information of a broadcast signal or broadcast information separately received from a broadcast station server or another server over a network.

If the external input object 914 capable of selecting external input is selected, a screen for selecting an external input image received through an HDMI port, a VOD port, a component port, an RGB port or an antenna port among various input ports of the image display apparatus 100 may be displayed.

If the settings object 916 for setting the image display apparatus is selected, a settings screen for setting the image display apparatus may be displayed.

The advertisement image 915 may be based on an advertisement included in a broadcast signal, an advertisement provided by a network provider for providing a network to the image display apparatus 100 or an advertisement provided by a broadcast station for providing a broadcast image to the image display apparatus 100.

The premium apps card object 940 may include a card object name 942 and a content list 945. In particular, the content list 945 may include content items provided by a manufacturer of the image display apparatus 100. In the figure, application items are shown as content items and are installed in the image display apparatus 100 in advance. If any one application item of the content list 945 is selected, an application corresponding to the application item may be executed and a screen on which the application is executed may be displayed on the display 180.

Unlike the figure, content items other than the application items may be displayed.

The content items and, more particularly, the application items, of the premium apps card object 940 may be displayed to be distinguished from other application items when the overall application list is displayed.

The 3D world card object 960 may include a card object name 962 and a content list 965. In particular, the content list 965 may include 3D content items. The 3D content items may be shortcut items for 3D content execution. If any one 3D content item of the content list 945 is selected, 3D content corresponding to the 3D content item is played back and a screen on which the 3D content may be played back may be displayed on the display 180.

Although three card objects 920, 940 and 960 are shown in FIG. 9A, if an additional card object is further present, a portion of the additional card object may be displayed on the display 180 as shown in FIG. 9A. Therefore, the user can be intuitively aware that the additional card object to be searched for is present.

The tube card object 950 of FIG. 9B may include a card object name 952, an object 954 indicating content list switching and a content list 955a corresponding to any one subcategory.

In particular, the content list 955a may include content items stored in a server managed by a video provider.

In order to display predetermined content items among a plurality of content items stored in the server managed by the video provider in the tube card object 950, subcategories associated with genre, date, region, age and gender may be set. Content lists may be separately configured according to such subcategories.

The content list of the tube card object 950 shown in FIG. 9B may be a content list 955a including recently featured items. That is, a first content list corresponding to a first subcategory may be displayed.

If the object 954 indicating content list switching is selected, the content list of the tube card object 950 may be a content list including most viewed items, a content list including trending video items or a content list including 3D content items.

The smart share card object 970 of FIG. 9B may include a card object name 972, an object 974 indicating content list switching and a content list 975a corresponding to any one subcategory.

In particular, the content list 975a may be a content list including content items stored in an adjacent electronic apparatus.

In order to display predetermined content items among a plurality of content items stored in the adjacent electronic apparatus in the smart share card object 970, subcategories associated with genre, date, etc. may be set. Content lists may be separately configured according to such subcategories.

The content list of the smart share card object 970 shown in FIG. 9B is a content list 975a including new content items.

If the object 974 indicating content list switching is selected, the content list of the smart share card object 970 may be a content list including movie content items, a content list including photo content items or a content list including music content items.

The my interest card object 990 of FIG. 9B may include a card object name 992, an object 994 for setting interesting content and a content list 995a corresponding to any one interesting item.

In particular, the content list 995a may be a content list including content items provided by a specific server.

In order to display predetermined content items among a plurality of content items provided by the specific server in the my interest card object 990, subcategories associated with genre, date, etc. may be set. Content lists may be separately configured according to such subcategories.

The content list of the my interest card object 990 shown in FIG. 9B is a content list 995a including world news items.

If top stories and business items are further set in addition to the world news items by selection of the object 994 for setting interesting content, the content list displayed in the object 994 for setting interesting content may be a content list including world news items, a content list including top stories news items or a content list including business news items.

The launcher bar area 903 may include an application list 980 including frequently used application items.

The application list 980 of the launcher bar area 903 may be displayed without change when the home screen is switched, for example, when the home screen 900 of FIG. 9A is switched to the home screen of FIG. 9B.

Figure 9C:
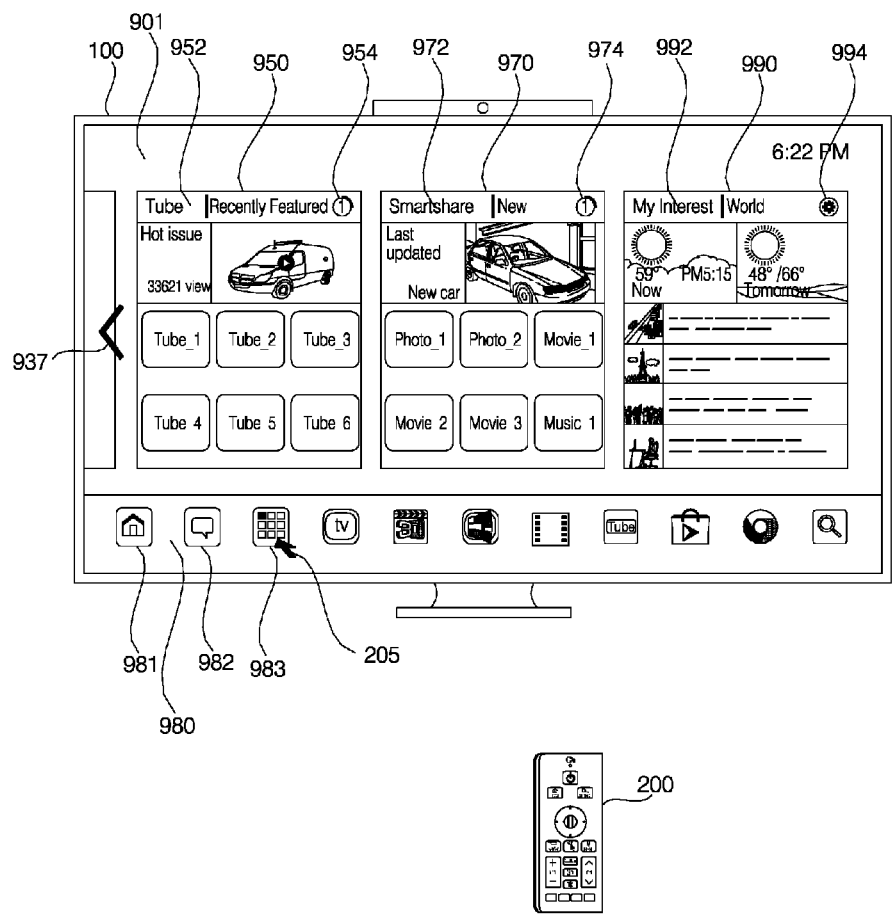

FIG. 9C shows the case in which, as application items displayed in the launcher bar area 903 of the home screen 901, a widget item 981, a notification item 982, an application full view item 983, a TV item, a 3D item, a primetime (TV & movie) item, a movie playback item, a video item, an application store item, a web item, a search item, etc. are sequentially included from the left to the right.

Some items may be edited or deleted or the other items may not be edited or deleted.

For example, the video item, the application store item, the web item, the search item, etc. may not be deleted and the TV item, the 3D item, etc. may be edited or deleted.

FIG. 9C shows the case in which the application full view item 983 in the application list displayed in the launcher bar area 903 of the home screen 900 is selected based on the pointer 205 displayed in correspondence with movement of the remote controller 200.

The application list screen 986 including a plurality of application items may be displayed on the image display apparatus 100 as a full screen as shown in FIG. 9D.

At this time, if an additional application item to be displayed is further present, a portion of the additional application item to be displayed may be displayed on the display 180. In FIG. 9A, the portion of the additional application item to be displayed is displayed in a lower region of the application list screen 986. Therefore, the user can be intuitively aware that the additional application item to be searched for is present.

Unlike the figure, the portion of the additional application item to be displayed may be displayed in a right region of the application list screen 986.

Selection, focusing, etc. of the application item may be changed by direction key input of the remote controller 200 in addition to the pointer based on movement of the remote controller 200.

In the figure, a cursor 988 is located on a predetermined application item according to direction key input of the remote controller 200. If direction key input of the remote controller 200 is received, the pointer based on movement of the remote controller 200 may not be displayed.

For screen movement, a scroll bar (not shown) may be described in one region of the display.

Next, FIG. 9E shows an application list screen 987 according to screen movement. If screen downward-movement input is received on the application list screen 986 of FIG. 9D, the application list screen 987 of FIG. 9E may be displayed. Screen movement input may be pointer input, direction key input or scroll bar input, etc. In the figure, the cursor 989 is located on a predetermined application item according to the direction key input of the remote controller 200.

Next, FIGS. 9F to 9H show detailed embodiments of the smart share card object 970 on the home screen 901 shown in FIG. 9B.

FIG. 9F shows the case in which the smart share card object 970 further includes a settings object 981. At this time, if the card object name 972 is selected using the pointer 205, a smart share screen 973a shown in FIG. 9G may be displayed on the image display apparatus.

The shared content according to the embodiment of the present invention may include content stored in an electronic apparatus connected to the image display apparatus and may include other content, for example, content stored in an external server over a network. More specifically, if a first user logs in to the image display apparatus 100, the first user may share content stored in the electronic apparatus connected to the image display apparatus or the content stored in the external server in the smart share card object 970 or on the smart share screen 973a. For sharing, the first user requires to log in to the external server. Alternatively, the login of the external server may be automatically performed when the user logs in to the image display apparatus 100. Therefore, it is possible to further activate a content sharing function.

The smart share screen 973a of FIG. 9G includes a home network content list 971a and an external network content list 971b. FIG. 9G shows the case in which the user logs in to the image display apparatus through the camera 195 such that an icon 1114 indicating the user 1104 is displayed on the smart share screen 973a.

The settings object 981 may be displayed on the smart share screen 973a. Various settings may be performed through the settings object 981. For example, content sharing is set to be restricted to the home network or to extend to the external network. As another example, shared content may be set to be displayed on a per user basis or all shared content may be set to be displayed regardless of the user. Alternatively, shared content may be set to be displayed on a per age basis. Alternatively, a lock function may be set to be activated on a per content basis. Alternatively, subcategories other than new, movie, photo and music may be further set. Alternatively, only newly added content may be set to be displayed by setting new shared content. A synchronization period with a home network may be set. Upon shared content update, a time when a content list is displayed may be set. For example, if a new content list is received through a home network, the new content list may be immediately displayed. Alternatively, a content list to be displayed may be updated at a predetermined time interval and a new content list may be displayed upon update.

FIG. 9H shows a smart share screen 973b different from that of FIG. 9G. The smart share screen 973b of FIG. 9H includes a list 971c of electronic apparatuses connected to the image display apparatus 100 and a list 971d of electronic apparatuses which are not connected to the image display apparatus 100 among the electronic apparatuses included in the home network. Unlike the figure, the lists 971c and 971d are separately displayed on the screen.

In the figure, a refrigerator item, a laptop item and a home server item are included in the list 971c of electronic apparatuses connected to the image display apparatus 100 and a tablet item, a computer item and a washing machine item are included in the list 971d of electronic apparatuses which are not connected to the image display apparatus 100.

If the computer item is selected from the list 971d of electronic apparatuses that are not connected to the image display apparatus 100, a separate menu may be displayed and thus a remote power-on operation of the computer may be performed.

A card object corresponding to the smart share screen 973b shown in FIG. 9G may be displayed on the home screen. Therefore, it is possible to easily confirm electronic apparatuses connected to the image display apparatus 100 and electronic apparatuses which are not connected to the image display apparatus 100.

After step 820 (S820) of FIG. 8, that is, after home screen display, the following steps may be performed.

The image display apparatus 100 determines whether card object generation input is received (S825) and displays a card object generation screen (S830) if it is determined that card object generation input is received.

In order to generate a card object in a state of displaying the home screen, the settings object 916 for setting the image display apparatus on the home screen may be selected.

FIG. 10A shows the case in which the settings object 916 of the live TV card object 920 on the home screen 900 is selected based on the pointer 205 displayed in correspondence with movement of the remote controller 200.

A settings screen 1010 related to the image display apparatus may be displayed as shown in FIG. 10B.

The settings screen 1010 may include a home dashboard edit item 1012, a customize home item 1014, a home and all apps settings item 1016 and a system settings item 1018.

FIG. 10B shows the case in which the home dashboard edit item 1012 of the settings screen 101 is selected based on the pointer 205 displayed in correspondence with movement of the remote controller 200.

Figure 10C:
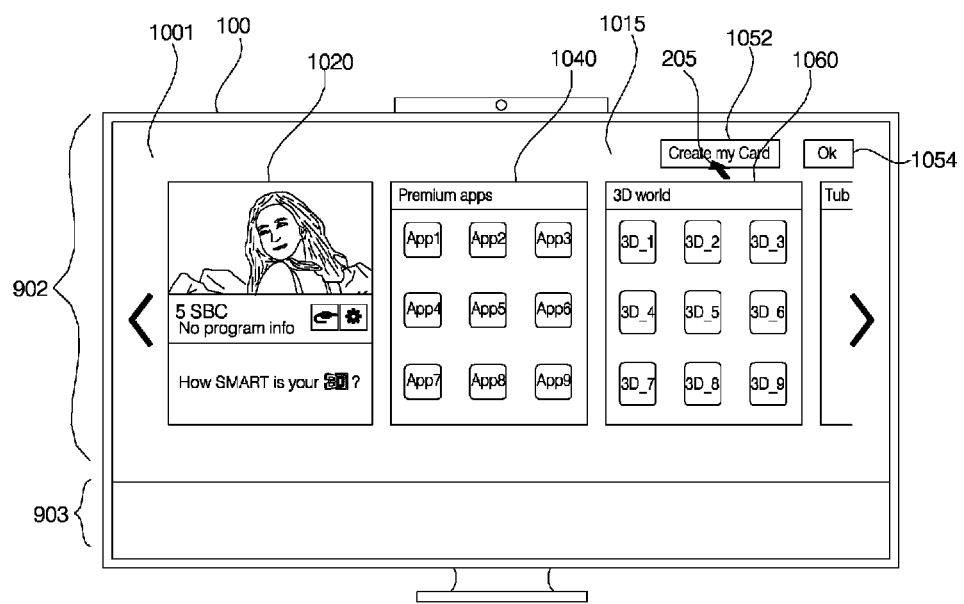

Then, as shown in FIG. 10C, a home dashboard edit screen 1001 for editing the dashboard area 902 of the home screen may be displayed. At this time, the launcher bar area 903 may be empty.

The home dashboard edit screen 1001 is similar to the home screen 900 of FIG. 10B but is different therefrom in that card objects 1020, 1040 and 1060 may be edited. Unlike FIG. 10B, the home dashboard edit screen 1001 may further include a card object generation item 1052 and an edit completion item 1054.

On the home dashboard edit screen 1001, content list settings of a specific card object may be changed, a card object name may be changed or the position of a card object may be changed.

For display of the home dashboard edit screen 1001 of FIG. 10C, the home dashboard edit screen 1001 may be displayed using other methods, instead of selection of the settings object 916 of the home screen 900 and selection of the home dashboard edit item 1012 of the settings screen 1010.

For example, if the pointer 205 is located in any one of the card objects 920, 940 and 960 in a state of displaying the home screen 900 of FIG. 10A and then long tap or long press input is received, as shown in FIG. 10C, the home dashboard edit screen 1001 for editing the dashboard area 902 may be displayed on the home screen.

As another example, if the menu key 224 of the remote controller 200 is manipulated in a state of displaying the home screen 900 of FIG. 10A, the settings screen 1010 related to the image display apparatus shown in FIG. 10B may be displayed. If the home dashboard edit item 1012 is selected, the home dashboard edit screen 1001 may be displayed.

As another example, if the menu key 224 of the remote controller 200 is manipulated in a state in which the pointer 205 of the remote controller 200 is located in the dashboard area 902 of the home screen 900 of FIG. 10A, the home dashboard edit screen 1001 for editing the dashboard may be immediately displayed.

FIG. 10C shows the case in which the card object generation item 1052 of the home dashboard edit screen 1001 is selected based on the pointer 205 displayed in correspondence with movement of the remote controller 200.

Figure 10D:
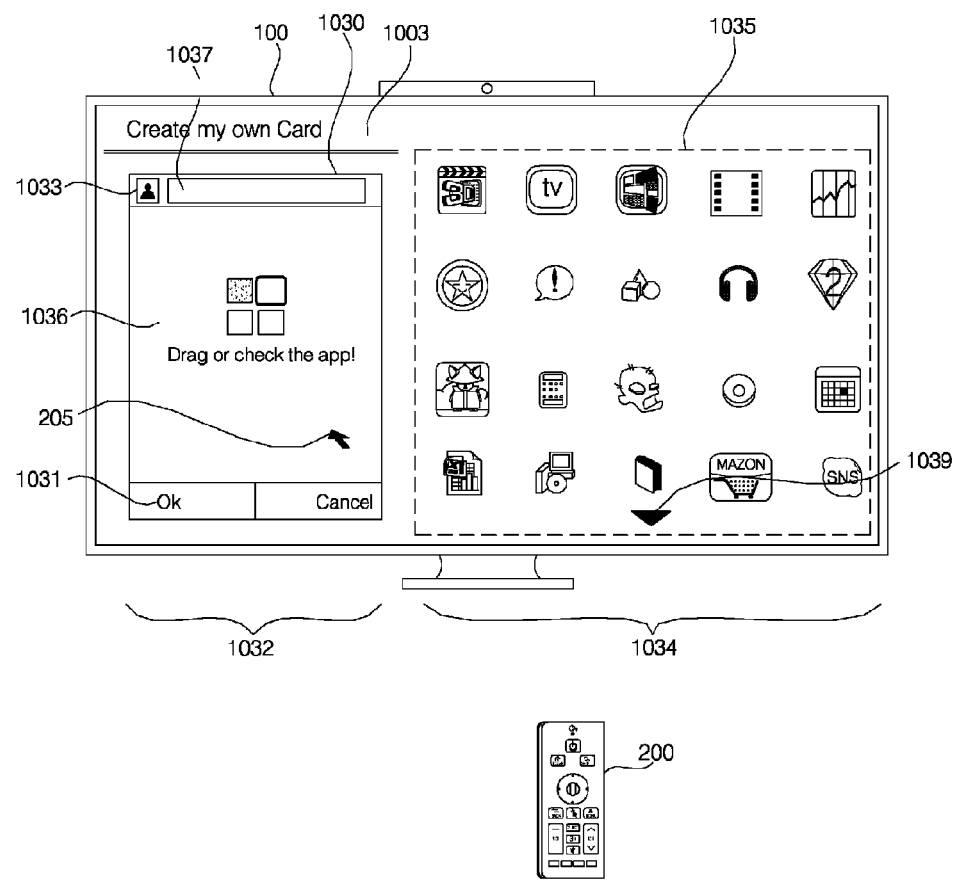

As shown in FIG. 10D, the card object generation screen 1003 for generating a card object may be displayed.

The card object generation screen 1003 may include a first region 1032 including a card object 1036 to be generated and a second region 1034 for displaying an application list 1035.

The card object 1030 to be generated may include an icon 1033 associated with a user of a generated card object, a card object name input window 1037, an application area 1036 in which application items are placed, a generation completion item 1031, etc.

The icon 1033 associated with the user of the generated card object may indicate a user who generates the card object or a user who will use the generated card object. The icon

1033 may be set by selecting any one of an icon list or may be set to include an image of a user captured using the camera 195.

As a method of adding an application to the application area 1036, a predetermined application item of the application list 1035 may be added to the application area 1036 by dragging and dropping of the pointer 205.

Figure 10E:
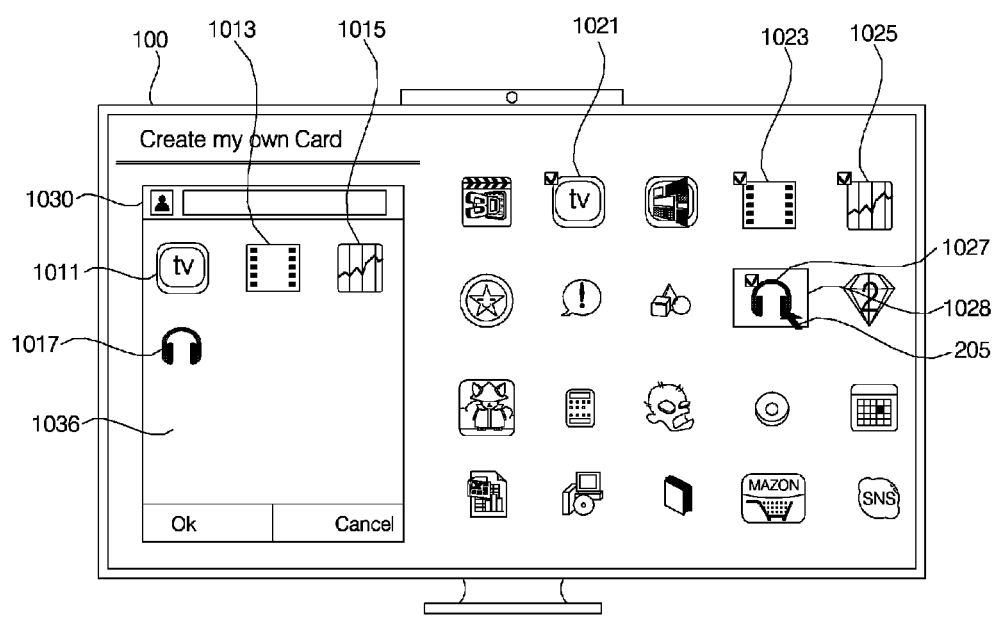

Alternatively, as shown in FIG. 10E, in the case in which each of the application items displayed in the application list 1035 includes a selection window, when a selection window is selected, an application item corresponding thereto may be automatically added to the application area 1036.

FIG. 10E shows the case in which four application items 1021, 1023, 1025 and 1027 are selected by the pointer 205. At this time, cursors 1028 may be displayed on recently selected application items.

In the application area 1036, application items 1011, 1013, 1015 and 1017 corresponding to the selected application items 1021, 1023, 1025 and 1027 may be displayed.

Figure 10F:
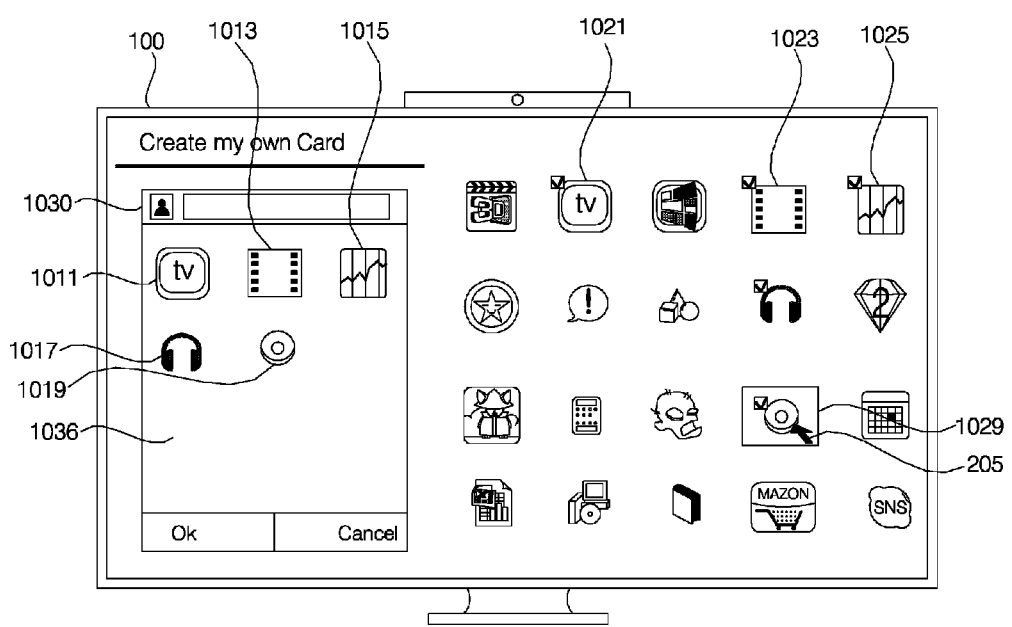

FIG. 10F shows the case in which one application item 1029 is further selected as compared to FIG. 10E. Accordingly, in the application area 1036, a newly added application item 1019 is further displayed in addition to the application items 1011, 1013, 1015 and 1017.

FIGS. 10E and 10F show the case in which, when the items of the application list are selected, the items are immediately added to the application area 1036. Alternatively, the items may be added to the application area 1036 when selection of the items of the application list has been completed. In this case, an object (not shown) indicating that application selection has been completed may be further displayed.

FIG. 10G shows the case in which a card object name is input to the card object name input window 1037.

For example, a card object name may be entered using the letter key 260 placed on the back surface 251 of the remote controller 200. As another example, if the pointer is located on the card object name input window 1037, a screen keyboard may be displayed on the display 180 and thus the card object name may be entered. Alternatively, the card object name may be entered based on voice input using a microphone (not shown) included in the remote controller 200.

FIG. 10G shows the case in which the generation completion item 1031 is selected using the pointer 205 after card object name input has been completed.

In this case, as shown in FIG. 10H, a card object generation completion message 1009 may be displayed. Therefore, the user may be aware that card object generation has been normally completed.

Next, after card object generation has been completed, the home screen may be displayed. In particular, the home screen including the generated card object may be displayed.

FIG. 10I shows the case in which the home screen 904 including the generated card object 1007 is displayed. Therefore, the user may generate and display a desired card object.

When the card object is generated as shown in FIGS. 10A to 10I, the icon 1033 associated with the user of the generated card object may be based on the captured image of the user. For example, the image of the user may be captured using the camera 195, a user face area may be extracted from the captured image and the icon 1033 associated with the user of the generated card object may be automatically generated based on the extracted face image.

As another example, the icon 1033 associated with the user of the generated card object may be set by selecting any one icon from a separate icon list.

When a card object is generated, rights to application items added to the card object 1030 to be generated may be differently set. For example, all users may have the right to confirm a first application item 1017 shown in FIG. 10F and only a user who generates a card object may have the right to confirm a second application item 1019 shown in FIG. 10F. Alternatively, when the second application item 1019 is executed, a lock function such as password input or user face captured may be set. Therefore, since my content items may be added to the generated card object, it is possible to increase user convenience.

When a card object is generated, an application item added to the card object 1030 to be generated may be deleted.

For example, as shown in FIG. 10J, the application item 1019 added to the card object 1030 to be generated may be selected using the pointer 205 indicating movement of the remote controller. In the figure, a selection window included in the application item 1019 is activated.

As shown in FIG. 10K, the selected application item 1019 is removed. In FIG. 10K, the selected application item 1019 in the card object 1030 to be generated is removed and only the pointer 205 is displayed.

The application item in the card object 1030 to be generated may be deleted by dragging and dropping of the pointer. That is, if the selected application item 1019 is dragged to the outside of the card object 1030 to be generated, the application item may be deleted.

Although FIGS. 9A to 10K show that the case in which the object, etc. is selected using the pointer 205 indicating movement of the remote controller 200, the present invention is not limited thereto and various modifications are possible.

For example, the object, etc. may be selected using the direction key and the OK key of the remote controller 200. As another example, the object, etc. may be selected according to a user gesture based on the image of the user captured using the camera 195. As another example, user voice may be recognized and the object, etc. may be selected based on the recognized voice.

For example, the image display apparatus 100 may display a hand-shaped pointer 506 corresponding to the hand 505 of a user 1104 based on the image of the user captured using the camera 195.

In a state of displaying the home screen shown in FIG. 10L, if hand movement of the user 1104 corresponds to a tap gesture for selecting a specific application item in the application list, it may be determined that the application item is selected. A plurality of application items may be sequentially selected. In the figure, five application items are selected by the user tap gesture.

Next, as shown in FIG. 10M, if the user makes a gist gesture and then makes a leftward movement gesture, the image display apparatus 100 may group the selected five application items by the grip gesture and move the selected five application items to the left by the leftward movement gesture, that is, add the selected five application items to the card object 1030 to be generated, based on the image of the user captured using the camera 195. Therefore, it is possible to easily move a plurality of items.

As another example, the remote controller 200 including a microphone (not shown) may receive and send user voice to the image display apparatus 100.

FIG. 10N shows the case in which a plurality of application items is added to the card object 1030 to be generated using multiple input means.

First, after the five application items are selected using the direction key, etc. of the remote controller, if the user outputs voice 508 "Please add the selected content to the card object", the remote controller 200 may collect and send data of such voice 508 to the image display apparatus 100. The image display apparatus 100 may analyze user voice using a voice recognition function and recognize a command for moving the five application items.

Therefore, as shown in FIG. 10N, the five application items may be moved to and displayed in the card object 1030 to be generated.

The command for selecting the image display apparatus may be input through the direction key and the OK key, the user gesture, user voice, etc. in addition to the pointer of the remote controller. Hereinafter, although the pointer indicating movement of the remote controller is focused upon, the direction key, the OK key, the user gesture, user voice, etc. may be used as described above.

Although generation of the card object is described in FIGS. 10A to 10N, various kinds of the card objects may be generated.

For example, as shown in FIG. 9H, a home network card object indicating a connection state of an adjacent electronic apparatus for providing shared content may be generated. The home network card object may include the list 971c of electronic apparatuses connected to the image display apparatus 100 and the list 971d of electronic apparatuses which are not connected to the image display apparatus 100 as shown in FIG. 9H.

As another example, an integrated electronic apparatus control card object capable of simultaneously monitoring and remotely controlling a plurality of electronic apparatuses may be generated. In such a card object, information for monitoring and remotely controlling home appliances such as a refrigerator, a washing machine, an air conditioner, a cooker, a TV, etc. may be displayed.

The generated card object is a per-user card object and may be viewed by a corresponding user, which will be described with reference to FIGS. 11A to 11E.

FIG. 11A shows the case in which a first user 1103 uses the image display apparatus 100 on which the home screen 900 is displayed. The camera 190 of the image display apparatus 100 captures the image of the user and sends the captured image 1106 of the user to the controller 170.

The controller 170 compares the image previously stored in the memory 140 with the captured image of the user 1106 and performs user recognition. Then, login of the recognized user is performed.

Login may be performed based on at least one of the captured image of the user, password input or user voice recognition. User voice may be acquired using a microphone included in the remote controller 200.

If login is performed, the image display apparatus 100 may display an icon indicating the logged-in user.

Figure 11B:
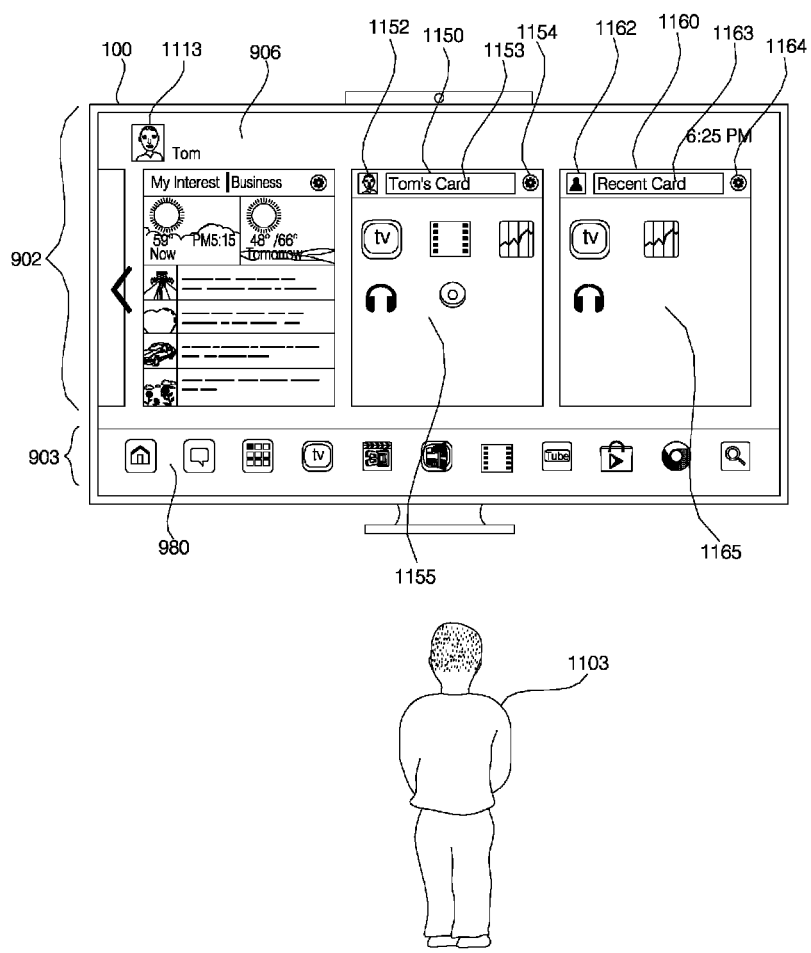

FIG. 11B shows an icon 1113 indicating the logged-in first user 1103 on the home screen 906.

The controller 170 may provide an individual home screen according to the logged-in user. That is, as shown in FIG. 11B, a card object 1150 generated by the first user may be displayed on the home screen.

The card object 1150 generated by the first user may include an icon 1152 associated with the user of the generated card object, a card object name 1153, an object 1154 for setting content, and a content list 1155 including generated application items.

The controller 170 may control display of a recent card object, in which content recently used by the logged-in user is collected, to the user. That is, the recent card object indicating the recently used content may be automatically generated and displayed without generating a separate card object.

FIG. 11B shows the recent card object 1160. The recent card object 1160 may include an icon 1162 associated with the user, a card object name 1163, an object 1164 for setting content, and a content list 1165 including recent content items.

Although the card object 1150 generated by the first user and the recent card object 1160 shown in FIG. 11B are provided after login of the first user, modifications thereof are possible.

For example, the card object 1150 generated by the first user may be provided after login of the first user but the recent card object 1160 may be displayed regardless of login of the first user.

That is, the recent card object may not include the content items recently executed by the first user but may include content items recently executed by all users. In this case, the recent card object may be displayed on the home screen regardless of login, when the user uses the image display apparatus.

Next, FIG. 11C shows the case in which a second user 1104 uses the image display apparatus to which the first user logs in.

In this case, the camera 190 of the image display apparatus 100 captures the image of the second user and sends the captured image 1107 of the second user to the controller 170. The controller 170 compares the image previously stored in the memory 140 with the captured image of the user 1106 and performs user recognition.

At this time, since the first user has already logged in to the image display apparatus, the controller 170 informs the second user that another user has logged in to the image display apparatus and displays a message 1162 indicating whether the second user will log in to the image display apparatus again. If a new login input item 1164 is selected, the controller 170 performs login of the recognized second user.

Login may be performed based on at least one of the captured image of the user, password input or user voice recognition. User voice may be acquired using a microphone included in the remote controller 200.

If login is performed, the image display apparatus 100 may display an icon indicating the logged-in second user.

Figure 11D:
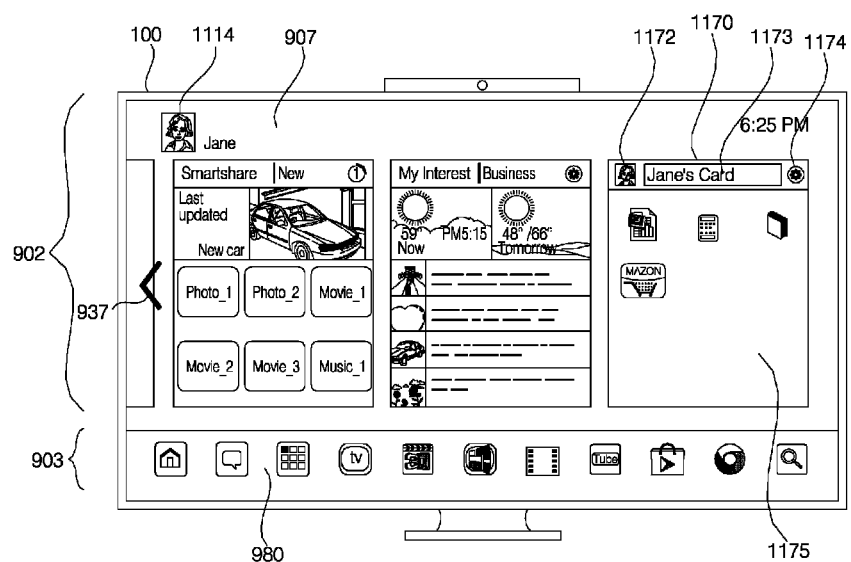

FIG. 11D shows an icon 1114 indicating the logged-in second user 1103 on the home screen 907.

The controller 170 may provide an individual home screen according to the logged-in user. That is, the home screen 906 of FIG. 11B may be provided to the first user and the home screen 907 of FIG. 11D may be provided to the second user.

The home screen 907 of FIG. 11D may include a card object 1170 generated by the second user.

The card object 1170 generated by the second user may include an icon 1172 associated with the user of the generated card object, a card object name 1173, an object 1174 for setting content, and a content list 1175 including generated application items.

Although not shown, the controller 170 may control display of a recent card object in which content recently used by the logged-in user is collected.

Next, FIG. 11E shows multi-login of a plurality of users.

For example, if the second user 1104 uses the image display apparatus 100 to which the first user 1103 has logged in, the second user may immediately log in to the image display apparatus 100 without new user login. That is, multi-login is possible.

As shown in FIG. 11E, the card object 1150 generated by the first user and the card object 1170 generated by the second user may be displayed together on the home screen.

FIG. 11E shows the case in which an icon 1113 indicating the logged-in first user 1103 and an icon 1114 indicating the logged-in second user 1104 are displayed.

If the card objects are displayed together according to multi-login and common content is present in the card objects, the common content item may be highlighted and displayed. Such a highlight function corresponds to content recommendation. By recommending the common content of the two users, it is possible to increase user convenience.

Upon multi-login, unlike FIG. 11E, one common card object may be displayed. At this time, the common card object may include a content item in the card object 1150 generated by the first user and a content item in the card object 1170 generated by the second user. At this time, the common content item may be highlighted and displayed. Alternatively, the common card object may include only the common content item.

Next, FIG. 11C shows the case in which the second user 1104 uses the image display apparatus 100 to which the first user has logged in.

In this case, the camera 190 of the image display apparatus 100 captures the image of the second user and sends the captured image 1106 of the second user to the controller 170. The controller 170 compares the image previously stored in the memory 140 with the captured image of the user 1106 and performs user recognition.

At this time, since the first user has already logged in to the image display apparatus, the controller 170 informs the second user that another user has logged in to the image display apparatus and displays a message 1162 indicating whether the second user will log in to the image display apparatus again. If a new login input item 1164 is selected, the controller 170 performs login of the recognized second user.

Login may be performed based on at least one of the captured image of the user, password input or user voice recognition. User voice may be acquired using a microphone included in the remote controller 200.

If login is performed, the image display apparatus 100 may display an icon indicating the logged-in second user.

On the home screen 900 displayed on the image display apparatus 100, various settings may be performed in addition to card object generation. Hereinafter, various settings will be described in detail.

Figure 12A:
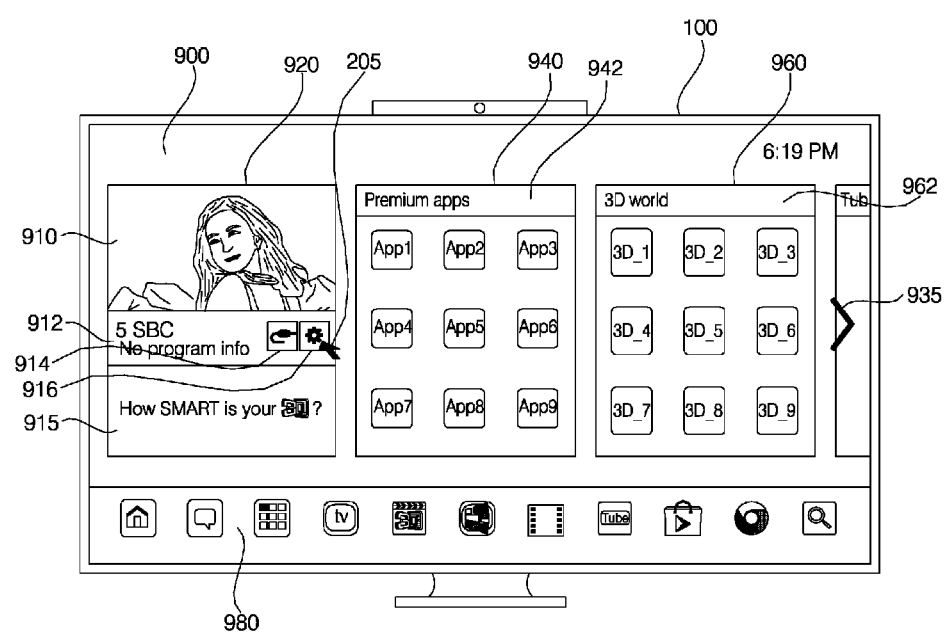

FIG. 12A shows the case in which the settings object 916 for setting the image display apparatus is selected on the home screen 900 based on the pointer 205 displayed in correspondence with movement of the remote controller 200.

As shown in FIG. 12B, the settings screen 1010 related to the image display apparatus may be displayed. FIG. 12B shows the case in which the customize home item 1014 of the settings screen 1010 is selected based on the pointer 205 displayed in correspondence with movement of the remote controller 200.

As shown in FIG. 12C, an application list edit screen 1180 for editing the launcher bar area 903 may be displayed on the home screen. At this time, the dashboard area 902 may be empty.

The application list edit screen 1180 is similar to the application list 980 of FIG. 12B and is different therefrom in that the application items are switched to an editable state. Unlike FIG. 12B, the application list edit screen 1180 may further include a widget addition item 1182 and an addition completion item 1184.

On the application list edit screen 1180, content list settings of a specific card object may be changed, a card object name may be changed or the position of a card object may be changed.

For display of the application list edit screen 1180 of FIG. 12C, the application list edit screen 1180 may be displayed using other methods, instead of selection of the settings object 916 of the home screen 900 and selection of the application list edit item 1014 of the settings screen 1010.

For example, if the pointer 205 is located in the application list 980 in a state of displaying the home screen 900 of FIG. 12A and then long tap or long press input is received, as shown in FIG. 12C, the application list edit screen 1180 for editing the launcher bar area 903 may be displayed on the home screen.

As another example, if the menu key 224 of the remote controller 200 is manipulated in a state of displaying the home screen 900 of FIG. 12A, the settings screen 1010 related to the image display apparatus shown in FIG. 12B may be displayed. If the application list edit item 1014 is selected, the application list edit screen 1180 may be displayed.

As another example, if the menu key 224 of the remote controller 200 is manipulated in a state in which the pointer 205 of the remote controller 200 is located in the launcher bar area 903 of the home screen 900 of FIG. 10A, the application list edit screen 1180 for editing the launcher bar area may be immediately displayed.

FIG. 12C shows the case in which the widget addition item 1182 of the application list edit screen 1180 is selected based on the pointer 205 displayed in correspondence with movement of the remote controller 200.

Figure 12D:
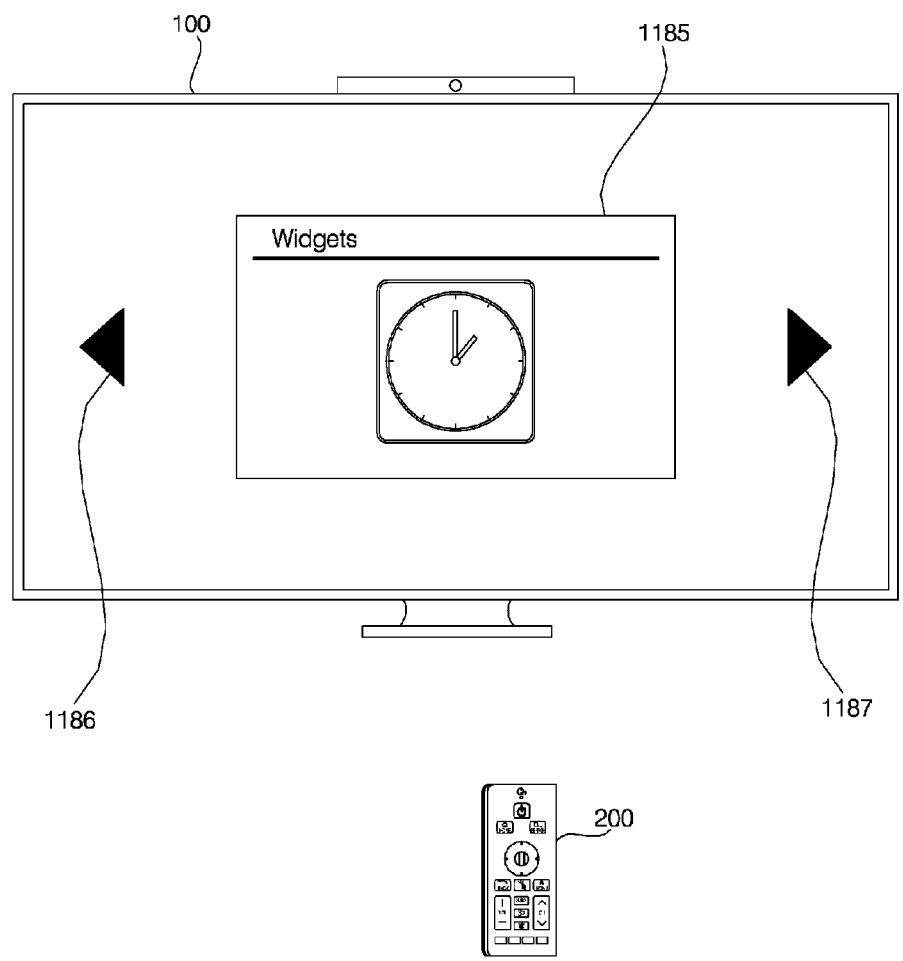

As shown in FIG. 12D, a widget screen 1185 may be displayed. If various widgets which may be installed in the image display apparatus are present, screen switching objects 1186 and 1187 for switching the screen may be further displayed. Accordingly, widget items desired by the user may be installed in the image display apparatus.

The installed widgets may be displayed on the image display apparatus when the widget item 981 of FIG. 9C is selected. If the widget item 981 of FIG. 9C is selected once more, the home screen may be displayed on the image display apparatus again. That is, the installed widget screen and the home screen may be alternately displayed according to widget screen selection.

Next, FIG. 13A shows the case in which, in the state of displaying the settings screen 1010 related to the image display apparatus, the home and all apps settings items 1016 are selected based on the pointer 205 displayed in correspondence with movement of the remote controller 200.

Then, as shown in FIG. 13B, a home and all apps settings screen 1210 for setting the home screen may be displayed. At this time, the dashboard area 902 may be empty.

The home and all apps settings screen 1210 may include a plurality of sub-items.

In the figure, a startup application item 1212 for executing applications to be displayed when the image display apparatus is powered on, a show/hide application item 1214 for setting show/hide of application items installed in the image display apparatus, a wallpaper item 1216 and a restore item for restoring an originally installed item are shown as the plurality of sub-items of the home and all apps settings screen 1210.

If the startup application item 1212 is selected based on the pointer 205 displayed in correspondence with movement of the remote controller 200, as shown in FIG. 13C, a startup settings screen 1220 for executing applications to be displayed when the image display apparatus is powered on is displayed.

Since the home screen is not immediately displayed when the image display apparatus 100 is powered on, the startup settings screen 1220 may include items for setting the applications to be displayed at a period from a time when power is turned on to a time when the home screen is displayed.

In the figure, a default item 1222 for displaying a live broadcast, a none item 1224 for non-display, a 3D item 1226 for displaying a 3D image, and an application item for executing a specific application are shown as the items of the startup settings screen 1220.

In the figure, the default item 1222 for displaying the live broadcast is set as the items of the startup settings screen 1220. In this case, since the home screen is not immediately displayed when the image display apparatus 100 is powered on, a live broadcast program received through the broadcast reception unit 105 may be displayed as the full screen in a period from a time when power is turned on to a time when the home screen is displayed.

Figure 13D:
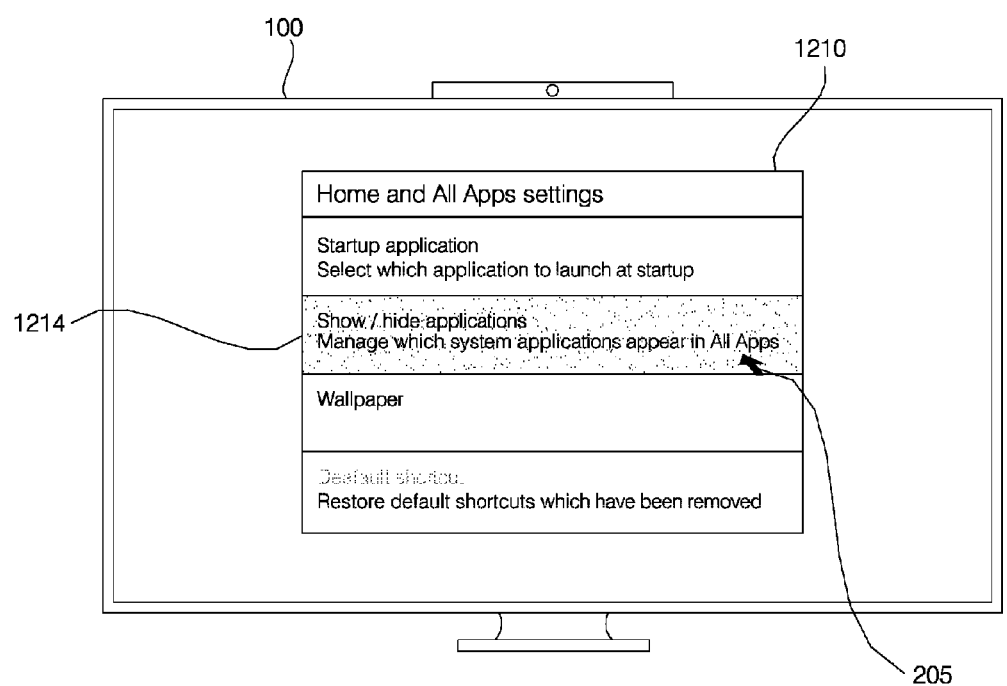

FIG. 13D shows the case in which, in the state of displaying the home and all apps settings screen 1210, the show/hide application item 1214 is selected based on the pointer 205 displayed in correspondence with movement of the remote controller 200.

Then, an application grid screen 1230 shown in FIG. 13E may be displayed. The application grid screen 1230 may include a plurality of application items and, more particularly, application items displayed in the launcher bar area 903.

In the figure, all application items on the application grid screen 1230 are selected for display.

FIG. 13F shows the case in which, in the state of displaying the home and all apps settings screen 1210, the wallpaper item 1216 is selected based on the pointer 205 displayed in correspondence with movement of the remote controller 200.

Then, a wallpaper settings screen 1240 shown in FIG. 13G may be displayed. The wallpaper settings screen 1240 may include a plurality of wallpaper items.

FIG. 13G shows the case in which a specific wallpaper item 1242 is selected from among the plurality of wallpaper items based on the pointer 205 displayed in correspondence with movement of the remote controller 200.

Then, a wallpaper screen 1250 shown in FIG. 13H may be displayed. As a result, it is possible to easily set the wallpaper when the home screen is displayed.

Next, FIG. 14A shows the case in which, in the state of displaying the settings screen 1010 related to the image display apparatus, the system settings item 1018 is selected based on the pointer 205 displayed in correspondence with movement of the remote controller 200.

The system settings screen 1310 shown in FIG. 14B may be displayed.

The system settings screen 1310 sets all items of the image display apparatus 100 and may include a recent menu item 1314, a network item 1315, a video input item 1316, a picture and sound item 1317, a channel settings item 1318, a 3D settings item 1319, etc.

When the recent menu item 1314 is selected, a list of recently set menu items may be displayed. When the network item 1315 is selected, a list for setting information (zip code, address information, etc.) about a region in which the image display apparatus is mounted, information about a network service provider corresponding to the region, etc. may be displayed. When the video input item 1316 is selected, a list for setting resolution, coding rate and codec of displayed video may be displayed.

In addition, if the picture and sound item 1317 is selected, a list for setting resolution, coding rate and codec of displayed picture or output sound may be displayed. If the channel settings item 1318 is selected, a list for setting an automatic channel search range, a manual channel search range, etc. may be displayed. If the 3D settings item 1319 is selected, a list for setting a 3D image output format, depth of a 3D image, a frame frequency, etc. may be displayed.

The system settings screen 1310 may include a search window 1312 for easily searching for numerous setting items with various depths. In addition, a voice recognition icon 1313 may be displayed in the vicinity of the search window 1312 such that search is performed through voice recognition.

Predetermined letters may be entered in the search window using the letter key 260 of the remote controller 200 or the letter key of the screen keyboard and the setting items corresponding to the entered letters may be immediately searched for and displayed. Accordingly, the user can easily search for a desired setting item.

Figure 15:
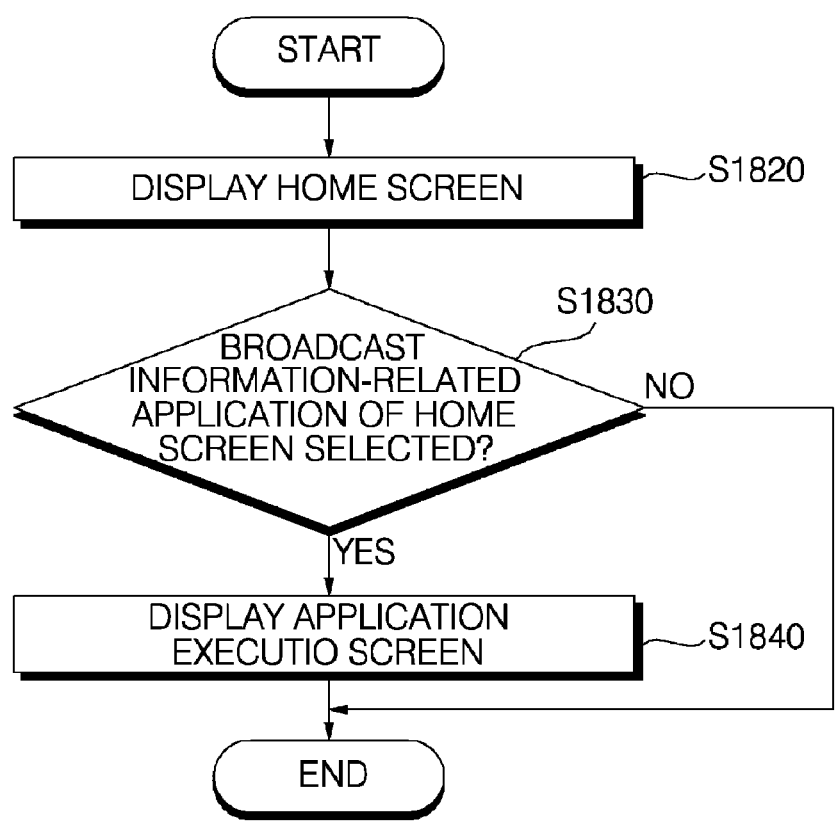
FIG. 15 is a flowchart illustrating a method for operating an image display apparatus according to an embodiment of the present invention.

FIG. 15 is a flowchart illustrating a method for operating an image display apparatus according to an embodiment of the present invention, and FIGS. 16A to 19B are views referred to for describing various examples of the method for operating the image display apparatus of FIG. 15.

Referring to the figure, the image display apparatus 100 displays the home screen (S1820).

Step 1802 (S1820) of displaying the home screen is equal to step 820 (S820) of displaying the home screen and thus a description thereof will be omitted.

After step 1820 (S1820) of FIG. 15, that is, after the home screen is displayed, the following steps may be performed.

The image display apparatus 100 determines whether a broadcast information-related application on the home screen is selected (S1830) and a screen for executing the application is displayed (S1840) if the application is selected.

As shown in FIG. 16A, in the state of displaying the home screen 900, if the primetime (TV & movie) item 1306 of the application list is selected, the image display apparatus 100 may display a primetime application execution screen 1300 to be displayed as shown in FIG. 16B.

The primetime application executed by selection of the primetime item 1306 may be provided by a current live broadcast program, a VOD such as drama or animation, which is capable of being streamed at a user request, a movie which is capable of being streamed at a user request.

In order to provide such a service, the network of the image display apparatus 100 is preferably set in advance. For example, region information and information about a broadcast service provider and a network service provider according to the region information is preferably set in advance. Network settings are described with reference to FIGS. 17A to 17C.

In the primetime application, the live broadcast program, the VOD such as drama or animation or the movie provided to the image display apparatus 100 may be changed according to the set region and network service provider.

FIG. 16B shows the primetime application screen. The primetime application screen 1300 may include a live broadcast program item 1310, a VOD item 1320 such as drama or animation, and a movie item 1330 according to the provided service kind. The image display apparatus 100 may display a content list corresponding to an item selected from among the items.

FIG. 16B shows the case in which the live broadcast program item 1310 is selected to display a live broadcast program list.

The live broadcast program list may include respective live broadcast images 1350, 1360, 1370 and 1380 of channels.

Among the respective live broadcast images 1350, 1360, 1370 and 1380 of the channels, the live broadcast image 1350 of the channel displayed on the home screen 900 of FIG. 16A may be highlighted. Alternatively, a live broadcast image of a channel having highest real-time ratings among the respective live broadcast images 1350, 1360, 1370 and 1380 of the channels may be highlighted. In addition, a live broadcast image, which is most viewed by the user, among the respective live broadcast images 1350, 1360, 1370 and 1380 of the channels may be highlighted.

The highlighted live broadcast image may have a largest size, may be arranged at a foremost side, or may have a largest amount of displayed information. That is, the highlighted live broadcast image may be highlighted with a priority higher than the live broadcast images of the other channels.

In the figure, the highlighted live broadcast image 1350 includes a channel name 1352, a program name 1354 of the program broadcast on the channel, brief broadcast information 1356 of the program and a detailed information view object 1358 of the program.

The live broadcast image of each channel may be a broadcast program image provided by a broadcast service provider for providing a broadcast service.

The displayed broadcast information may be broadcast information provided by a broadcast service provider for providing a broadcast service. Upon primetime application execution, the image display apparatus 100 may access a broadcast service provider server for providing the broadcast service. Here, the broadcast service provider may include a local cable operator.

In FIG. 16B, the live broadcast image 1360 other than the highlighted live broadcast image 1350 includes only a channel name and a program name of the program broadcast on the corresponding channel. That is, the live broadcast image 1360 and the highlighted live broadcast image are different in terms of information provided.

By highlighting any one live broadcast program of the live broadcast program list, user interest in the highlighted live broadcast program may be assumed high.

The primetime application screen 1300 may display a setting item 1340 and region information 1345 of the image display apparatus 100.

According to the region information of the image display apparatus 100, the number of broadcast channels and a broadcast channel number provided to the image display apparatus may be changed. Settings related to the primetime application may be performed through the setting item 1340. This will be described below with reference to FIGS. 16I to 16J.

Unlike FIG. 16B, the live broadcast images of the live broadcast program list may have the same size and the arrangement order thereof may be changed according to real-time ratings. In this case, if any one live broadcast content of the live broadcast program list is focused upon by movement of the cursor or the pointer, the broadcast information of the live broadcast content may be displayed in the form of a pull-down menu. Accordingly, the user can easily confirm desired information.

Next, FIG. 16C shows the case in which the live broadcast program item 1310 is selected and thus a broadcast information screen 1303a is displayed. The broadcast information screen 1303a may be an EPG screen.

The broadcast information screen 1303a may include broadcast information centered on the live broadcast program displayed on the home screen of FIG. 16A. Since the live broadcast program of Channel 5 is displayed on the home screen of FIG. 16A, the broadcast information screen 1303a of FIG. 16C is displayed to be centered on Channel 5 along with broadcast information of Channels 6 to 8. In particular, an item "The following" broadcast by SBC on Channel 5 displayed in FIG. 16A may be highlighted. Therefore, the user can easily confirm the broadcast information of the channel.

In case of a program provided by a major broadcast station, such broadcast information may be included in a broadcast signal transmitted by the major broadcast station. The image display apparatus 100 may extract broadcast information from the broadcast signal and generate and display the OSD shown in the figure.

As another example, in case of a program provided by a cable broadcast station, such broadcast information may be included in a broadcast signal transmitted by the cable broadcast station or may be received from a server of the cable broadcast station over a network. The image display apparatus 100 may extract the broadcast information from the broadcast signal or receive the broadcast information over the network and generate and display the OSD shown in the figure.

If the broadcast information is received via a plurality of routes, for example, is received from the major broadcast station and the cable broadcast station over the network, the image display apparatus may simultaneously display all broadcast information on the broadcast information screen or display a selection menu and display only one piece of broadcast information.

Next, FIG. 16D shows the case in which the live broadcast program item 1310 is selected and thus the broadcast information screen 1303b is displayed. Unlike FIG. 16C, the broadcast information screen 1303b may be displayed on a per genre basis.

For example, if the genre of "The Following" broadcast by SBC on Channel 5 displayed in FIG. 16A is thriller, the broadcast information screen 1303b may display broadcast information aligned on a per genre basis.

In the figure, "District 13" broadcast by YTC on Channel 23, "shooter' broadcast by CCC on Channel 130 and "Deja-vu" of VAN of Channel 527 equal to or similar to "The Following" broadcast by SBC on Channel 5 in terms of genre are displayed. Therefore, the user can easily confirm broadcast information on a per genre basis.

At this time, information 1349 about the number of viewers of each channel may be displayed. The number of viewers may be the number of viewers in the same region. In the figure, the region information 1345 and the information 1349 about the number of viewers of each channel are displayed.

Although the broadcast information on the broadcast information screen is aligned on a per genre basis in FIG. 16D, such settings may be changed. If the settings object 1348 is selected to change a broadcast information alignment criterion, the broadcast information may be aligned according to the changed criterion. The broadcast information alignment criterion may be "channel", "genre", "ratings", "age", "person" and "place" related to the viewed program, etc.

If the user has logged in to the image display apparatus, the broadcast information screen may be provided on a per user, preference or genre basis. If a child has logged in to the image display apparatus, a broadcast information screen related to a children's program may be provided. If a female adult has logged in to the image display apparatus, a broadcast information screen related to a cooking program or drama may be provided.

Figure 16E:
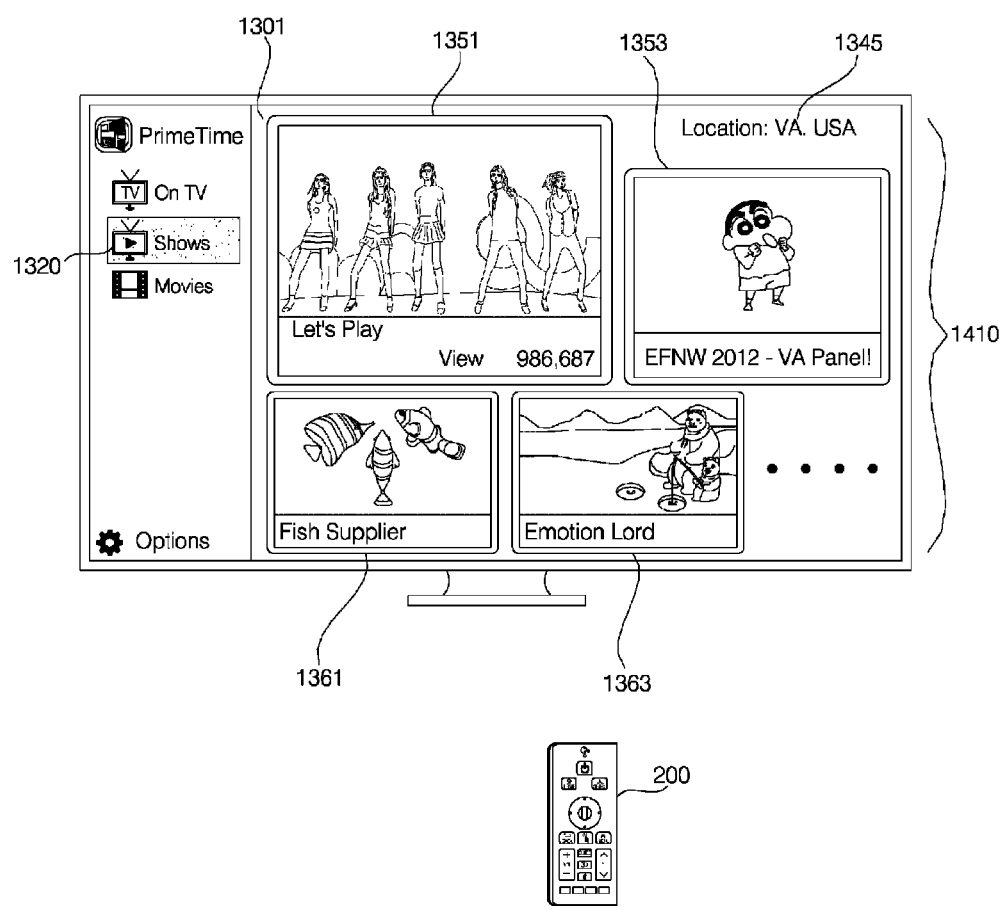
Figure 16H:
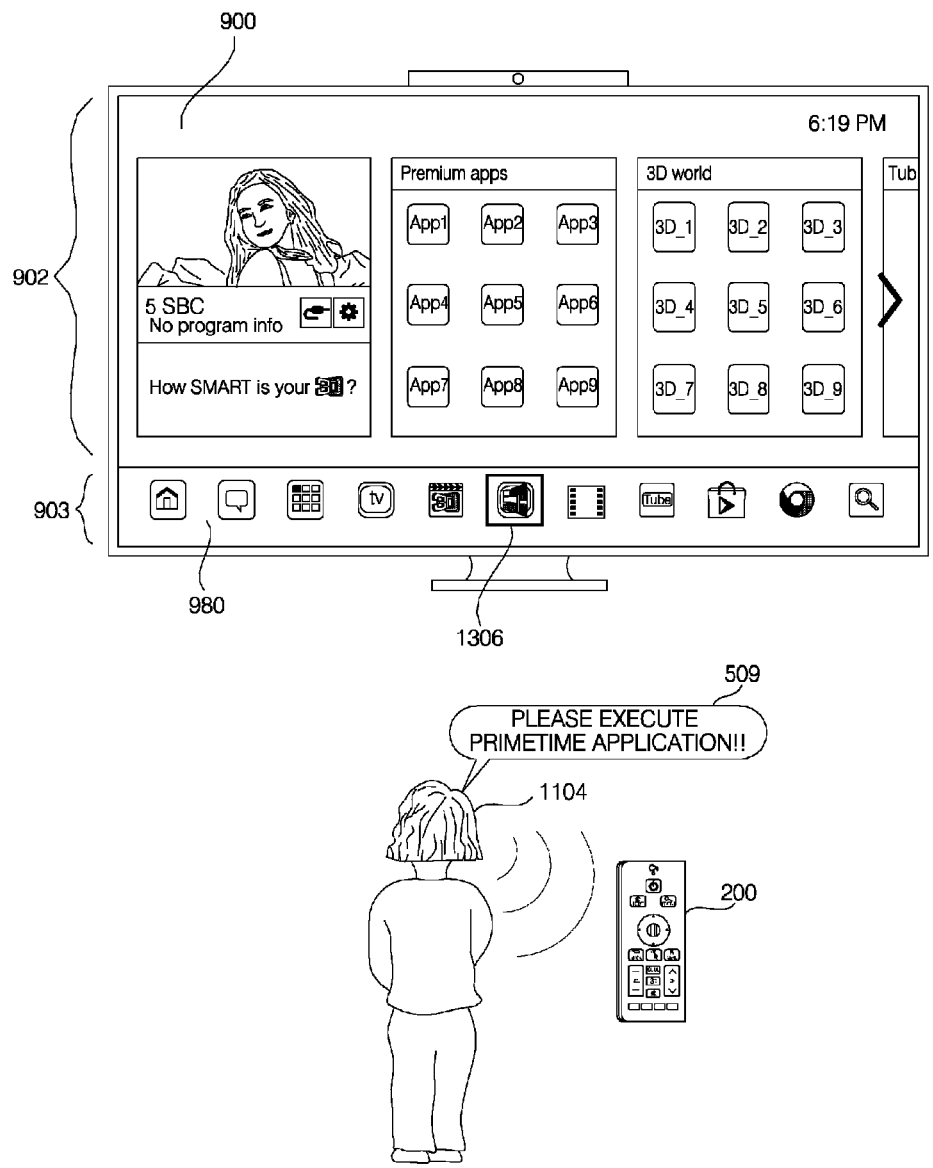

FIG. 16E shows the case in which the VOD item 1320 is selected and thus a VOD list is displayed.

The VOD list 1410 may include a plurality of VOD moving-images 1351, 1353, 1361 and 1363. The VOD moving-images of the VOD list 1410 may be divided according to servers or genres. A popular image or a most downloaded image among the plurality of VOD moving-images 1351, 1353, 1361 and 1363 may be highlighted. In the figure, the first VOD moving-image 1351 is highlighted. The first VOD moving-image 1351 may include a VOD moving-image, a VOD name and the number of views. In particular, the first VOD moving-image 1351 may further include the number of views, as compared to the other VOD moving-images.

The VOD moving-image may be provided by a content provider for a VOD moving-image. The image display apparatus 100 may access a server of a content provider to receive a VOD moving-image.

Upon display of the VOD moving-image list 1410, a setting item 1340 and region information 1345 of the image display apparatus 100 may be continuously displayed.

Unlike FIG. 16E, the VOD moving-images of the VOD moving-image list 1410 may have the same size and the arrangement order thereof may be changed according to popularity or download count. In this case, if any one VOD moving-image content of the VOD moving-image list is focused upon by movement of the cursor or the pointer, the information of the VOD moving-image content may be displayed in the form of a pull-down menu. Accordingly, the user can easily confirm desired information.

Next, FIG. 16F shows the case in which the movie item 1320 is selected and thus a movie list is displayed.

The movie list 1420 may include a plurality of movies. The movies of the movie list 1420 may be divided according to servers or genres. The arrangement order of the plurality of movies may be changed according to popularity or download count.

If any one movie on the movie list 1420 is focused upon by movement of the cursor or the pointer, information on the movie may be displayed in the form of a pull-down menu. Accordingly, the user can easily confirm desired information.

The movie content may be provided by a content provider for providing movie content. The image display apparatus 100 may access a server of a content provider to receive movie content.

Upon displaying the movie list 1420, a setting item 1340 and region information 1345 of the image display apparatus 100 may be continuously displayed.

Although an object is selected using the pointer 205 indicating movement of the remote controller 200 in FIGS. 16A to 16F, the present invention is not limited thereto and various modifications are possible.

For example, the object may be selected using the direction key and the OK key of the remote controller 200. As another example, the object, etc. may be selected in correspondence with a user gesture based on the image of the user captured using the camera 195. As another example, user voice may be recognized and the object, etc. may be selected based on the user voice.

For example, the image display apparatus 100 may display a hand-shaped pointer 506 corresponding to the hand 505 of a user 1104 based on the image of the user captured using the camera 195.

In a state of displaying the home screen 900 shown in FIG. 16G, if hand movement of the user 1104 corresponds to a tap gesture for selecting the primetime item (TV & movie item) 1306, it may be determined that the corresponding item is selected. Any one of the screens of FIGS. 16B to 16D may be displayed. That is, the live broadcast program list may be displayed as shown in FIG. 10B or the broadcast information screen 1303a or 1303b of FIG. 16C or 16D may be displayed.

As another example, the remote controller 200 including a microphone (not shown) may receive and send user voice to the image display apparatus 100.

In a state of displaying the home screen 900 shown in FIG. 16G, if the user outputs voice 509 "please execute primetime", the remote controller 200 may collect and send data of such voice 509 to the image display apparatus 100. The image display apparatus 100 may analyze the user voice through the voice recognition function and recognize a primetime application execution command. Then, the live broadcast program list may be displayed as shown in FIG. 16B or the broadcast information screen 1303a or 1303b of FIG. 16C or 16D may be displayed.

The selection command of the image display apparatus may be performed using the direction key and the OK key, a user gesture, user voice, etc. in addition to the pointer of the remote controller. Although the pointer indicating movement of the remote controller is focused upon in the following description, the direction key and the OK key, a user gesture, user voice, etc. may be used.

FIG. 16I shows the case in which the setting item 1340 of the primetime application screen 1300 is selected and a settings screen 1430 is displayed.

The settings screen 1430 may include a personalization item, a "review in app store" item and an "about" item.

If the personalization item 1432 is selected on the settings screen 1430 of FIG. 16I based on the pointer 205 displayed in correspondence with movement of the remote controller 200, a personalization related screen 1440 shown in FIG. 16J may be displayed.

The personalization related screen 1440 may include an email account related item 1442, a content rating related item 1444 and an application store related item 1446.

FIG. 17A shows the case in which a settings object 916 of the live broadcast card object 920 of the home screen 900 is selected based on the pointer 205 displayed in correspondence with movement of the remote controller 200.

Figure 17B:
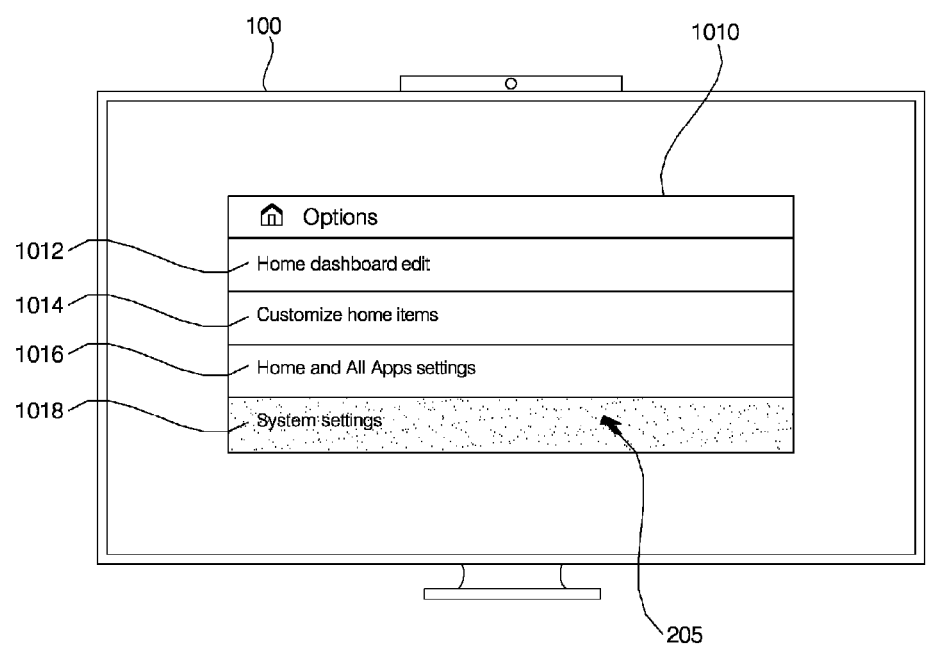

Then, as shown in FIG. 17B, the settings screen 1010 related to the image display apparatus may be displayed.

The settings screen 1010 may include a home dashboard edit item 1012, a customize home item 1014, a home and all apps settings item 1016 and a system settings item 1018.

FIG. 17B shows the case in which, in the state of displaying the settings screen 1010, the system settings item 1018 is selected based on the pointer 205 displayed in correspondence with movement of the remote controller 200.

Then, a system settings screen 1310 shown in FIG. 17C may be displayed.

The system settings screen 1310 is used to set all items of the image display apparatus 100 and may include a recent menu item 1314, a network item 1315, a video input item 1316, a picture and sound item 1317, a channel settings item 1318, a 3D settings item 1319, etc.

When the recent menu item 1314 is selected, a list of recently set menu items may be displayed. When the network item 1315 is selected, a list for setting information (zip code, address information, etc.) about a region in which the image display apparatus is mounted, information about a network service provider (an Internet service provider, etc.) corresponding to the region, etc. may be displayed. When the video input item 1316 is selected, a list for setting resolution, coding rate and codec of displayed video may be displayed.

In addition, if the picture and sound item 1317 is selected, a list for setting resolution (bit rate), coding rate and codec of displayed picture or output sound may be displayed. If the channel settings item 1318 is selected, a list for setting an automatic channel search range, a manual channel search range, etc. may be displayed. If the 3D settings item 1319 is selected, a list for setting a 3D image output format, depth of a 3D image, a frame frequency, etc. may be displayed.

The system settings screen 1310 may include a search window 1312 for easily searching for numerous setting items with various depths. In addition, a voice recognition icon 1313 may be displayed in the vicinity of the search window 1312 such that search is performed through voice recognition.

Predetermined letters may be entered in the search window using the letter key 260 of the remote controller 200 or the letter key of the screen keyboard and the setting items corresponding to the entered letters may be immediately searched for and displayed. Accordingly, the user can easily search for a desired setting item.

FIG. 17C shows the case in which, in the state of displaying the system settings screen 1310, the network item 1315 is selected based on the pointer 205 displayed in correspondence with movement of the remote controller 200.

For network setting of the image display apparatus 100, a list for setting information (zip code, address information, etc.) about a region in which the image display apparatus is mounted, information about a network service provider (an Internet service provider, etc.) corresponding to the region, etc. may be displayed. Thus, region information input, network service provider input or selection may be performed.

Figure 18A:
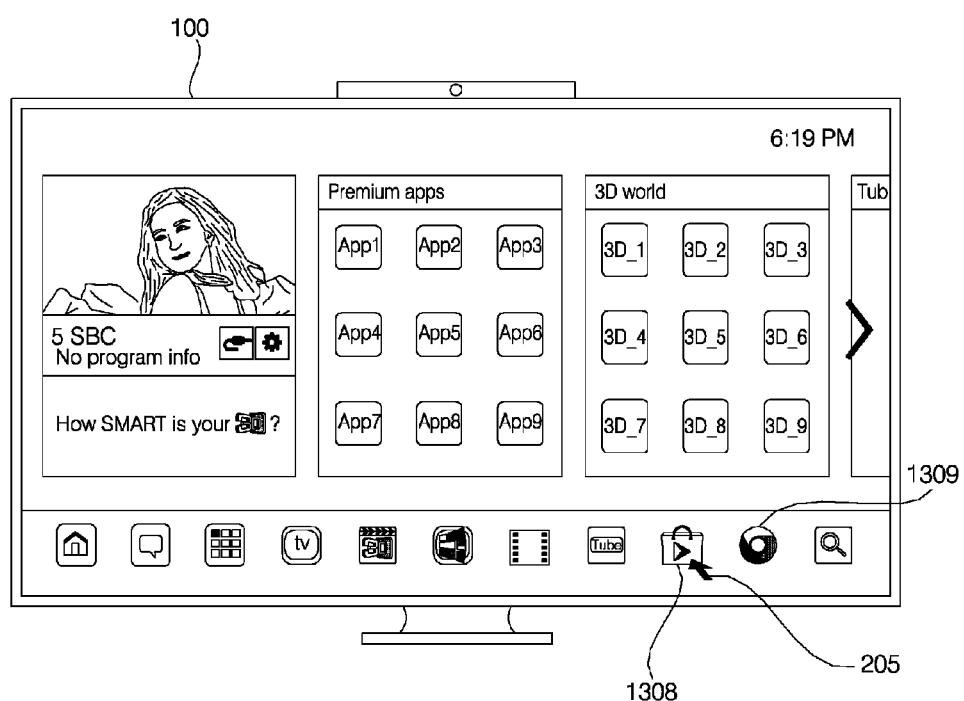

FIG. 18A shows the case in which the app store item 1308 of the application list 980 of the home screen 900 is selected based on the pointer 205 displayed in correspondence with movement of the remote controller 200.

Then, as shown in FIG. 18B, an app store screen 1500 related to the image display apparatus may be displayed.

The app store screen 1500 related to the image display apparatus may include a search window 1502 for searching for an application, a first application list 1510, and a second application list 1520. The first application list 1510 may include popular or new application items and the sizes of the application items of the first application list 1510 may be greater than those of the application items of the second application list 1520.

If a web item 1309 of the application list 980 of the home screen 900 is selected in FIG. 18A, a web screen 1530 shown in FIG. 18C may be displayed. Then, it is possible to immediately use the Internet.

FIG. 19A shows the case in which a predetermined content image 1600 is displayed on the image display apparatus 100. The content image 1600 may be a broadcast program image, a VOD image, etc.

Figure 19B:
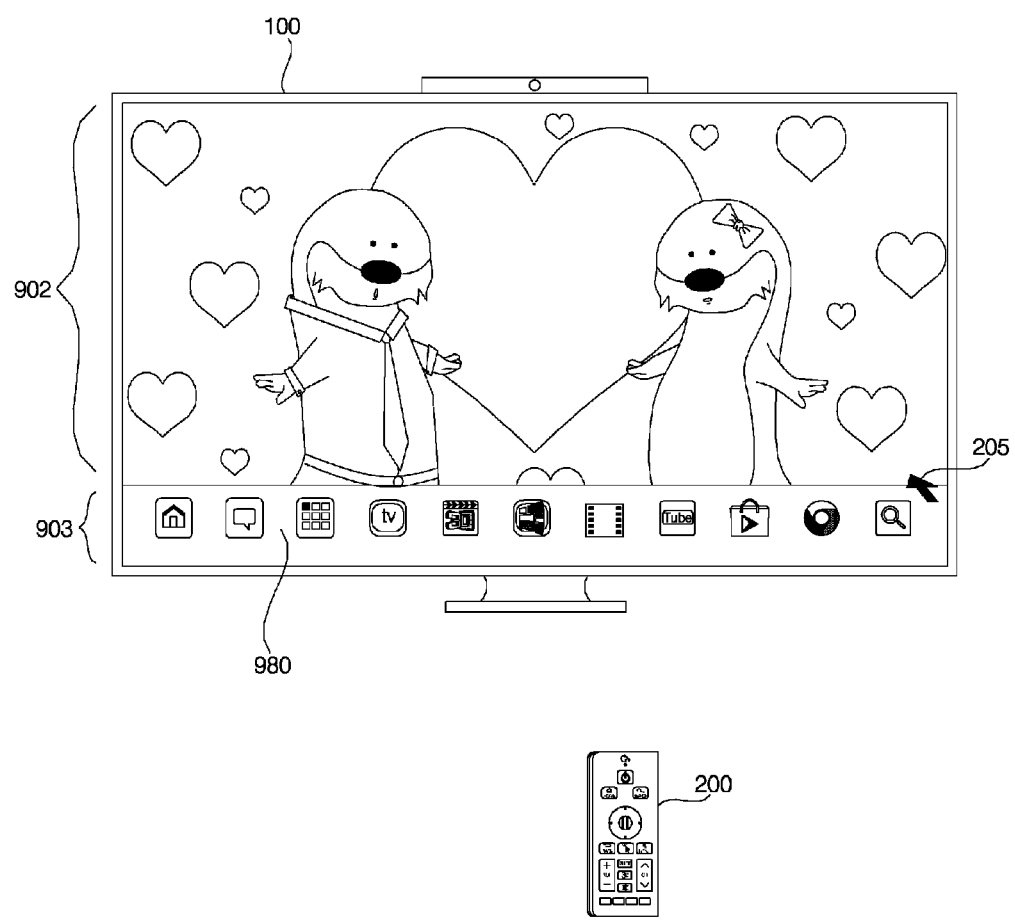

If the pointer 205 displayed in correspondence with movement of the remote controller 200 is moved to a lower side of a content region, that is, to a position corresponding to the launcher bar area 903 of the home screen, the application list 980 may be displayed as shown in FIG. 19B. That is, the application list 980 may be displayed even when the home screen is not displayed. Therefore, it is possible to increase user convenience.

When a card object is generated according to the method for operating the image display apparatus described with reference to FIGS. 8 to 14B, the method for operating the image display apparatus of FIG. 15 is applicable. That is, if an application item related to broadcast information of an application list of a home screen is selected after a card object is generated, a broadcast information-related application screen including a live broadcast image item for viewing a live broadcast image list and a moving-image item for viewing a moving-image list may be displayed.

On the contrary, after a broadcast information-related application screen according to the method for operating the image display apparatus described with reference to FIGS. 15 to 19B is displayed, a card object may be generated in a state of displaying a home screen.

In the image display apparatus 100 according to the embodiment of the present invention, when an object or a menu is selected or focused upon, the object or the menu may be highlighted. Although not shown in FIGS. 9A to 13B or FIGS. 16A to 19B, the contour of the selected or focused object or menu may be made thick or at least one of the size, color or the luminance of the selected or focused object or menu may be changed. Therefore, the user can intuitively perceive selection or focusing of the object or menu.

According to one embodiment of the present invention, an image display apparatus displays a screen for generating a card object to be displayed on a home screen according to card object generation input and adds a predetermined content item to the card object to be generated if the predetermined content item is selected. Therefore, the user can easily generate a desired card object. As a result, it is possible to increase user convenience.

In particular, the card object to be generated is displayed in a first region of the screen for generating the card object and content items to be added are displayed in a second region, such that desired content items are easily added to the card object to be generated on one screen.

The card object may be generated on a per user basis and, when a user logs in, a card object corresponding to the user may be displayed. Thus, the user can view the card object including content items desired by the user.

If system settings input is received, a system settings screen including network settings, video settings, channel settings and 3D image settings is displayed and a search window for searching for a settings item is displayed, such that a desired settings item among a plurality of search items is immediately searched for.

According to another embodiment of the present invention, an image display apparatus displays a broadcast information-related application screen including a live broadcast image item for viewing a live broadcast image list and a moving-image item for viewing a moving-image list, if a broadcast information-related application item in an application list on a home screen is selected. Therefore, the user can easily view desired content.

If a live broadcast image list is displayed on the broadcast information-related application screen, at least one of the size or arrangement order of broadcast images in the live broadcast image list or the amount of display information related to the broadcast images is changed according to real-time ratings. Therefore, it is possible to increase user convenience.

If a moving-image list is displayed on the broadcast information-related application screen, at least one of the size or arrangement order of moving images in the moving-image list or the amount of display information related to the moving images is changed according to download counts of the moving images. Therefore, it is possible to increase user convenience.

The image display apparatus and the method for operating the same according to the foregoing embodiments are not restricted to the embodiments set forth herein. Therefore, variations and combinations of the exemplary embodiments set forth herein may fall within the scope of the present invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an image display apparatus, the method comprising:
   displaying a home screen including at least one card object including a content list;
   displaying a card object generation screen in response to card object generation input;
   in response to selection of at least one content item displayed on the card object generation screen, adding the selected content item to a card object to be generated,
   displaying a settings screen related to the image display apparatus in response to manipulation of a menu key of a remote controller or selection of a settings object for setting the image display apparatus on the home screen,
   wherein the settings screen related to the image display apparatus includes a first item for editing a dashboard area in which the card object is displayed on the home screen, a second item for editing a launcher bar area in which an application list is displayed on the home screen, a third item for performing settings related to start of the home screen and a fourth item including network settings, video settings, channel settings and three-dimensional (3D) image setting.

2. The method according to claim 1, wherein the card object generation screen includes a first region including the card object to be generated and an input window for inputting an object name of the card object to be generated and a second region including content items to be added to the card object to be generated.

3. The method according to claim 1, further comprising displaying a card object generation completion message when generation of the card object has been completed.

4. The method according to claim 1, wherein the card object generation screen includes an icon indicating a user who generates the card object or a user who will use the card object.

5. The method according to claim 4, further comprising capturing an image of the user,
   wherein the icon includes the captured image of the user.

6. The method according to claim 4, further comprising:
   performing user login;
   generating a recent card object including content items recently executed by the logged-in user; and
   displaying the recent card object corresponding to the logged-in user.

7. The method according to claim 1, wherein the displaying the card object generation screen includes displaying the card object generation screen when, in a state of displaying a dashboard edit screen for editing a dashboard area between the dashboard area in which the card object is arranged and a launcher bar area in which an application list is arranged, a card object generation item on the dashboard edit screen is selected, or when, in a state in which a pointer indicating motion of a remote controller is located in the dashboard area, a menu key of the remote controller is manipulated.

8. The method according to claim 1, further comprising displaying the generated card object on the home screen.

9. The method according to claim 1, further comprising:
   performing user login; and
   displaying a home screen including the generated card object in correspondence with the logged-in user,
   wherein at least one card object displayed on the home screen is changed according to the logged-in user.

10. The method according to claim 9, further comprising, when another user logs in a state in which a user who has already logged in to the image display apparatus is present, indicating that the user who has already logged in to the image display apparatus is present and displaying a message indicating whether or not login is performed again.

11. The method according to claim 9, wherein the user login is performed based on at least one of a captured user image, password input or voice recognition.

12. The method according to claim 1,
    wherein card object generation input is received based on the settings screen related to the image display apparatus.

13. The method according to claim 1, further comprising displaying a system settings screen including network settings, video settings, channel settings and 3D image settings in response to system settings input,
    wherein the system settings screen includes a search window for searching for a settings item.

14. The method according to claim 13, wherein the system settings screen further includes a voice recognition icon for searching for the settings item using voice recognition.

15. An image display apparatus comprising:
    a network interface configured to exchange data with a server;
    a display configured to display a home screen including at least one card object including a content list and to display a card object generation screen in response to card object generation input; and
    a controller configured to, in response to selection of at least one content item displayed on the card object generation screen, add the selected content item to a card object to be generated, and display a settings screen related to the image display apparatus in response to manipulation of a menu key of a remote controller or selection of a settings object for setting the image display apparatus on the home screen,
    wherein the settings screen related to the image display apparatus includes a first item for editing a dashboard area in which the card object is displayed on the home screen, a second item for editing a launcher bar area in which an application list is displayed on the home screen, a third item for performing settings related to start of the home screen and a fourth item including network settings, video settings, channel settings and three-dimensional (3D) image setting.

16. The image display apparatus according to claim 15, wherein the card object generation screen includes a first region including the card object to be generated and an input window for inputting an object name of the card object to be generated and a second region including content items to be added to the card object to be generated.

17. The image display apparatus according to claim 15, further comprising a user input interface configured to receive motion information or predetermined key manipulation from a remote controller,
    wherein the controller controls display of the card the card object generation screen when, in a state of displaying a dashboard edit screen for editing a dashboard area between the dashboard area in which the card object is arranged and a launcher bar area in which an application list is arranged, a card object generation item on the dashboard edit screen is selected, or when, in a state in which a pointer indicating motion of a remote controller is located in the dashboard area, a menu key of the remote controller is manipulated.

18. The image display apparatus according to claim 15, further comprising a camera configured to capture an image of a user, wherein the controller performs user login, controls display of a home screen including the generated card object in correspondence with the logged-in user, and changes at least one card object displayed on the home screen according to the logged-in user.

19. The image display apparatus according to claim 15, wherein the display displays a system settings screen including network settings, video settings, channel settings and 3D image settings in response to system settings input, wherein the system settings screen includes a search window for searching for a settings item.

\* \* \* \* \*